United States Patent
Roberson et al.

(10) Patent No.: US 10,358,914 B2
(45) Date of Patent: Jul. 23, 2019

(54) METHODS AND SYSTEMS FOR DETECTING RFID TAGS IN A BOREHOLE ENVIRONMENT

(71) Applicant: Halliburton Energy Services, Inc., Houston, TX (US)

(72) Inventors: Mark W. Roberson, Cary, NC (US); Scott Goodwin, Chapel Hill, NC (US); Charles Bartee, Durham, NC (US); Craig W. Roddy, Duncan, OK (US); Krishna M. Ravi, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 968 days.

(21) Appl. No.: 14/316,408

(22) Filed: Jun. 26, 2014

(65) Prior Publication Data
US 2014/0354443 A1    Dec. 4, 2014

Related U.S. Application Data

(63) Continuation-in-part of application No. 13/031,519, filed on Feb. 21, 2011, now Pat. No. 9,732,584, which
(Continued)

(51) Int. Cl.
*E21B 47/12* (2012.01)
*G06K 7/10* (2006.01)
(Continued)

(52) U.S. Cl.
CPC ............ *E21B 47/122* (2013.01); *E21B 33/13* (2013.01); *E21B 43/25* (2013.01);
(Continued)

(58) Field of Classification Search
CPC ..................................................... E21B 47/122
See application file for complete search history.

(56) References Cited

U.S. PATENT DOCUMENTS

| 3,239,005 A | 3/1966 | Bodine, Jr. |
| 3,930,220 A | 12/1975 | Shawhan |

(Continued)

FOREIGN PATENT DOCUMENTS

| EP | 1241112 A2 | 9/2002 |
| EP | 1830035 A1 | 9/2007 |

(Continued)

OTHER PUBLICATIONS

"U.S. Appl. No. 11/695,329, Advisory Action dated Jan. 28, 2010", 3 pgs.

(Continued)

*Primary Examiner* — Amine Benlagsir
(74) *Attorney, Agent, or Firm* — Gilliam IP PLLC

(57) ABSTRACT

Sensor assemblies are deployed in a borehole for a well, such as an oil well or other hydrocarbon recovery well. The sensor assemblies may be coupled to a casing string (e.g., the exterior of the casing), and detect RFID tags or other properties of material (e.g., fluids) in an annulus surrounding the casing string. During cementing or other operations, RFID tags may be used to track fluids. RFID detection circuits may be used to scan at different frequencies, and corresponding results may be compared by various means and processes to determine the presence of RFID tags.

27 Claims, 26 Drawing Sheets

Related U.S. Application Data is a continuation-in-part of application No. 12/618,067, filed on Nov. 13, 2009, now Pat. No. 8,342,242, which is a continuation-in-part of application No. 11/695,329, filed on Apr. 2, 2007, now Pat. No. 7,712,527.

(51) Int. Cl.

| | | |
|---|---|---|
| *E21B 33/13* | (2006.01) | |
| *E21B 43/25* | (2006.01) | |
| *E21B 47/00* | (2012.01) | |
| *E21B 47/01* | (2012.01) | |
| *E21B 47/10* | (2012.01) | |

(52) U.S. Cl.
CPC .......... *E21B 47/0005* (2013.01); *E21B 47/01* (2013.01); *E21B 47/10* (2013.01); *G06K 7/10366* (2013.01)

(56) References Cited

U.S. PATENT DOCUMENTS

| | | | |
|---|---|---|---|
| 4,156,229 A | 5/1979 | Shawhan | |
| 4,234,344 A | 11/1980 | Tinsley et al. | |
| 4,298,970 A | 11/1981 | Shawhan et al. | |
| 4,390,975 A | 6/1983 | Shawhan | |
| 4,412,934 A | 11/1983 | Chung et al. | |
| 4,512,401 A | 4/1985 | Bodine | |
| 4,552,674 A | 11/1985 | Brown et al. | |
| 4,653,587 A | 3/1987 | Bodine | |
| 4,701,247 A | 10/1987 | Kalnins et al. | |
| 4,736,794 A | 4/1988 | Bodine | |
| 5,121,795 A | 6/1992 | Ewert et al. | |
| 5,123,487 A | 6/1992 | Harris et al. | |
| 5,127,473 A | 7/1992 | Harris et al. | |
| 5,213,161 A | 5/1993 | King et al. | |
| 5,220,960 A | 6/1993 | Totten et al. | |
| 5,281,270 A | 1/1994 | Totten et al. | |
| 5,298,069 A | 3/1994 | King et al. | |
| 5,346,012 A | 9/1994 | Heathman et al. | |
| 5,437,329 A | 8/1995 | Brooks et al. | |
| 5,524,709 A | 6/1996 | Withers | |
| 5,588,488 A | 12/1996 | Vijn et al. | |
| 5,627,749 A | 5/1997 | Waterman et al. | |
| 5,839,508 A | 11/1998 | Tubel et al. | |
| 5,991,602 A | 11/1999 | Sturm | |
| 5,995,477 A | 11/1999 | Smith et al. | |
| 6,041,861 A | 3/2000 | Mandal et al. | |
| 6,063,738 A | 5/2000 | Chatterji et al. | |
| 6,101,447 A | 8/2000 | Poe, Jr. | |
| 6,125,935 A | 10/2000 | Shahin, Jr. | |
| 6,234,257 B1 | 5/2001 | Ciglenec et al. | |
| 6,241,028 B1 | 6/2001 | Bijleveld et al. | |
| 6,244,342 B1 | 6/2001 | Sullaway et al. | |
| 6,269,685 B1 | 8/2001 | Oden | |
| 6,324,904 B1 | 12/2001 | Ishikawa et al. | |
| 6,367,550 B1 | 4/2002 | Chatterji et al. | |
| 6,374,913 B1 | 4/2002 | Robbins | |
| 6,429,784 B1 | 8/2002 | Beique et al. | |
| 6,434,084 B1 | 8/2002 | Schultz | |
| 6,443,228 B1 | 9/2002 | Aronstam et al. | |
| 6,457,524 B1 | 10/2002 | Roddy et al. | |
| 6,485,560 B1 | 11/2002 | Scherer et al. | |
| 6,547,871 B2 | 4/2003 | Chatterji et al. | |
| 6,597,175 B1 | 7/2003 | Brisco | |
| 6,664,215 B1 | 12/2003 | Tomlinson | |
| 6,693,554 B2 | 2/2004 | Beique et al. | |
| 6,697,738 B2 | 2/2004 | Ravi et al. | |
| 6,699,828 B1 | 3/2004 | de Buzzaccarini et al. | |
| 6,702,044 B2 | 3/2004 | Reddy et al. | |
| 6,712,138 B2 | 3/2004 | Mandal | |
| 6,722,433 B2 | 4/2004 | Brothers et al. | |
| 6,722,434 B2 | 4/2004 | Reddy et al. | |
| 6,735,630 B1 | 5/2004 | Gelvin et al. | |
| 6,745,833 B2 | 6/2004 | Aronstam et al. | |
| 6,766,141 B1 | 7/2004 | Briles et al. | |
| 6,775,578 B2 | 8/2004 | Couet et al. | |
| 6,789,619 B2 | 9/2004 | Carlson et al. | |
| 6,802,373 B2 | 10/2004 | Dillenbeck et al. | |
| 6,802,374 B2 | 10/2004 | Edgar et al. | |
| 6,817,412 B2 | 11/2004 | Haase | |
| 6,820,929 B2 | 11/2004 | Edrich et al. | |
| 6,823,271 B1 | 11/2004 | Foss | |
| 6,823,940 B2 | 11/2004 | Reddy et al. | |
| 6,834,722 B2 | 12/2004 | Vacik et al. | |
| 6,847,034 B2 | 1/2005 | Shah et al. | |
| 6,848,519 B2 | 2/2005 | Reddy et al. | |
| 6,864,215 B2 | 3/2005 | Dodwell et al. | |
| 6,891,477 B2 | 5/2005 | Aronstam | |
| 6,898,529 B2 * | 5/2005 | Gao | E21B 43/26 |
| | | | 702/11 |
| 6,904,366 B2 | 6/2005 | Patzek et al. | |
| 6,915,848 B2 | 7/2005 | Thomeer et al. | |
| 6,920,929 B2 | 7/2005 | Bour | |
| 6,922,637 B2 | 7/2005 | Ravi et al. | |
| 6,925,392 B2 | 8/2005 | McNeil, III et al. | |
| 6,976,535 B2 | 12/2005 | Aronstam et al. | |
| 6,994,167 B2 | 2/2006 | Ramos et al. | |
| 6,995,677 B2 | 2/2006 | Aronstam et al. | |
| 7,003,405 B1 | 2/2006 | Ho | |
| 7,004,021 B2 | 2/2006 | Bilby et al. | |
| 7,036,363 B2 | 5/2006 | Yogeswaren | |
| 7,036,586 B2 | 5/2006 | Roddy et al. | |
| 7,038,470 B1 | 5/2006 | Johnson | |
| 7,040,404 B2 | 5/2006 | Brothers et al. | |
| 7,044,222 B2 | 5/2006 | Tomlinson | |
| 7,046,164 B2 | 5/2006 | Gao et al. | |
| 7,066,256 B2 | 6/2006 | Dillenbeck et al. | |
| 7,066,284 B2 | 6/2006 | Wylie et al. | |
| 7,077,203 B1 | 7/2006 | Roddy et al. | |
| 7,082,993 B2 | 8/2006 | Ayoub et al. | |
| 7,104,116 B2 | 9/2006 | Discenzo | |
| 7,107,154 B2 | 9/2006 | Ward | |
| 7,116,542 B2 | 10/2006 | Lerche et al. | |
| 7,133,778 B2 | 11/2006 | Ravi et al. | |
| 7,140,434 B2 | 11/2006 | Chouzenoux et al. | |
| 7,140,437 B2 | 11/2006 | McMechan et al. | |
| 7,145,473 B2 | 12/2006 | Wisler et al. | |
| 7,152,466 B2 | 12/2006 | Ramakrishnan et al. | |
| 7,156,174 B2 | 1/2007 | Roddy et al. | |
| 7,174,962 B1 | 2/2007 | Roddy et al. | |
| 7,213,647 B2 | 5/2007 | Brothers et al. | |
| 7,225,879 B2 | 6/2007 | Wylie et al. | |
| 7,303,014 B2 | 12/2007 | Reddy et al. | |
| 7,315,248 B2 | 1/2008 | Egbert | |
| 7,357,181 B2 | 4/2008 | Webb | |
| 7,389,819 B2 | 6/2008 | Oyeneyin et al. | |
| 7,392,697 B2 | 7/2008 | Chikenji et al. | |
| 7,400,262 B2 | 7/2008 | Chemali et al. | |
| 7,434,457 B2 | 10/2008 | Goodwin et al. | |
| 7,455,108 B2 | 11/2008 | Jenkins et al. | |
| 7,461,547 B2 | 12/2008 | Terabayashi et al. | |
| 7,482,309 B2 | 1/2009 | Ravi et al. | |
| 7,493,962 B2 | 2/2009 | Sheffield | |
| 7,543,642 B2 | 6/2009 | Reddy et al. | |
| 7,581,434 B1 | 9/2009 | Discenzo et al. | |
| 7,617,879 B2 | 11/2009 | Anderson et al. | |
| 7,631,697 B2 | 12/2009 | Bhavsar | |
| 7,636,671 B2 | 12/2009 | Caveny et al. | |
| 7,647,979 B2 | 1/2010 | Shipley | |
| 7,673,679 B2 | 3/2010 | Harrison et al. | |
| 7,712,527 B2 | 5/2010 | Roddy | |
| 7,717,180 B2 | 5/2010 | Badalamenti et al. | |
| 7,749,942 B2 | 7/2010 | Ravi et al. | |
| 7,750,808 B2 | 7/2010 | Masino et al. | |
| 7,784,339 B2 | 8/2010 | Cook et al. | |
| 7,832,263 B2 | 11/2010 | Rensel et al. | |
| 7,866,393 B2 | 1/2011 | Badalamenti et al. | |
| 7,878,245 B2 | 2/2011 | Ravi et al. | |
| 8,162,050 B2 | 4/2012 | Roddy et al. | |
| 8,168,570 B2 | 5/2012 | Barron et al. | |
| 8,202,824 B2 | 6/2012 | Reddy et al. | |
| 8,291,975 B2 | 10/2012 | Roddy et al. | |
| 8,297,352 B2 | 10/2012 | Roddy et al. | |

(56) References Cited

U.S. PATENT DOCUMENTS

| | | | |
|---|---|---|---|
| 8,297,353 B2 | 10/2012 | Roddy et al. | |
| 8,302,686 B2 | 11/2012 | Roddy et al. | |
| 8,316,936 B2 | 11/2012 | Roddy | |
| 8,316,963 B2 | 11/2012 | Eia et al. | |
| 8,342,242 B2 | 1/2013 | Roddy et al. | |
| 8,436,743 B2 | 5/2013 | Auzerais et al. | |
| 9,194,207 B2 | 11/2015 | Roddy et al. | |
| 2001/0054969 A1* | 12/2001 | Thomeer | E21B 23/00 340/853.3 |
| 2002/0046147 A1 | 4/2002 | Livesay et al. | |
| 2002/0091071 A1 | 7/2002 | Fischer et al. | |
| 2002/0145526 A1 | 10/2002 | Friedman et al. | |
| 2002/0194906 A1 | 12/2002 | Goodwin et al. | |
| 2002/0196993 A1 | 12/2002 | Schroeder | |
| 2003/0029611 A1 | 2/2003 | Owens | |
| 2003/0205376 A1 | 11/2003 | Ayoub et al. | |
| 2004/0020643 A1 | 2/2004 | Thomeer et al. | |
| 2004/0047534 A1 | 3/2004 | Shah et al. | |
| 2004/0083805 A1 | 5/2004 | Ramakrishnan et al. | |
| 2004/0098202 A1 | 5/2004 | McNeil, II et al. | |
| 2004/0180793 A1 | 9/2004 | Ramos | |
| 2004/0239521 A1* | 12/2004 | Zierolf | G01V 3/30 340/854.1 |
| 2004/0242430 A1 | 12/2004 | Griffin et al. | |
| 2005/0006020 A1 | 1/2005 | Zitha et al. | |
| 2005/0011645 A1 | 1/2005 | Aronstam et al. | |
| 2005/0016730 A1 | 1/2005 | McMechan et al. | |
| 2005/0055162 A1 | 3/2005 | Gao et al. | |
| 2005/0159494 A1 | 7/2005 | Dobbs | |
| 2005/0207279 A1 | 9/2005 | Chemali et al. | |
| 2005/0224123 A1 | 10/2005 | Baynham et al. | |
| 2006/0013065 A1 | 1/2006 | Varsamis et al. | |
| 2006/0047527 A1 | 3/2006 | Caveny et al. | |
| 2006/0086503 A1* | 4/2006 | Reddy | C04B 28/02 166/293 |
| 2006/0170535 A1 | 8/2006 | Watters et al. | |
| 2006/0250243 A1 | 11/2006 | Masino et al. | |
| 2006/0279412 A1 | 12/2006 | Holland et al. | |
| 2007/0013519 A1* | 1/2007 | Chung | G08B 13/2462 340/572.1 |
| 2007/0044572 A1 | 3/2007 | Davis et al. | |
| 2007/0062695 A1 | 3/2007 | Harrison et al. | |
| 2007/0090927 A1 | 4/2007 | Potyrailo et al. | |
| 2007/0131414 A1 | 6/2007 | Calderoni et al. | |
| 2007/0131418 A1* | 6/2007 | Barrow | E21B 47/04 166/255.1 |
| 2007/0229230 A1* | 10/2007 | Drago | G06K 5/00 340/10.52 |
| 2008/0007421 A1 | 1/2008 | Liu et al. | |
| 2008/0068209 A1 | 3/2008 | Sugiyama et al. | |
| 2008/0125335 A1 | 5/2008 | Bhavsar | |
| 2008/0196889 A1 | 8/2008 | Bour et al. | |
| 2008/0236814 A1 | 10/2008 | Roddy | |
| 2008/0242346 A1* | 10/2008 | Rofougaran | H04B 1/0067 455/552.1 |
| 2008/0272931 A1 | 11/2008 | Auzerais et al. | |
| 2008/0307877 A1 | 12/2008 | Cook et al. | |
| 2009/0022011 A1 | 1/2009 | Mickael et al. | |
| 2009/0033516 A1 | 2/2009 | Alteirac et al. | |
| 2009/0107666 A1 | 4/2009 | Tchakarov et al. | |
| 2009/0120168 A1 | 5/2009 | Harrison et al. | |
| 2009/0288820 A1 | 11/2009 | Barron et al. | |
| 2010/0039898 A1 | 2/2010 | Gardner et al. | |
| 2010/0050905 A1 | 3/2010 | Lewis et al. | |
| 2010/0051266 A1 | 3/2010 | Roddy et al. | |
| 2010/0051275 A1 | 3/2010 | Lewis et al. | |
| 2010/0102986 A1 | 4/2010 | Benischek et al. | |
| 2010/0139386 A1 | 6/2010 | Taylor | |
| 2010/0212891 A1 | 8/2010 | Stewart et al. | |
| 2011/0031015 A1* | 2/2011 | Downton | E21B 47/12 175/27 |
| 2011/0187556 A1 | 8/2011 | Roddy et al. | |
| 2011/0199228 A1 | 8/2011 | Roddy et al. | |
| 2011/0315377 A1 | 12/2011 | Rioufol | |
| 2012/0055669 A1 | 3/2012 | Levin et al. | |
| 2012/0055998 A1 | 3/2012 | Mieslinger | |
| 2012/0056504 A1 | 3/2012 | Hunter et al. | |
| 2012/0132418 A1 | 5/2012 | Mcclung, III et al. | |
| 2012/0205103 A1 | 8/2012 | Ravi et al. | |
| 2012/0273192 A1 | 11/2012 | Schmidt et al. | |
| 2013/0062068 A1 | 3/2013 | Roddy et al. | |
| 2013/0141220 A1 | 6/2013 | Sadr et al. | |
| 2013/0147608 A1* | 6/2013 | Sadr | G06K 7/0008 340/10.1 |
| 2014/0111349 A1 | 4/2014 | Roberson et al. | |
| 2014/0174732 A1 | 6/2014 | Goodwin et al. | |

FOREIGN PATENT DOCUMENTS

| | | |
|---|---|---|
| EP | 2129867 A1 | 12/2009 |
| EP | 2336487 A1 | 6/2011 |
| EP | 2343434 A1 | 7/2011 |
| EP | 2489828 A1 | 8/2012 |
| EP | 2129867 B1 | 8/2013 |
| GB | 2367133 A | 3/2002 |
| GB | 2391565 A | 2/2004 |
| GB | 2431400 A | 4/2007 |
| JP | 2008-541616 A | 11/2008 |
| WO | WO-99/20722 A2 | 4/1999 |
| WO | WO-99/66172 A1 | 12/1999 |
| WO | WO-02/06628 A1 | 1/2002 |
| WO | WO-2006/136635 A2 | 12/2006 |
| WO | WO-2006/136635 A3 | 12/2006 |
| WO | WO-2007/034273 A1 | 3/2007 |
| WO | WO-2008/119963 A1 | 10/2008 |
| WO | WO-2009/008735 A1 | 1/2009 |
| WO | WO-2011/023938 A1 | 3/2011 |
| WO | WO-2011/023938 A9 | 3/2011 |
| WO | WO-2011/023942 A2 | 3/2011 |
| WO | WO-2011/023942 A3 | 3/2011 |
| WO | WO-2011/058324 A1 | 5/2011 |
| WO | WO-2012/114068 A2 | 8/2012 |
| WO | WO-2014/007878 A1 | 1/2014 |
| WO | WO-2015/102838 A1 | 7/2015 |
| WO | WO-2015/199986 A1 | 12/2015 |
| WO | WO-2016/032677 A1 | 3/2016 |

OTHER PUBLICATIONS

"U.S. Appl. No. 11/695,329, Advisory Action dated Feb. 24, 2010", 3 pgs.

"U.S. Appl. No. 11/695,329, Amendments and Response filed Jan. 21, 2010 to Final Office Action dated Jan. 15, 2010", 17 pgs.

"U.S. Appl. No. 11/695,329, Amendments and Response filed Feb. 5, 2010 to Final Office Action dated Jan. 15, 2010 and Advisory Action dated Jan. 28, 2010", 17 pgs.

"U.S. Appl. No. 11/695,329, Amendments and Response filed Feb. 26, 2010 to Final Office Action dated Jan. 15, 2010 and Advisory Actions dated Jan. 28, 2010 and Feb. 24, 2010", 17 pgs.

"U.S. Appl. No. 11/695,329, Amendments and Response filed Jul. 8, 2009 to Non-Final Office Action dated May 14, 2009", 15 pgs.

"U.S. Appl. No. 11/695,329, Amendments and Response filed Nov. 4, 2009 to Non-Final Office Action dated Oct. 29, 2009", 14 pgs.

"U.S. Appl. No. 11/695,329, Final Office Action dated Jan. 15, 2010", 7 pgs.

"U.S. Appl. No. 11/695,329, Non-Final Office Action dated May 14, 2009", 6 pgs.

"U.S. Appl. No. 11/695,329, Non-Final Office Action dated Oct. 29, 2009", 5 pgs.

"U.S. Appl. No. 11/695,329, Notice of Allowance dated Mar. 12, 2010", 4 pgs.

"U.S. Appl. No. 12/618,067, Amendments and Response to Final Office Action dated Aug. 15, 2012", 12 pgs.

"U.S. Appl. No. 12/618,067, Amendments and Response filed Jun. 11, 2012 to Non-Final Office Action dated Mar. 9, 2012", 11 pgs.

"U.S. Appl. No. 12/618,067, Final Office Action dated Aug. 15, 2012", 6 pgs.

"U.S. Appl. No. 12/618,067, Non-Final Office Action dated Mar. 9, 2012", 5 pgs.

(56) References Cited

OTHER PUBLICATIONS

"U.S. Appl. No. 12/618,067, Notice of Allowance dated Oct. 9, 2012", 5 pgs.
"U.S. Appl. No. 12/618,067, Notice of Allowance dated Nov. 19, 2012", 7 pgs.
"U.S. Appl. No. 13/031,519, Amendments and Response filed Apr. 4, 2014 to Non-Final Office Action dated Jan. 29, 2014", 8 pgs.
"U.S. Appl. No. 13/031,519, Final Office Action dated Feb. 3, 2016", 25 pgs.
"U.S. Appl. No. 13/031,519, Non-Final Office Action dated Feb. 24, 2015", 33 pgs.
"U.S. Appl. No. 13/031,519, Response filed Apr. 14, 2016 to Final Office Action dated Feb. 3, 2016", 12 pgs.
"U.S. Appl. No. 13/031,519, Amendment, Response and RCE filed Jun. 25, 2015 to Final Office Action dated Apr. 9, 2015", 14 pgs.
"U.S. Appl. No. 13/031,519, Amendments and Response filed Nov. 5, 2014 to Non-Final Office Action dated Aug. 5, 2014", 12 pgs.
"U.S. Appl. No. 13/031,519, Final Office Action dated Apr. 9, 2015", 24 pgs.
"U.S. Appl. No. 13/031,519, Non-Final Office Action dated Jan. 29, 2014", 19 pgs.
"U.S. Appl. No. 13/031,519, Non-Final Office Action dated Apr. 20, 2016", 25 pgs.
"U.S. Appl. No. 13/031,519, Non-Final Office Action dated Aug. 5, 2014", 31 pgs.
"U.S. Appl. No. 13/031,519, Non-Final Office Action dated Aug. 27, 2015", 25 pgs.
"U.S. Appl. No. 13/031,519, Response filed Nov. 6, 2015 to Non-Final Office Action dated Aug. 27, 2015", 15 pgs.
"U.S. Appl. No. 13/031,524, Amendments and Response filed Jun. 11, 2012 to Non-Final Office Action dated Mar. 9, 2012", 10 pgs.
"U.S. Appl. No. 13/031,524, Non-Final Office Action dated Mar. 9, 2012", 5 pgs.
"U.S. Appl. No. 13/031,524, Notice of Allowance dated Sep. 11, 2012", 5 pgs.
"U.S. Appl. No. 13/031,527, Amendments and Response filed Jun. 12, 2012 to Non-Final Office Action dated Mar. 12, 2012", 8 pgs.
"U.S. Appl. No. 13/031,527, Non-Final Office Action dated Mar. 12, 2012", 5 pgs.
"U.S. Appl. No. 13/031,527, Notice of Allowance dated Aug. 29, 2012", 5 pgs.
"U.S. Appl. No. 13/031,535, Amendments and Response filed Jun. 12, 2012 to Non-Final Office Action dated Mar. 12, 2012", 8 pgs.
"U.S. Appl. No. 13/031,535, Non-Final Office Action dated Mar. 12, 2012", 5 pgs.
"U.S. Appl. No. 13/031,535, Notice of Allowance dated Oct. 9, 2012", 7 pgs.
"U.S. Appl. No. 13/031,536, Amendments and Response filed Jun. 13, 2012 to Non-Final Office Action dated Mar. 13, 2012", 8 pgs.
"U.S. Appl. No. 13/031,536, Non-Final Office Action dated Mar. 3, 2012", 5 pgs.
"U.S. Appl. No. 13/031,536, Notice of Allowance dated Aug. 17, 2012", 5 pgs.
"U.S. Appl. No. 13/031,536, Notice of Allowance dated Sep. 18, 2012", 7 pgs.
"U.S. Appl. No. 13/031,539, Amendments and Response filed Jun. 13, 2012 to Non-Final Office Action dated Mar. 14, 2012", 7 pgs.
"U.S. Appl. No. 13/031,539, Non-Final Office Action dated Mar. 14, 2012", 4 pgs.
"U.S. Appl. No. 14/145,524, Non Final Office Action dated Feb. 2, 2016", 19 pgs.
"European Application Serial No. 08718914.8, Amended Claims filed Mar. 28, 2012 in response to Minutes of Consultation mailed Mar. 6, 2012", 7 pgs.
"European Application Serial No. 08718914.8, European Office Action dated May 31, 2011", 4 pgs.
"European Application Serial No. 08718914.8, Office Action dated May 4, 2010", 5 pgs.
"European Application Serial No. 08718914.8, Office Action dated May 31, 2011", 3 pgs.
"European Application Serial No. 08718914.8, Resonse filed Nov. 15, 2010 to Office Action dated May 4, 2010", 10 pgs.
"European Application Serial No. 08718914.8, Response dated Dec. 12, 2011 to Office Action dated May 31, 2011", 13 pgs.
"European Application Serial No. 08718914.8, Result of Consultation mailed Mar. 6, 2012", 2 pgs.
"European Application Serial No. 11159483.4, European Search Report dated May 19, 2011", 5 pgs.
"European Application Serial No. 11159483.4, Notice of Loss of Rights dated Feb. 17, 2012", 1 pg.
"European Application Serial No. 11159483.4, Office Action dated Jul. 16, 2012", 4 pgs.
"European Application Serial No. 11159483.4, Office Action dated Sep. 13, 2013", 4 pgs.
"European Application Serial No. 11159483.4, Office Action dated Nov. 26, 2014", 4 pgs.
"European Application Serial No. 11159483.4, Reply filed Jan. 28, 2013 to Office Action dated Jul. 16, 2012", 11 pgs.
"European Application Serial No. 11159483.4, Reply filed Feb. 26, 2014 to Office Action dated Sep. 13, 2013", 11 pgs.
"European Application Serial No. 11159483.4, Reply filed Apr. 26, 2012 to Notice of Loss of Rights dated Feb. 17, 2012", 13 pgs.
"European Application Serial No. 11159483.4, Reply filed Jun. 4, 2015 to Office Action dated Nov. 26, 2014", 62 pgs.
"European Application Serial No. 11159484.2, European Search Report dated May 19, 2011", 4 pgs.
"European Application Serial No. 11159484.2, Notice of Loss of Rights dated Jan. 27, 2012", 1 pg.
"European Application Serial No. 11159484.2, Office Action dated May 14, 2012", 3 pgs.
"European Application Serial No. 11159484.2, Reply filed Apr. 5, 2012 to Notice of Loss of Rights dated Jan. 27, 2012", 13 pgs.
"European Application Serial No. 11159484.2, Reply filed Nov. 29, 2012 to Office Action dated May 14, 2012 and Telephone Consultation dated Oct. 19, 2012", 11 pgs.
"European Application Serial No. 11159484.2, Result of Consultation mailed Oct. 19, 2012", 4 pgs.
"European Application Serial No. 12167946.8, European Search Report dated Jul. 6, 2012", 6 pgs.
"European Application Serial No. 12167946.8, Office Action dated Sep. 20, 2013", 3 pgs.
"European Application Serial No. 12167946.8, Office Action dated Nov. 26, 2015", 4 pgs.
"European Application Serial No. 12167946.8, Office Action dated Nov. 27, 2014", 4 pgs.
"European Application Serial No. 12167946.8, Reply filed Jan. 22, 2014 to Office Action dated Sep. 20, 2013", 10 pgs.
"European Application Serial No. 12167946.8, Reply filed Mar. 24, 2016 to Office Action dated Nov. 26, 2015", 2 pgs.
"European Application Serial No. 12167946.8, Reply filed Jun. 8, 2015 to Office Action dated Nov. 27, 2014", 65 pgs.
"European Application Serial No. 12167947.6, Reply filed Feb. 21, 2013 to Supplementary European Search Report dated Jul. 6, 2012", 3 pgs.
"European Application Serial No. 12167947.6, Supplementary European Search Report dated Jul. 6, 2012", 6 pgs.
"Haliburton Fluid Systems, Cementing Spherelite tm-Cement Additive", HO1516, (Nov. 2006), 1 pg.
"International Application Serial No. PCT/GB2008/000179, International Preliminary Report on Patentability dated Jul. 28, 2009", 10 pgs.
"International Application Serial No. PCT/GB2008/000179, International Search Report and Written Opinion dated May 30, 2008", 12 pgs.
"International Application Serial No. PCT/GB2008/001084, International Preliminary Report on Patentability dated Oct. 6, 2009", 7 pgs.
"International Application Serial No. PCT/GB2008/001084, International Search Report and Written Opinion dated Jul. 8, 2008", 9 pgs.
"International Application Serial No. PCT/GB2010001580, International Preliminary Report on Patentability dated Mar. 8, 2012", 7 pgs.

(56) References Cited

OTHER PUBLICATIONS

"International Application Serial No. PCT/GB2010001580, International Search Report and Written Opinion dated Apr. 21, 2011", 9 pgs.

"International Application Serial No. PCT/GB2010001590, International Preliminary Report on Patentability dated Mar. 8, 2012", 7 pgs.

"International Application Serial No, PCT/GB2010001590, International Search Report and Written Opinion dated Apr. 21, 2011", 9 pgs.

"International Application Serial No. PCT/GB2010002089, International Preiminary Report on Patentability dated May 24, 2012", 7 pgs.

"International Application Serial No. PCT/GB2010002089, International Search Report and Written Opinion dated Apr. 21, 2011", 9 pgs.

"International Application Serial No. PCT/GB2012/000179, International Preliminary Report on Patentability dated Aug. 29, 2013", 9 pgs.

"International Application Serial No. PCT/GB2012/000179, International Search Report and Written Opinion dated Jun. 24, 2013", 11 pgs.

"International Application Serial No. PCT/US2014/069699, International Search Report dated Apr. 2, 2015", 3 pgs.

"International Application Serial No. PCT/US2014/069699, Written Opinion dated Apr. 2, 2015", 13 pgs.

"International Application Serial No. PCT/US2015/035090, International Search Report dated Aug. 31, 2015", 4 pgs.

"International Application Serial No. PCT/US2015/035090, Written Opinion dated Aug. 31, 2015", 7 pgs.

"International Application Serial No. PCT/US2015/042866, International Search Report dated Oct. 23, 2015", 3 pgs.

"International Application Serial No. PCT/US2015/042866, Written Opinion dated Oct. 23, 2015", 13 pgs.

"International Road Dynamics Inc., Concrete Maturity Monitor: Wireless Technonlogy in the Palm of Your Hand", REVA, Canada, (Jun. 2002), 5 pgs.

"MEMS Concrete Monitoring System", [online]. © Advanced Design Consulting USA, Inc., [archived on Jun. 25, 2006]. Retrieved from the Internet: <URL: https://web.archive.org/web/20060625101655/http://adc9001.com/index.php?src=memsconcrete&print=1>, (2006), 1 pg.

"Ultrasonic Testing of Aerospace Materials", NASA Practice No. PT-TE-1422 [online]. [archived on Sep. 14, 2012]. Retrieved from the Internet: <URL: https://web.archive.org/web/20120914030843/http://www.klabs.org/DEI/References/design_guidelines/test_series/1422msfc.pdf>, (2012), 6 pgs.

Drumheller, D. S., "An overview of acoustic telemetry", (1992), 7 pgs.

Ong, K. G., et al., "Design and application of a wireless, passive, resonant-circuit environmental monitoring sensor", *Sensors and Actuators A; Physical*, (Aug. 2001), 33-43

Ong, Keat G., et al., "A Wireless, Passive Carbon Nanotube-Based Gas Sensor", *IEEE Sensors Journal*, 2(2), (Apr. 2002), 82-88.

Ravi, Kris, et al., "Cementing Process Optimized to Achieve Zonal Isolation", *Petrotech*, (2007), 6 pgs.

U.S. Appl. No. 13/031,519, filed Feb. 21, 2011, Methods and Systems for Detecting RFID Tags in a Borehole Environment.

U.S. Appl. No. 12/618,067, filed Nov. 13, 2009, Methods and Systems for Detecting RFID Tags in a Borehole Environment, U.S. Pat. No. 8,342,242.

U.S. Appl. No. 11/695,329, Methods and Systems for Detecting RFID Tags in a Borehole Environment, U.S. Pat. No. 7,712,527.

\* cited by examiner

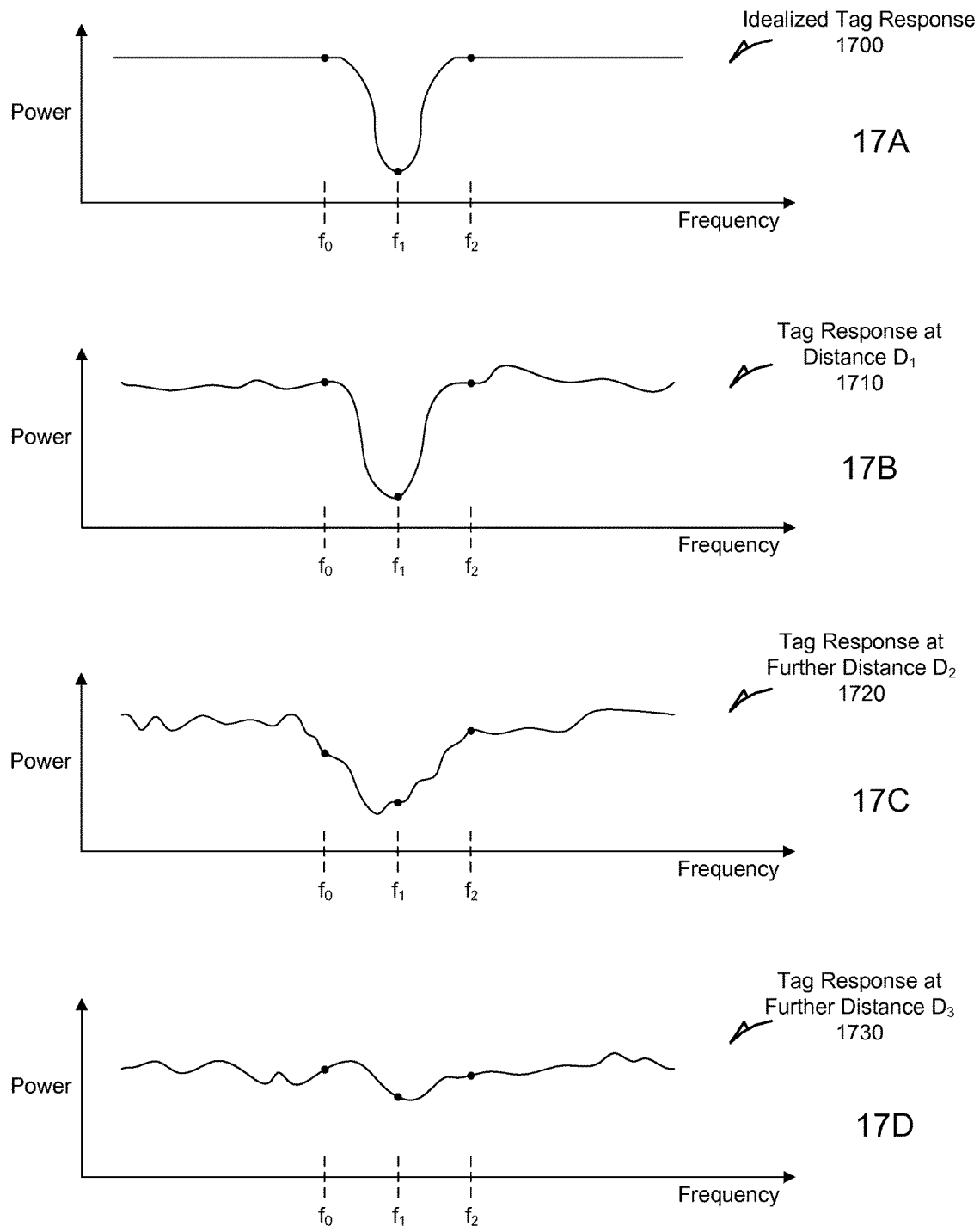
FIG. 17A-D

METHODS AND SYSTEMS FOR DETECTING RFID TAGS IN A BOREHOLE ENVIRONMENT

CROSS-REFERENCE TO RELATED APPLICATIONS

This is a continuation-in-part application of U.S. patent application Ser. No. 13/031,519, filed Feb. 21, 2011, published as U.S. Patent Application Publication 2011/0199228; which is a continuation-in-part application of U.S. patent application Ser. No. 12/618,067, filed on Nov. 13, 2009, now U.S. Pat. No. 8,342,242, which is a continuation-in-part application of U.S. patent application Ser. No. 11/695,329, now U.S. Pat. No. 7,712,527, all entitled "Use of Micro-ElectroMechanical Systems (MEMS) in Well Treatments," each of which is hereby incorporated by reference herein in its entirety, and for all purposes.

BACKGROUND OF THE INVENTION

This disclosure relates to the field of drilling, completing, servicing, and treating a subterranean well, such as a hydrocarbon recovery well. In particular, the present disclosure relates to systems and methods for detecting and/or monitoring the position and/or condition of wellbore compositions, for example wellbore sealants such as cement, using RFID tags (in some cases including micro-electrical mechanical system (MEMS)-based data sensors). In some instances, the present disclosure describes methods of scanning for RFID tags using a detector assembly that includes an RFID detection circuit.

Natural resources such as gas, oil, and water residing in a subterranean formation or zone are usually recovered by drilling a wellbore into the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing. Non-cementitious sealants are also utilized in preparing a wellbore. For example, polymer, resin, or latex-based sealants may be desirable for placement behind casing.

To enhance the life of the well and minimize costs, sealant slurries are chosen based on calculated stresses and characteristics of the formation to be serviced. Suitable sealants are selected based on the conditions that are expected to be encountered during the sealant service life. Once a sealant is chosen, it is desirable to monitor and/or evaluate the health of the sealant so that timely maintenance can be performed and the service life maximized. The integrity of sealant can be adversely affected by conditions in the well. For example, cracks in cement may allow water influx while acid conditions may degrade cement. The initial strength and the service life of cement can be significantly affected by its moisture content from the time that it is placed. Moisture and temperature are the primary drivers for the hydration of many cements and are critical factors in the most prevalent deteriorative processes, including damage due to freezing and thawing, alkali-aggregate reaction, sulfate attack and delayed Ettringite (hexacalcium aluminate trisulfate) formation. Thus, it is desirable to measure one or more sealant parameters (e.g., moisture content, temperature, pH and ion concentration) in order to monitor sealant integrity.

Active, embeddable sensors can involve drawbacks that make them undesirable for use in a wellbore environment. For example, low-powered (e.g., nanowatt) electronic moisture sensors are available, but have inherent limitations when embedded within cement. The highly alkali environment can damage their electronics, and they are sensitive to electromagnetic noise. Additionally, power must be provided from an internal battery to activate the sensor and transmit data, which increases sensor size and decreases useful life of the sensor. Accordingly, an ongoing need exists for improved methods of monitoring wellbore sealant condition from placement through the service lifetime of the sealant.

Likewise, in performing wellbore servicing operations, an ongoing need exists for improvements related to monitoring and/or detecting a condition and/or location of a wellbore, formation, wellbore servicing tool, wellbore servicing fluid, or combinations thereof. Additionally, the usefulness of such monitoring is greatly improved through measurements in azimuthally defined regions of the annulus. Such needs may be met by the systems and methods for use of RFID tags, in some cases with MEMS sensors, down hole in accordance with the various embodiments described herein.

BRIEF DESCRIPTION OF THE DRAWINGS

FIG. 17A-D is a depiction of several example embodiments illustrating signal/noise ratios as related to RFID detection.

DETAILED DESCRIPTION

Figure 1:
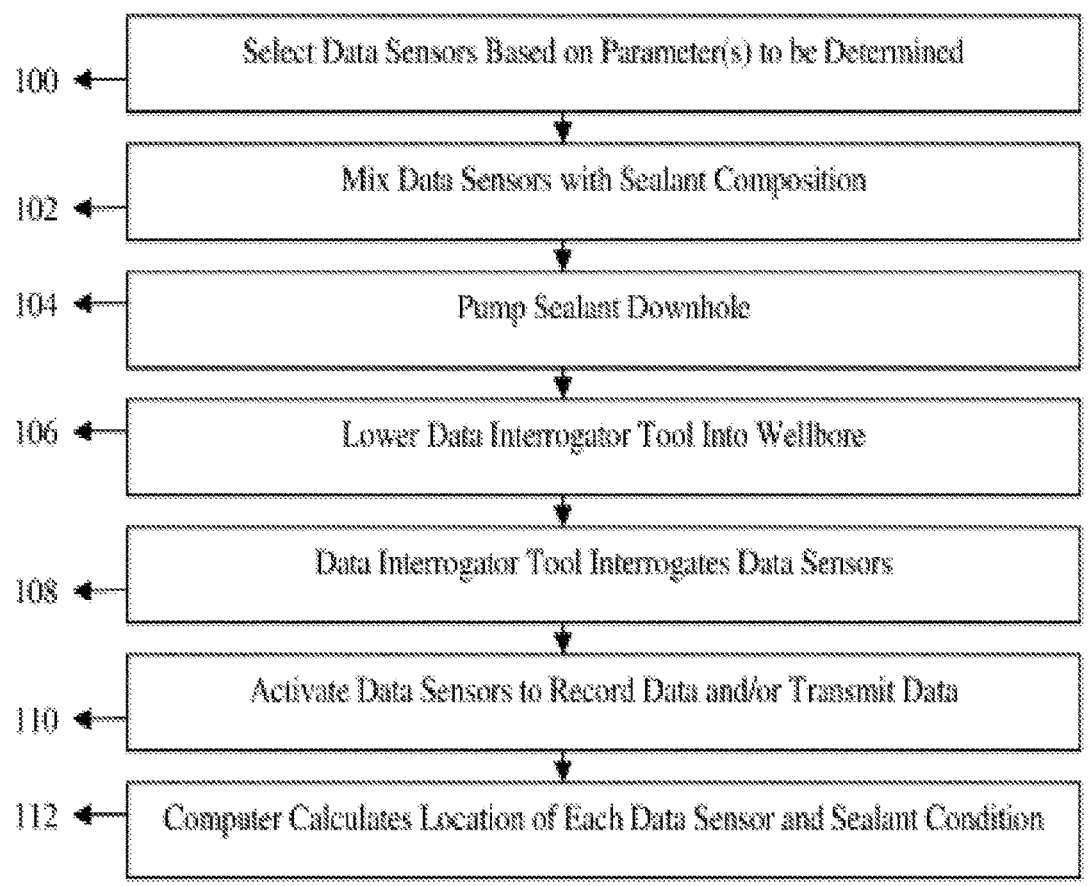
FIG. 1 is a flow chart illustrating a method in accordance with some embodiments.

Disclosed herein are methods for detecting and/or monitoring the position and/or condition of a wellbore, a formation, a wellbore service tool, and/or wellbore compositions, for example wellbore sealants such as cement, using MEMS-based data sensors. Still more particularly, the present disclosure describes methods of monitoring the integrity and performance of wellbore compositions over the life of the well using MEMS-based data sensors. Performance may be indicated by changes, for example, in various parameters, including, but not limited to, moisture content, temperature, pH, and various ion concentrations (e.g., sodium, chloride, and potassium ions) of the cement. In embodiments, the methods comprise the use of embeddable data sensors capable of detecting parameters in a wellbore composition, for example a sealant such as cement. In embodiments, the methods provide for evaluation of sealant during mixing, placement, and/or curing of the sealant within the wellbore. In another embodiment, the method is used for sealant evaluation from placement and curing throughout its useful service life, and where applicable to a period of deterioration and repair. In embodiments, the methods of this disclosure may be used to prolong the service life of the sealant, lower costs, and enhance creation of improved methods of remediation. Additionally, methods are disclosed for determining the location of sealant within a wellbore, such as for determining the location of a cement slurry during primary cementing of a wellbore as discussed further herein. Additional embodiments and methods for employing MEMS-based data sensors in a wellbore are described herein.

The methods disclosed herein comprise the use of various wellbore compositions, including sealants and other wellbore servicing fluids. As used herein, "wellbore composition" includes any composition that may be prepared or otherwise provided at the surface and placed down the wellbore, typically by pumping. As used herein, a "sealant" refers to a fluid used to secure components within a wellbore or to plug or seal a void space within the wellbore. Sealants, and in particular cement slurries and non-cementitious compositions, are used as wellbore compositions in several embodiments described herein, and it is to be understood that the methods described herein are applicable for use with other wellbore compositions. As used herein, "servicing fluid" refers to a fluid used to drill, complete, work over, fracture, repair, treat, or in any way prepare or service a wellbore for the recovery of materials residing in a subterranean formation penetrated by the wellbore. Examples of servicing fluids include, but are not limited to, cement slurries, non-cementitious sealants, drilling fluids or muds, spacer fluids, fracturing fluids or completion fluids, all of which are well known in the art. While fluid is generally understood to encompass material in a pumpable state, reference to a wellbore servicing fluid that is settable or curable (e.g., a sealant such as cement) includes, unless otherwise noted, the fluid in a pumpable and/or set state, as would be understood in the context of a given wellbore servicing operation. Generally, wellbore servicing fluid and wellbore composition may be used interchangeably unless otherwise noted. The servicing fluid is for use in a wellbore that penetrates a subterranean formation. It is to be understood that "subterranean formation" encompasses both areas below exposed earth and areas below earth covered by water such as ocean or fresh water. The wellbore may be a substantially vertical wellbore and/or may contain one or more lateral wellbores, for example as produced via directional drilling. As used herein, components are referred to as being "integrated" if they are formed on a common support structure placed in packaging of relatively small size, or otherwise assembled in close proximity to one another.

Discussion of an embodiment of the method of the present disclosure will now be made with reference to the flowchart of FIG. 1, which includes methods of placing MEMS sensors in a wellbore and gathering data. At block 100, data sensors are selected based on the parameter(s) or other conditions to be determined or sensed within the wellbore. At block 102, a quantity of data sensors is mixed with a wellbore composition, for example a sealant slurry. In embodiments, data sensors are added to a sealant by any methods known to those of skill in the art. For example, the sensors may be mixed with a dry material, mixed with one more liquid components (e.g., water or a non-aqueous fluid), or combinations thereof. The mixing may occur onsite, for example by addition of the sensors into a bulk mixer such as a cement slurry mixer. The sensors may be added directly to the mixer, may be added to one or more component streams and subsequently fed to the mixer, may be added downstream of the mixer, or combinations thereof. In embodiments, data sensors are added after a blending unit and slurry pump, for example, through a lateral by-pass. The sensors may be metered in and mixed at the well site, or may be pre-mixed into the composition (or one or more components thereof) and subsequently transported to the well site. For example, the sensors may be dry mixed with dry cement and transported to the well site where a cement slurry is formed comprising the sensors. Alternatively or additionally, the sensors may be pre-mixed with one or more liquid components (e.g., mix water) and transported to the well site where a cement slurry is formed comprising the sensors. The properties of the wellbore composition or components thereof may be such that the sensors distributed or dispersed therein do not substantially settle during transport or placement.

The wellbore composition, e.g., sealant slurry, is then pumped downhole at block 104, whereby the sensors are positioned within the wellbore. For example, the sensors may extend along all or a portion of the length of the wellbore adjacent the casing. The sealant slurry may be placed downhole as part of a primary cementing, secondary cementing, or other sealant operation as described in more detail herein. At block 106, a data interrogation tool (also referred to as a data interrogator tool, data interrogator, interrogator, interrogation/communication tool or unit, or the like) is positioned in an operable location to gather data from the sensors, for example lowered or otherwise placed within the wellbore proximate the sensors. In various embodiments, one or more data interrogators may be placed downhole (e.g., in a wellbore) prior to, concurrent with, and/or subsequent to placement in the wellbore of a wellbore composition comprising MEMS sensors. At block 108, the data interrogation tool interrogates the data sensors (e.g., by sending out an RF signal) while the data interrogation tool traverses all or a portion of the wellbore containing the sensors. The data sensors are activated to record and/or transmit data at block 110 via the signal from the data interrogation tool. At block 112, the data interrogation tool communicates the data to one or more computer components (e.g., memory and/or microprocessor) that may be located within the tool, at the surface, or both. The data may be used locally or remotely from the tool to calculate the location of each data sensor and correlate the measured parameter(s) to such locations to evaluate sealant performance. Accordingly, the data interrogation tool comprises MEMS sensor interrogation functionality, communication functionality (e.g., transceiver functionality), or both.

Data gathering, as shown in blocks 106 to 112 of FIG. 1, may be carried out at the time of initial placement in the well of the wellbore composition comprising MEMS sensors, for example during drilling (e.g., drilling fluid comprising MEMS sensors) or during cementing (e.g., cement slurry comprising MEMS sensors) as described in more detail below. Additionally or alternatively, data gathering may be carried out at one or more times subsequent to the initial placement in the well of the wellbore composition comprising MEMS sensors. For example, data gathering may be carried out at the time of initial placement in the well of the wellbore composition comprising MEMS sensors or shortly thereafter, to provide a baseline data set. As the well is operated for recovery of natural resources over a period of time, data gathering may be performed additional times, for example at regular maintenance intervals such as every 1 year, 5 years, or 10 years. The data recovered during subsequent monitoring intervals can be compared to the baseline data as well as any other data obtained from previous monitoring intervals, and such comparisons may indicate the overall condition of the wellbore. For example, changes in one or more sensed parameters may indicate one or more problems in the wellbore. Alternatively, consistency or uniformity in sensed parameters may indicate no substantive problems in the wellbore. The data may comprise any combination of parameters sensed by the MEMS sensors as present in the wellbore, including but not limited to temperature, pressure, ion concentration, stress, strain, gas concentration, etc. In an embodiment, data regarding performance of a sealant composition includes cement slurry properties such as density, rate of strength development, thickening time, fluid loss, and hydration properties; plasticity parameters; compressive strength; shrinkage and expansion characteristics; mechanical properties such as Young's Modulus and Poisson's ratio; tensile strength; resistance to ambient conditions downhole such as temperature and chemicals present; or any combination thereof, and such data may be evaluated to determine long term performance of the sealant composition (e.g., detect an occurrence of radial cracks, shear failure, and/or de-bonding within the set sealant composition) in accordance with embodiments set forth in K. Ravi and H. Xenakis, "Cementing Process Optimized to Achieve Zonal Isolation," presented at PETROTECH-2007 Conference, New Delhi, India, which is incorporated herein by reference in its entirety. In an embodiment, data (e.g., sealant parameters) from a plurality of monitoring intervals is plotted over a period of time, and a resultant graph is provided showing an operating or trend line for the sensed parameters. Atypical changes in the graph as indicated for example by a sharp change in slope or a step change on the graph may provide an indication of one or more present problems or the potential for a future problem. Accordingly, remedial and/or preventive treatments or services may be applied to the wellbore to address present or potential problems.

In embodiments, the MEMS sensors are contained within a sealant composition placed substantially within the annular space between a casing and the wellbore wall. That is, substantially all of the MEMS sensors are located within or in close proximity to the annular space. In an embodiment, the wellbore servicing fluid comprising the MEMS sensors (and thus likewise the MEMS sensors) does not substantially penetrate, migrate, or travel into the formation from the wellbore. In an alternative embodiment, substantially all of the MEMS sensors are located within, adjacent to, or in close proximity to the wellbore, for example less than or equal to about 1 foot, 3 feet, 5 feet, or 10 feet from the wellbore. Such adjacent or close proximity positioning of the MEMS sensors with respect to the wellbore is in contrast to placing MEMS sensors in a fluid that is pumped into the formation in large volumes and substantially penetrates, migrates, or travels into or through the formation, for example as occurs with a fracturing fluid or a flooding fluid. Thus, in embodiments, the MEMS sensors are placed proximate or adjacent to the wellbore (in contrast to the formation at large), and provide information relevant to the wellbore itself and compositions (e.g., sealants) used therein (again in contrast to the formation or a producing zone at large). In alternative embodiments, the MEMS sensors are distributed from the wellbore into the surrounding formation (e.g., additionally or alternatively non-proximate or non-adjacent to the wellbore), for example as a component of a fracturing fluid or a flooding fluid described in more detail herein.

In embodiments, the sealant is any wellbore sealant known in the art. Examples of sealants include cementitious and non-cementitious sealants both of which are well known in the art. In embodiments, non-cementitious sealants comprise resin based systems, latex based systems, or combinations thereof. In embodiments, the sealant comprises a cement slurry with styrene-butadiene latex (e.g., as disclosed in U.S. Pat. No. 5,588,488 incorporated by reference herein in its entirety). Sealants may be utilized in setting expandable casing, which is further described below. In other embodiments, the sealant is a cement utilized for primary or secondary wellbore cementing operations, as discussed further below.

In embodiments, the sealant is cementitious and comprises a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Examples of sealants are disclosed in U.S. Pat. Nos. 6,457,524; 7,077,203; and 7,174,962, each of which is incorporated herein by reference in its entirety. In an embodiment, the sealant comprises a sorel cement composition, which typically comprises magnesium oxide and a chloride or phosphate salt which together form for example magnesium oxychloride. Examples of magnesium oxychloride sealants are disclosed in U.S. Pat. Nos. 6,664,215 and 7,044,222, each of which is incorporated herein by reference in its entirety.

The wellbore composition (e.g., sealant) may include a sufficient amount of water to form a pumpable slurry. The water may be fresh water or salt water (e.g., an unsaturated aqueous salt solution or a saturated aqueous salt solution such as brine or seawater). In embodiments, the cement slurry may be a lightweight cement slurry containing foam (e.g., foamed cement) and/or hollow beads/microspheres. In an embodiment, the MEMS sensors are incorporated into or attached to all or a portion of the hollow microspheres. Thus, the MEMS sensors may be dispersed within the cement along with the microspheres. Examples of sealants containing microspheres are disclosed in U.S. Pat. Nos. 4,234,344; 6,457,524; and 7,174,962, each of which is incorporated herein by reference in its entirety. In an embodiment, the MEMS sensors are incorporated into a foamed cement such as those described in more detail in U.S. Pat. Nos. 6,063,738; 6,367,550; 6,547,871; and 7,174,962, each of which is incorporated by reference herein in its entirety.

In some embodiments, additives may be included in the cement composition for improving or changing the properties thereof. Examples of such additives include but are not limited to accelerators, set retarders, defoamers, fluid loss agents, weighting materials, dispersants, density-reducing agents, formation conditioning agents, lost circulation materials, thixotropic agents, suspension aids, or combinations thereof. Other mechanical property modifying additives, for example, fibers, polymers, resins, latexes, and the like can be added to further modify the mechanical properties. These additives may be included singularly or in combination. Methods for introducing these additives and their effective amounts are known to one of ordinary skill in the art.

In embodiments, the MEMS sensors are contained within a wellbore composition that forms a filtercake on the face of the formation when placed downhole. For example, various types of drilling fluids, also known as muds or drill-in fluids have been used in well drilling, such as water-based fluids, oil-based fluids (e.g., mineral oil, hydrocarbons, synthetic oils, esters, etc.), gaseous fluids, or a combination thereof. Drilling fluids typically contain suspended solids. Drilling fluids may form a thin, slick filter cake on the formation face that provides for successful drilling of the wellbore and helps prevent loss of fluid to the subterranean formation. In an embodiment, at least a portion of the MEMS remain associated with the filtercake (e.g., disposed therein) and may provide information as to a condition (e.g., thickness) and/or location of the filtercake. Additionally or in the alternative at least a portion of the MEMS remain associated with drilling fluid and may provide information as to a condition and/or location of the drilling fluid.

In embodiments, the MEMS sensors are contained within a wellbore composition that when placed downhole under suitable conditions induces fractures within the subterranean formation. Hydrocarbon-producing wells often are stimulated by hydraulic fracturing operations, wherein a fracturing fluid may be introduced into a portion of a subterranean formation penetrated by a wellbore at a hydraulic pressure sufficient to create, enhance, and/or extend at least one fracture therein. Stimulating or treating the wellbore in such ways increases hydrocarbon production from the well. In some embodiments, the MEMS sensors may be contained within a wellbore composition that when placed downhole enters and/or resides within one or more fractures within the subterranean formation. In such embodiments, the MEMS sensors provide information as to the location and/or condition of the fluid and/or fracture during and/or after treatment. In an embodiment, at least a portion of the MEMS remain associated with a fracturing fluid and may provide information as to the condition and/or location of the fluid. Fracturing fluids often contain proppants that are deposited within the formation upon placement of the fracturing fluid therein, and in an embodiment a fracturing fluid contains one or more proppants and one or more MEMS. In an embodiment, at least a portion of the MEMS remain associated with the proppants deposited within the formation (e.g., a proppant bed) and may provide information as to the condition (e.g., thickness, density, settling, stratification, integrity, etc.) and/or location of the proppants. Additionally or in the alternative at least a portion of the MEMS remain associated with a fracture (e.g., adhere to and/or retained by a surface of a fracture) and may provide information as to the condition (e.g., length, volume, etc.) and/or location of the fracture. For example, the MEMS sensors may provide information useful for ascertaining the fracture complexity.

In embodiments, the MEMS sensors are contained in a wellbore composition (e.g., gravel pack fluid) which is employed in a gravel packing treatment, and the MEMS may provide information as to the condition and/or location of the wellbore composition during and/or after the gravel packing treatment. Gravel packing treatments are used, inter alia, to reduce the migration of unconsolidated formation particulates into the wellbore. In gravel packing operations, particulates, referred to as gravel, are carried to a wellbore in a subterranean producing zone by a servicing fluid known as carrier fluid. That is, the particulates are suspended in a carrier fluid, which may be viscosified, and the carrier fluid is pumped into a wellbore in which the gravel pack is to be placed. As the particulates are placed in the zone, the carrier fluid leaks off into the subterranean zone and/or is returned to the surface. The resultant gravel pack acts as a filter to separate formation solids from produced fluids while permitting the produced fluids to flow into and through the wellbore. When installing the gravel pack, the gravel is carried to the formation in the form of a slurry by mixing the gravel with a viscosified carrier fluid. Such gravel packs may be used to stabilize a formation while causing minimal impairment to well productivity. The gravel, inter alia, acts to prevent the particulates from occluding the screen or migrating with the produced fluids, and the screen, inter alia, acts to prevent the gravel from entering the wellbore. In an embodiment, the wellbore servicing composition (e.g., gravel pack fluid) comprises a carrier fluid, gravel and one or more MEMS. In an embodiment, at least a portion of the MEMS remain associated with the gravel deposited within the wellbore and/or formation (e.g., a gravel pack/bed) and may provide information as to the condition (e.g., thickness, density, settling, stratification, integrity, etc.) and/or location of the gravel pack/bed.

In various embodiments, the MEMS may provide information as to a location, flow path/profile, volume, density, temperature, pressure, or a combination thereof of a sealant composition, a drilling fluid, a fracturing fluid, a gravel pack fluid, or other wellbore servicing fluid in real time such that the effectiveness of such service may be monitored and/or adjusted during performance of the service to improve the result of same. Accordingly, the MEMS may aid in the initial performance of the wellbore service additionally or alternatively to providing a means for monitoring a wellbore condition or performance of the service over a period of time (e.g., over a servicing interval and/or over the life of the well). For example, the one or more MEMS sensors may be used in monitoring a gas or a liquid produced from the subterranean formation. MEMS present in the wellbore and/or formation may be used to provide information as to the condition (e.g., temperature, pressure, flow rate, composition, etc.) and/or location of a gas or liquid produced from the subterranean formation. In an embodiment, the MEMS provide information regarding the composition of a produced gas or liquid. For example, the MEMS may be used to monitor an amount of water produced in a hydrocarbon producing well (e.g., amount of water present in hydrocarbon gas or liquid), an amount of undesirable components or contaminants in a produced gas or liquid (e.g., sulfur, carbon dioxide, hydrogen sulfide, etc. present in hydrocarbon gas or liquid), or a combination thereof.

In embodiments, the data sensors added to the wellbore composition, e.g., sealant slurry, etc., are passive sensors that do not require continuous power from a battery or an external source in order to transmit real-time data. In embodiments, the data sensors are micro-electromechanical systems (MEMS) comprising one or more (and typically a plurality of) MEMS devices, referred to herein as MEMS sensors. MEMS devices are well known, e.g., a semiconductor device with mechanical features on the micrometer scale. MEMS embody the integration of mechanical elements, sensors, actuators, and electronics on a common substrate. In embodiments, the substrate comprises silicon. MEMS elements include mechanical elements which are movable by an input energy (electrical energy or other type of energy). Using MEMS, a sensor may be designed to emit a detectable signal based on a number of physical phenomena, including thermal, biological, optical, chemical, and magnetic effects or stimulation. MEMS devices are minute in size, have low power requirements, are relatively inexpensive and are rugged, and thus are well suited for use in wellbore servicing operations.

In embodiments, the MEMS sensors added to a wellbore servicing fluid may be active sensors, for example powered by an internal battery that is rechargeable or otherwise powered and/or recharged by other downhole power sources such as heat capture/transfer and/or fluid flow, as described in more detail herein.

In embodiments, the data sensors comprise an active material connected to (e.g., mounted within or mounted on the surface of) an enclosure, the active material being liable to respond to a wellbore parameter, and the active material being operably connected to (e.g., in physical contact with, surrounding, or coating) a capacitive MEMS element. In various embodiments, the MEMS sensors sense one or more parameters within the wellbore. In an embodiment, the parameter is temperature. Alternatively, the parameter is pH. Alternatively, the parameter is moisture content. Still alternatively, the parameter may be ion concentration (e.g., chloride, sodium, and/or potassium ions). The MEMS sensors may also sense well cement characteristic data such as stress, strain, or combinations thereof. In embodiments, the MEMS sensors of the present disclosure may comprise active materials that respond to two or more measurands. In such a way, two or more parameters may be monitored.

In addition or in the alternative, a MEMS sensor incorporated within one or more of the wellbore compositions disclosed herein may provide information that allows a condition (e.g., thickness, density, volume, settling, stratification, etc.) and/or location of the composition within the subterranean formation to be detected.

Suitable active materials, such as dielectric materials, that respond in a predictable and stable manner to changes in parameters over a long period may be identified according to methods well known in the art, for example see, e.g., Ong, Zeng and Grimes. "A Wireless, Passive Carbon Nanotube-based Gas Sensor," IEEE Sensors Journal, 2, 2, (2002) 82-88; Ong, Grimes, Robbins and Singl, "Design and application of a wireless, passive, resonant-circuit environmental monitoring sensor," Sensors and Actuators A, 93 (2001) 33-43, each of which is incorporated by reference herein in its entirety. MEMS sensors suitable for the methods of the present disclosure that respond to various wellbore parameters are disclosed in U.S. Pat. No. 7,038,470 B1 that is incorporated herein by reference in its entirety.

In embodiments, the MEMS sensors are coupled with radio frequency identification devices (RFIDs) and can thus detect and transmit parameters and/or well cement characteristic data for monitoring the cement during its service life. RFIDs combine a microchip with an antenna (the RFID chip and the antenna are collectively referred to as the "transponder" or the "tag"). The antenna provides the RFID chip with power when exposed to a narrow band, high frequency electromagnetic field from a transceiver. A dipole antenna or a coil, depending on the operating frequency, connected to the RFID chip, powers the transponder when current is induced in the antenna by an RF signal from the transceiver's antenna. Such a device can return a unique identification "ID" number by modulating and re-radiating the radio frequency (RF) wave. Passive RF tags are gaining widespread use due to their low cost, indefinite life, simplicity, efficiency, ability to identify parts at a distance without contact (tether-free information transmission ability). These robust and tiny tags are attractive from an environmental standpoint, as they require no battery. The MEMS sensor and RFID tag are preferably integrated into a single component (e.g., chip or substrate), or may alternatively be separate components operably coupled to each other. In an embodiment, an integrated, passive MEMS/RFID sensor contains a data sensing component, an optional memory, and an RFID antenna, whereby excitation energy is received and powers up the sensor, thereby sensing a present condition and/or accessing one or more stored sensed conditions from memory and transmitting same via the RFID antenna.

In embodiments, MEMS sensors having different RFID tags, i.e., antennas that respond to RF waves of different frequencies and power the RFID chip in response to exposure to RF waves of different frequencies may be added to different wellbore compositions. Within the United States, commonly used operating bands for RFID systems center on one of the three government assigned frequencies: 125 kHz, 13.56 MHz or 2.45 GHz. A fourth frequency, 27.125 MHz, has also been assigned. When the 2.45 GHz carrier frequency is used, the range of an RFID chip can be many meters. While this is useful for remote sensing, there may be multiple transponders within the RF field. In order to prevent these devices from interacting and garbling the data, anti-collision schemes are used, as are known in the art. In embodiments, the data sensors are integrated with local tracking hardware to transmit their position as they flow within a wellbore composition such as a sealant slurry.

The data sensors may form a network using wireless links to neighboring data sensors and have location and positioning capability through, for example, local positioning algorithms as are known in the art. The sensors may organize themselves into a network by listening to one another, therefore allowing communication of signals from the farthest sensors towards the sensors closest to the interrogator to allow uninterrupted transmission and capture of data. In such embodiments, the interrogator tool may not need to traverse the entire section of the wellbore containing MEMS sensors in order to read data gathered by such sensors. For example, the interrogator tool may only need to be lowered about half-way along the vertical length of the wellbore containing MEMS sensors. Alternatively, the interrogator tool may be lowered vertically within the wellbore to a location adjacent to a horizontal arm of a well, whereby MEMS sensors located in the horizontal arm may be read without the need for the interrogator tool to traverse the horizontal arm. Alternatively, the interrogator tool may be used at or near the surface and read the data gathered by the sensors distributed along all or a portion of the wellbore. For example, sensors located a distance away from the interrogator (e.g., at an opposite end of a length of casing or tubing) may communicate via a network formed by the sensors as described previously.

In embodiments, the MEMS sensors are ultra-small, e.g., 3 mm$^2$, such that they are pumpable in a sealant slurry. In embodiments, the MEMS device is approximately 0.01 mm$^2$ to 1 mm$^2$, alternatively 1 mm$^2$ to 3 mm$^2$, alternatively 3 mm$^2$ to 5 mm$^2$, or alternatively 5 mm$^2$ to 10 mm$^2$. In embodiments, the data sensors are capable of providing data throughout the cement service life. In embodiments, the data sensors are capable of providing data for up to 100 years. In an embodiment, the wellbore composition comprises an amount of MEMS effective to measure one or more desired parameters. In various embodiments, the wellbore composition comprises an effective amount of MEMS such that sensed readings may be obtained at intervals of about 1 foot, alternatively about 6 inches, or alternatively about 1 inch, along the portion of the wellbore containing the MEMS. In an embodiment, the MEMS sensors may be present in the wellbore composition in an amount of from about 0.001 to about 10 weight percent. Alternatively, the MEMS may be present in the wellbore composition in an amount of from about 0.01 to about 5 weight percent. In embodiments, the sensors may have dimensions (e.g., diameters or other dimensions) that range from nanoscale, e.g., about 1 to 1000 nm (e.g., NEMS), to a micrometer range, e.g., about 1 to 1000 μm (e.g., MEMS), or alternatively any size from about 1 nm to about 1 mm. In embodiments, the MEMS sensors may be present in the wellbore composition in an amount of from about 5 volume percent to about 30 volume percent.

In various embodiments, the size and/or amount of sensors present in a wellbore composition (e.g., the sensor loading or concentration) may be selected such that the resultant wellbore servicing composition is readily pumpable without damaging the sensors and/or without having the sensors undesirably settle out (e.g., screen out) in the pumping equipment (e.g., pumps, conduits, tanks, etc.) and/or upon placement in the wellbore. Also, the concentration/loading of the sensors within the wellbore servicing fluid may be selected to provide a sufficient average distance between sensors to allow for networking of the sensors (e.g., daisy-chaining) in embodiments using such networks, as described in more detail herein. For example, such distance may be a percentage of the average communication distance for a given sensor type. By way of example, a given sensor having a 2 inch communication range in a given wellbore composition should be loaded into the wellbore composition in an amount that the average distance between sensors in less than 2 inches (e.g., less than 1.9, 1.8, 1.7, 1.6, 1.5, 1.4, 1.3, 1.2, 1.1, 1.0, etc. inches). The size of sensors and the amount may be selected so that they are stable, do not float or sink, in the well treating fluid. The size of the sensor could range from nano size to microns. In some embodiments, the sensors may be nanoelectromechanical systems (NEMS), MEMS, or combinations thereof. Unless otherwise indicated herein, it should be understood that any suitable micro and/or nano sized sensors or combinations thereof may be employed. The embodiments disclosed herein should not otherwise be limited by the specific type of micro and/or nano sensor employed unless otherwise indicated or prescribed by the functional requirements thereof, and specifically NEMS may be used in addition to or in lieu of MEMS sensors in the various embodiments disclosed herein.

In embodiments, the MEMS sensors comprise passive (remain unpowered when not being interrogated) sensors energized by energy radiated from a data interrogation tool. The data interrogation tool may comprise an energy transceiver sending energy (e.g., radio waves) to and receiving signals from the MEMS sensors and a processor processing the received signals. The data interrogation tool may further comprise a memory component, a communications component, or both. The memory component may store raw and/or processed data received from the MEMS sensors, and the communications component may transmit raw data to the processor and/or transmit processed data to another receiver, for example located at the surface. The tool components (e.g., transceiver, processor, memory component, and communications component) are coupled together and in signal communication with each other.

In an embodiment, one or more of the data interrogator components may be integrated into a tool or unit that is temporarily or permanently placed downhole (e.g., a downhole module), for example prior to, concurrent with, and/or subsequent to placement of the MEMS sensors in the wellbore. In an embodiment, a removable downhole module comprises a transceiver and a memory component, and the downhole module is placed into the wellbore, reads data from the MEMS sensors, stores the data in the memory component, is removed from the wellbore, and the raw data is accessed. Alternatively, the removable downhole module may have a processor to process and store data in the memory component, which is subsequently accessed at the surface when the tool is removed from the wellbore. Alternatively, the removable downhole module may have a communications component to transmit raw data to a processor and/or transmit processed data to another receiver, for example located at the surface. The communications component may communicate via wired or wireless communications. For example, the downhole component may communicate with a component or other node on the surface via a network of MEMS sensors, or cable or other communications/telemetry device such as a radio frequency, electromagnetic telemetry device or an acoustic telemetry device. The removable downhole component may be intermittently positioned downhole via any suitable conveyance, for example wire-line, coiled tubing, straight tubing, gravity, pumping, etc., to monitor conditions at various times during the life of the well.

In embodiments, the data interrogation tool comprises a permanent or semi-permanent downhole component that remains downhole for extended periods of time. For example, a semi-permanent downhole module may be retrieved and data downloaded once every few months or years. Alternatively, a permanent downhole module may remain in the well throughout the service life of well. In an embodiment, a permanent or semi-permanent downhole module comprises a transceiver and a memory component, and the downhole module is placed into the wellbore, reads data from the MEMS sensors, optionally stores the data in the memory component, and transmits the read and optionally stored data to the surface. Alternatively, the permanent or semi-permanent downhole module may have a processor to process and sensed data into processed data, which may be stored in memory and/or transmit to the surface. The permanent or semi-permanent downhole module may have a communications component to transmit raw data to a processor and/or transmit processed data to another receiver, for example located at the surface. The communications component may communicate via wired or wireless communications. For example, the downhole component may communicate with a component or other node on the surface via a network of MEMS sensors, or a cable or other communications/telemetry device such as a radio frequency, electromagnetic telemetry device or an acoustic telemetry device.

In embodiments, the data interrogation tool comprises an RF energy source incorporated into its internal circuitry and the data sensors are passively energized using an RF antenna, which picks up energy from the RF energy source. In an embodiment, the data interrogation tool is integrated with an RF transceiver. In embodiments, the MEMS sensors (e.g., MEMS/RFID sensors) are empowered and interrogated by the RF transceiver from a distance, for example a distance of greater than 10 m, or alternatively from the surface or from an adjacent offset well. In an embodiment, the data interrogation tool traverses within a casing in the well and reads MEMS sensors located in a wellbore servicing fluid or composition, for example a sealant (e.g., cement) sheath surrounding the casing, located in the annular space between the casing and the wellbore wall. In embodiments, the interrogator senses the MEMS sensors when in close proximity with the sensors, typically via traversing a removable downhole component along a length of the wellbore comprising the MEMS sensors. In an embodiment, close proximity comprises a radial distance from a point within the casing to a planar point within an annular space between the casing and the wellbore. In embodiments, close proximity comprises a distance of 0.1 m to 1 m. Alternatively, close proximity comprises a distance of 1 m to 5 m. Alternatively, close proximity comprises a distance of from 5 m to 10 m. In embodiments, the transceiver interrogates the sensor with RF energy at 125 kHz and close proximity comprises 0.1 m to 5 m. Alternatively, the transceiver interrogates the sensor with RF energy at 13.5 MHz and close proximity comprises 0.05 m to 0.5 m. Alternatively, the transceiver interrogates the sensor with RF energy at 915 MHz and close proximity comprises 0.03 m to 0.1 m. Alternatively, the transceiver interrogates the sensor with RF energy at 2.4 GHz and close proximity comprises 0.01 m to 0.05 m.

In embodiments, the MEMS sensors incorporated into wellbore cement and used to collect data during and/or after cementing the wellbore. The data interrogation tool may be positioned downhole prior to and/or during cementing, for example integrated into a component such as casing, casing attachment, plug, cement shoe, or expanding device. Alternatively, the data interrogation tool is positioned downhole upon completion of cementing, for example conveyed downhole via wireline. The cementing methods disclosed herein may optionally comprise the step of foaming the cement composition using a gas such as nitrogen or air. The foamed cement compositions may comprise a foaming surfactant and optionally a foaming stabilizer. The MEMS sensors may be incorporated into a sealant composition and placed downhole, for example during primary cementing (e.g., conventional or reverse circulation cementing), secondary cementing (e.g., squeeze cementing), or other sealing operation (e.g., behind an expandable casing).

In primary cementing, cement is positioned in a well bore to isolate an adjacent portion of the subterranean formation and provide support to an adjacent conduit (e.g., casing). The cement forms a barrier that prevents fluids (e.g., water or hydrocarbons) in the subterranean formation from migrating into adjacent zones or other subterranean formations. In embodiments, the wellbore in which the cement is positioned belongs to a horizontal or multilateral wellbore configuration. It is to be understood that a multilateral wellbore configuration includes at least two principal wellbores connected by one or more ancillary wellbores.

Figure 2:
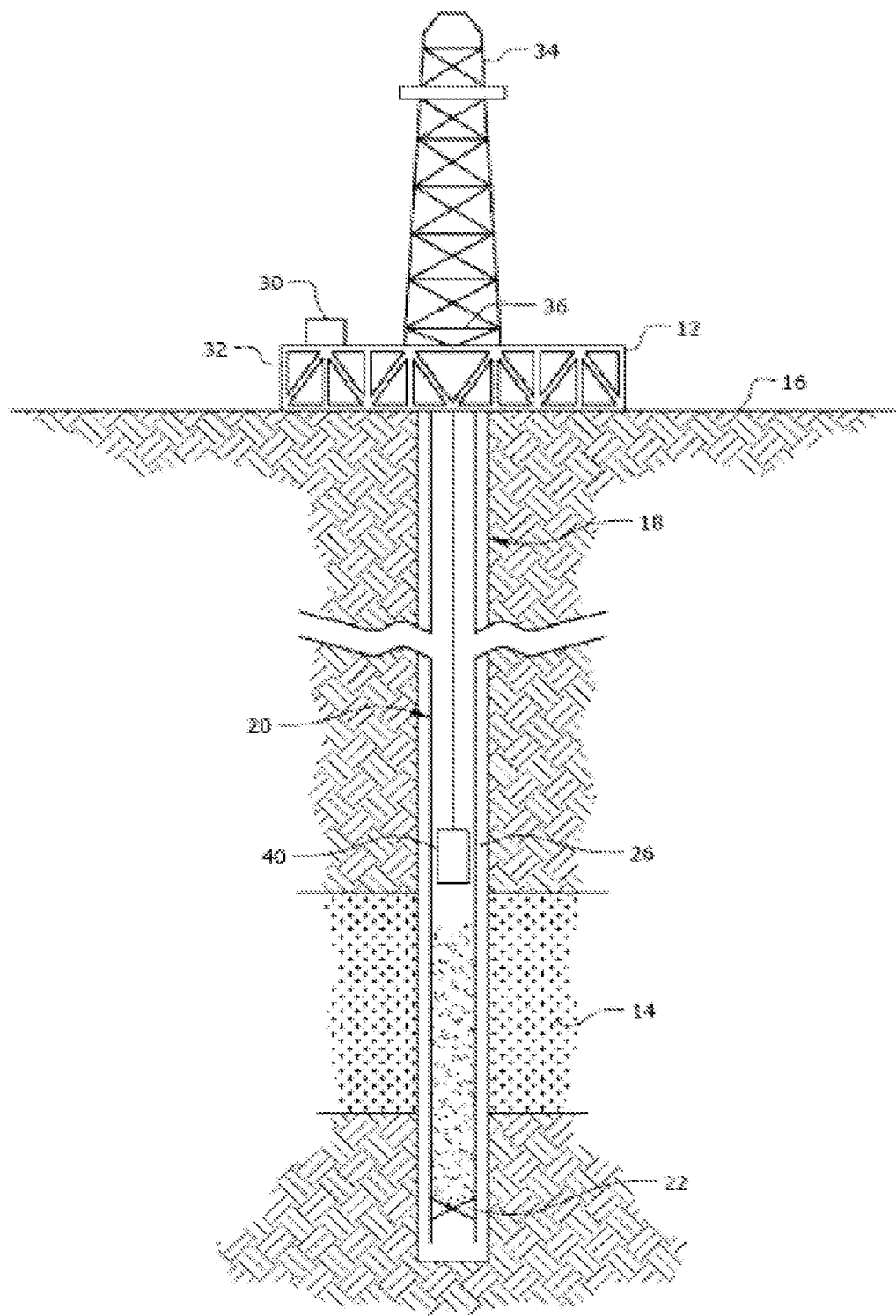
FIG. 2 is a schematic of a typical onshore oil or gas drilling rig and wellbore in accordance with some embodiments.

FIG. 2, which shows a typical onshore oil or gas drilling rig and wellbore, will be used to clarify the methods of the present disclosure, with the understanding that the present disclosure is likewise applicable to offshore rigs and wellbores. Rig 12 is centered over a subterranean oil or gas formation 14 located below the earth's surface 16. Rig 12 includes a work deck 32 that supports a derrick 34. Derrick 34 supports a hoisting apparatus 36 for raising and lowering pipe strings such as casing 20. Pump 30 is capable of pumping a variety of wellbore compositions (e.g., drilling fluid or cement) into the well and includes a pressure measurement device that provides a pressure reading at the pump discharge. Wellbore 18 has been drilled through the various earth strata, including formation 14. Upon completion of wellbore drilling, casing 20 is often placed in the wellbore 18 to facilitate the production of oil and gas from the formation 14. Casing 20 is a string of pipes that extends down wellbore 18, through which oil and gas will eventually be extracted. A cement or casing shoe 22 is typically attached to the end of the casing string when the casing string is run into the wellbore. Casing shoe 22 guides casing 20 toward the center of the hole and minimizes problems associated with hitting rock ledges or washouts in wellbore 18 as the casing string is lowered into the well. Casing shoe, 22, may be a guide shoe or a float shoe, and typically comprises a tapered, often bullet-nosed piece of equipment found on the bottom of casing string 20. Casing shoe, 22, may be a float shoe fitted with an open bottom and a valve that serves to prevent reverse flow, or U-tubing, of cement slurry from annulus 26 into casing 20 as casing 20 is run into wellbore 18. The region between casing 20 and the wall of wellbore 18 is known as the casing annulus 26. To fill up casing annulus 26 and secure casing 20 in place, casing 20 is usually "cemented" in wellbore 18, which is referred to as "primary cementing." A data interrogator tool 40 is shown in the wellbore 18.

In an embodiment, the method of this disclosure is used for monitoring primary cement during and/or subsequent to a conventional primary cementing operation. In this conventional primary cementing embodiment, MEMS sensors are mixed into a cement slurry, block 102 of FIG. 1, and the cement slurry is then pumped down the inside of casing 20, block 104 of FIG. 1. As the slurry reaches the bottom of casing 20, it flows out of casing 20 and into casing annulus 26 between casing 20 and the wall of wellbore 18. As cement slurry flows up annulus 26, it displaces any fluid in the wellbore. To ensure no cement remains inside casing 20, devices called "wipers" may be pumped by a wellbore servicing fluid (e.g., drilling mud) through casing 20 behind the cement. As described in more detail herein, the wellbore servicing fluids such as the cement slurry and/or wiper conveyance fluid (e.g., drilling mud) may contain MEMS sensors which aid in detection and/or positioning of the wellbore servicing fluid and/or a mechanical component such as a wiper plug, casing shoe, etc. The wiper contacts the inside surface of casing 20 and pushes any remaining cement out of casing 20. When cement slurry reaches the earth's surface 16, and annulus 26 is filled with slurry, pumping is terminated and the cement is allowed to set. The MEMS sensors of the present disclosure may also be used to determine one or more parameters during placement and/or curing of the cement slurry. Also, the MEMS sensors of the present disclosure may also be used to determine completion of the primary cementing operation, as further discussed herein below.

Referring back to FIG. 1, during cementing, or subsequent the setting of cement, a data interrogation tool may be positioned in wellbore 18, as at block 106 of FIG. 1. For example, the wiper may be equipped with a data interrogation tool and may read data from the MEMS while being pumped downhole and transmit same to the surface. Alternatively, an interrogator tool may be run into the wellbore following completion of cementing a segment of casing, for example as part of the drill string during resumed drilling operations. Alternatively, the interrogator tool may be run downhole via a wireline or other conveyance. The data interrogation tool may then be signaled to interrogate the sensors (block 108 of FIG. 1) whereby the sensors are activated to record and/or transmit data, block 110 of FIG. 1. The data interrogation tool communicates the data to a processor 112 whereby data sensor (and likewise cement slurry) position and cement integrity may be determined via analyzing sensed parameters for changes, trends, expected values, etc. For example, such data may reveal conditions that may be adverse to cement curing. The sensors may provide a temperature profile over the length of the cement sheath, with a uniform temperature profile likewise indicating a uniform cure (e.g., produced via heat of hydration of the cement during curing) or a change in temperature might indicate the influx of formation fluid (e.g., presence of water and/or hydrocarbons) that may degrade the cement during the transition from slurry to set cement. Alternatively, such data may indicate a zone of reduced, minimal, or missing sensors, which would indicate a loss of cement corresponding to the area (e.g., a loss/void zone or water influx/washout). Such methods may be available with various cement techniques described herein such as conventional or reverse primary cementing.

Due to the high pressure at which the cement is pumped during conventional primary cementing (pump down the casing and up the annulus), fluid from the cement slurry may leak off into existing low pressure zones traversed by the wellbore. This may adversely affect the cement, and incur undesirable expense for remedial cementing operations (e.g., squeeze cementing as discussed below) to position the cement in the annulus. Such leak off may be detected via the present disclosure as described previously. Additionally, conventional circulating cementing may be time-consuming, and therefore relatively expensive, because cement is pumped all the way down casing 20 and back up annulus 26.

One method of avoiding problems associated with conventional primary cementing is to employ reverse circulation primary cementing. Reverse circulation cementing is a term of art used to describe a method where a cement slurry is pumped down casing annulus 26 instead of into casing 20. The cement slurry displaces any fluid as it is pumped down annulus 26. Fluid in the annulus is forced down annulus 26, into casing 20 (along with any fluid in the casing), and then back up to earth's surface 16. When reverse circulation cementing, casing shoe 22 comprises a valve that is adjusted to allow flow into casing 20 and then sealed after the cementing operation is complete. Once slurry is pumped to the bottom of casing 20 and fills annulus 26, pumping is terminated and the cement is allowed to set in annulus 26. Examples of reverse cementing applications are disclosed in U.S. Pat. Nos. 6,920,929 and 6,244,342, each of which is incorporated herein by reference in its entirety.

In embodiments of the present disclosure, sealant slurries comprising MEMS data sensors are pumped down the annulus in reverse circulation applications, a data interrogator is located within the wellbore (e.g., integrated into the casing shoe) and sealant performance is monitored as described with respect to the conventional primary sealing method disclosed hereinabove. Additionally, the data sensors of the present disclosure may also be used to determine completion of a reverse circulation operation, as further discussed below.

Secondary cementing within a wellbore may be carried out subsequent to primary cementing operations. A common example of secondary cementing is squeeze cementing wherein a sealant such as a cement composition is forced under pressure into one or more permeable zones within the wellbore to seal such zones. Examples of such permeable zones include fissures, cracks, fractures, streaks, flow channels, voids, high permeability streaks, annular voids, or combinations thereof. The permeable zones may be present in the cement column residing in the annulus, a wall of the conduit in the wellbore, a microannulus between the cement column and the subterranean formation, and/or a microannulus between the cement column and the conduit. The sealant (e.g., secondary cement composition) sets within the permeable zones, thereby forming a hard mass to plug those zones and prevent fluid from passing therethrough (i.e., prevents communication of fluids between the wellbore and the formation via the permeable zone). Various procedures that may be followed to use a sealant composition in a wellbore are described in U.S. Pat. No. 5,346,012, which is incorporated by reference herein in its entirety. In various embodiments, a sealant composition comprising MEMS sensors is used to repair holes, channels, voids, and microannuli in casing, cement sheath, gravel packs, and the like as described in U.S. Pat. Nos. 5,121,795; 5,123,487; and 5,127,473, each of which is incorporated by reference herein in its entirety.

In embodiments, the method of the present disclosure may be employed in a secondary cementing operation. In these embodiments, data sensors are mixed with a sealant composition (e.g., a secondary cement slurry) at block 102 of FIG. 1 and subsequent or during positioning and hardening of the cement, the sensors are interrogated to monitor the performance of the secondary cement in an analogous manner to the incorporation and monitoring of the data sensors in primary cementing methods disclosed hereinabove. For example, the MEMS sensors may be used to verify that the secondary sealant is functioning properly and/or to monitor its long-term integrity.

In embodiments, the methods of the present disclosure are utilized for monitoring cementitious sealants (e.g., hydraulic cement), non-cementitious (e.g., polymer, latex or resin systems), or combinations thereof, which may be used in primary, secondary, or other sealing applications. For example, expandable tubulars such as pipe, pipe string, casing, liner, or the like are often sealed in a subterranean formation. The expandable tubular (e.g., casing) is placed in the wellbore, a sealing composition is placed into the wellbore, the expandable tubular is expanded, and the sealing composition is allowed to set in the wellbore. For example, after expandable casing is placed downhole, a mandrel may be run through the casing to expand the casing diametrically, with expansions up to 25% possible. The expandable tubular may be placed in the wellbore before or after placing the sealing composition in the wellbore. The expandable tubular may be expanded before, during, or after the set of the sealing composition. When the tubular is expanded during or after the set of the sealing composition, resilient compositions will remain competent due to their elasticity and compressibility. Additional tubulars may be used to extend the wellbore into the subterranean formation below the first tubular as is known to those of skill in the art. Sealant compositions and methods of using the compositions with expandable tubulars are disclosed in U.S. Pat. Nos. 6,722,433 and 7,040,404 and U.S. Pat. Pub. No. 2004/0167248, each of which is incorporated by reference herein in its entirety. In expandable tubular embodiments, the sealants may comprise compressible hydraulic cement compositions and/or non-cementitious compositions.

Compressible hydraulic cement compositions have been developed which remain competent (continue to support and seal the pipe) when compressed, and such compositions may comprise MEMS sensors. The sealant composition is placed in the annulus between the wellbore and the pipe or pipe string, the sealant is allowed to harden into an impermeable mass, and thereafter, the expandable pipe or pipe string is expanded whereby the hardened sealant composition is compressed. In embodiments, the compressible foamed sealant composition comprises a hydraulic cement, a rubber latex, a rubber latex stabilizer, a gas and a mixture of foaming and foam stabilizing surfactants. Suitable hydraulic cements include, but are not limited to, Portland cement and calcium aluminate cement.

Often, non-cementitious resilient sealants with comparable strength to cement, but greater elasticity and compressibility, are required for cementing expandable casing. In embodiments, these sealants comprise polymeric sealing compositions, and such compositions may comprise MEMS sensors. In an embodiment, the sealants composition comprises a polymer and a metal containing compound. In embodiments, the polymer comprises copolymers, terpolymers, and interpolymers. The metal-containing compounds may comprise zinc, tin, iron, selenium magnesium, chromium, or cadmium. The compounds may be in the form of an oxide, carboxylic acid salt, a complex with dithiocarbamate ligand, or a complex with mercaptobenzothiazole ligand. In embodiments, the sealant comprises a mixture of latex, dithio carbamate, zinc oxide, and sulfur.

In embodiments, the methods of the present disclosure comprise adding data sensors to a sealant to be used behind expandable casing to monitor the integrity of the sealant upon expansion of the casing and during the service life of the sealant. In this embodiment, the sensors may comprise MEMS sensors capable of measuring, for example moisture and/or temperature change. If the sealant develops cracks, water influx may thus be detected via moisture and/or temperature indication.

In an embodiment, the MEMS sensors are added to one or more wellbore servicing compositions used or placed downhole in drilling or completing a monodiameter wellbore as disclosed in U.S. Pat. No. 7,066,284 and U.S. Pat. Pub. No. 2005/0241855, each of which is incorporated by reference herein in its entirety. In an embodiment, the MEMS sensors are included in a chemical casing composition used in a monodiameter wellbore. In another embodiment, the MEMS sensors are included in compositions (e.g., sealants) used to place expandable casing or tubulars in a monodiameter wellbore. Examples of chemical casings are disclosed in U.S. Pat. Nos. 6,702,044; 6,823,940; and 6,848,519, each of which is incorporated herein by reference in its entirety.

In one embodiment, the MEMS sensors are used to gather data, e.g., sealant data, and monitor the long-term integrity of the wellbore composition, e.g., sealant composition, placed in a wellbore, for example a wellbore for the recovery of natural resources such as water or hydrocarbons or an injection well for disposal or storage. In an embodiment, data/information gathered and/or derived from MEMS sensors in a downhole wellbore composition e.g., sealant composition, comprises at least a portion of the input and/or output to into one or more calculators, simulations, or models used to predict, select, and/or monitor the performance of wellbore compositions e.g., sealant compositions, over the life of a well. Such models and simulators may be used to select a wellbore composition, e.g., sealant composition, comprising MEMS for use in a wellbore. After placement in the wellbore, the MEMS sensors may provide data that can be used to refine, recalibrate, or correct the models and simulators. Furthermore, the MEMS sensors can be used to monitor and record the downhole conditions that the composition, e.g., sealant, is subjected to, and composition, e.g., sealant, performance may be correlated to such long term data to provide an indication of problems or the potential for problems in the same or different wellbores. In various embodiments, data gathered from MEMS sensors is used to select a wellbore composition, e.g., sealant composition, or otherwise evaluate or monitor such sealants, as disclosed in U.S. Pat. Nos. 6,697,738; 6,922,637; and 7,133,778, each of which is incorporated by reference herein in its entirety.

In an embodiment, the compositions and methodologies of this disclosure are employed in an operating environment that generally comprises a wellbore that penetrates a subterranean formation for the purpose of recovering hydrocarbons, storing hydrocarbons, injection of carbon dioxide, storage of carbon dioxide, disposal of carbon dioxide, and the like, and the MEMS located downhole (e.g., within the wellbore and/or surrounding formation) may provide information as to a condition and/or location of the composition and/or the subterranean formation. For example, the MEMS may provide information as to a location, flow path/profile, volume, density, temperature, pressure, or a combination thereof of a hydrocarbon (e.g., natural gas stored in a salt dome) or carbon dioxide placed in a subterranean formation such that effectiveness of the placement may be monitored and evaluated, for example detecting leaks, determining remaining storage capacity in the formation, etc. In some embodiments, the compositions of this disclosure are employed in an enhanced oil recovery operation wherein a wellbore that penetrates a subterranean formation may be subjected to the injection of gases (e.g., carbon dioxide) so as to improve hydrocarbon recovery from said wellbore, and the MEMS may provide information as to a condition and/or location of the composition and/or the subterranean formation. For example, the MEMS may provide information as to a location, flow path/profile, volume, density, temperature, pressure, or a combination thereof of carbon dioxide used in a carbon dioxide flooding enhanced oil recovery operation in real time such that the effectiveness of such operation may be monitored and/or adjusted in real time during performance of the operation to improve the result of same.

Figure 4:
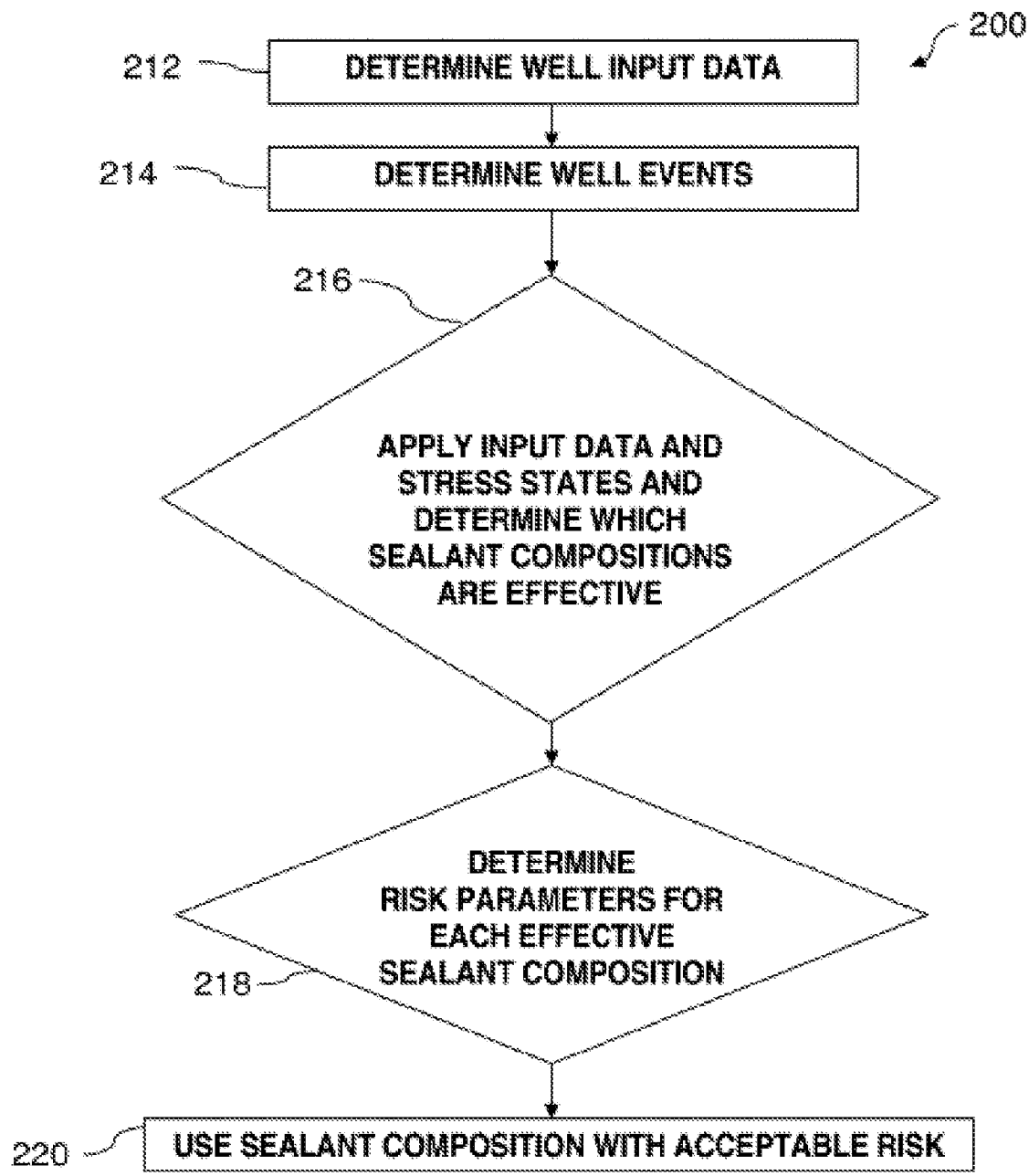
FIG. 4 is a flow chart illustrating a method for selecting between a group of sealant compositions in accordance with some embodiments.

Referring to FIG. 4, a method 200 for selecting a sealant (e.g., a cementing composition) for sealing a subterranean zone penetrated by a wellbore according to the present embodiment basically comprises determining a group of effective compositions from a group of compositions given estimated conditions experienced during the life of the well, and estimating the risk parameters for each of the group of effective compositions. In an alternative embodiment, actual measured conditions experienced during the life of the well, in addition to or in lieu of the estimated conditions, may be used. Such actual measured conditions may be obtained for example via sealant compositions comprising MEMS sensors as described herein. Effectiveness considerations include concerns that the sealant composition be stable under downhole conditions of pressure and temperature, resist downhole chemicals, and possess the mechanical properties to withstand stresses from various downhole operations to provide zonal isolation for the life of the well.

In step 212, well input data for a particular well is determined. Well input data includes routinely measurable or calculable parameters inherent in a well, including vertical depth of the well, overburden gradient, pore pressure, maximum and minimum horizontal stresses, hole size, casing outer diameter, casing inner diameter, density of drilling fluid, desired density of sealant slurry for pumping, density of completion fluid, and top of sealant. As will be discussed in greater detail with reference to step 214, the well can be computer modeled. In modeling, the stress state in the well at the end of drilling, and before the sealant slurry is pumped into the annular space, affects the stress state for the interface boundary between the rock and the sealant composition. Thus, the stress state in the rock with the drilling fluid is evaluated, and properties of the rock such as Young's modulus, Poisson's ratio, and yield parameters are used to analyze the rock stress state. These terms and their methods of determination are well known to those skilled in the art. It is understood that well input data will vary between individual wells. In an alternative embodiment, well input data includes data that is obtained via sealant compositions comprising MEMS sensors as described herein.

In step 214, the well events applicable to the well are determined. For example, cement hydration (setting) is a well event. Other well events include pressure testing, well completions, hydraulic fracturing, hydrocarbon production, fluid injection, perforation, subsequent drilling, formation movement as a result of producing hydrocarbons at high rates from unconsolidated formation, and tectonic movement after the sealant composition has been pumped in place. Well events include those events that are certain to happen during the life of the well, such as cement hydration, and those events that are readily predicted to occur during the life of the well, given a particular well's location, rock type, and other factors well known in the art. In an embodiment, well events and data associated therewith may be obtained via sealant compositions comprising MEMS sensors as described herein.

Each well event is associated with a certain type of stress, for example, cement hydration is associated with shrinkage, pressure testing is associated with pressure, well completions, hydraulic fracturing, and hydrocarbon production are associated with pressure and temperature, fluid injection is associated with temperature, formation movement is associated with load, and perforation and subsequent drilling are associated with dynamic load. As can be appreciated, each type of stress can be characterized by an equation for the stress state (collectively "well event stress states"), as described in more detail in U.S. Pat. No. 7,133,778 which is incorporated herein by reference in its entirety.

In step 216, the well input data, the well event stress states, and the sealant data are used to determine the effect of well events on the integrity of the sealant sheath during the life of the well for each of the sealant compositions. The sealant compositions that would be effective for sealing the subterranean zone and their capacity from its elastic limit are determined. In an alternative embodiment, the estimated effects over the life of the well are compared to and/or corrected in comparison to corresponding actual data gathered over the life of the well via sealant compositions comprising MEMS sensors as described herein. Step 216 concludes by determining which sealant compositions would be effective in maintaining the integrity of the resulting cement sheath for the life of the well.

In step 218, parameters for risk of sealant failure for the effective sealant compositions are determined. For example, even though a sealant composition is deemed effective, one sealant composition may be more effective than another. In one embodiment, the risk parameters are calculated as percentages of sealant competency during the determination of effectiveness in step 216. In an alternative embodiment, the risk parameters are compared to and/or corrected in comparison to actual data gathered over the life of the well via sealant compositions comprising MEMS sensors as described herein.

Step 218 provides data that allows a user to perform a cost benefit analysis. Due to the high cost of remedial operations, it is important that an effective sealant composition is selected for the conditions anticipated to be experienced during the life of the well. It is understood that each of the sealant compositions has a readily calculable monetary cost. Under certain conditions, several sealant compositions may be equally efficacious, yet one may have the added virtue of being less expensive. Thus, it should be used to minimize costs. More commonly, one sealant composition will be more efficacious, but also more expensive. Accordingly, in step 220, an effective sealant composition with acceptable risk parameters is selected given the desired cost. Furthermore, the overall results of steps 200-220 can be compared to actual data that is obtained via sealant compositions comprising MEMS sensors as described herein, and such data may be used to modify and/or correct the inputs and/or outputs to the various steps 200-220 to improve the accuracy of same.

As discussed above and with reference to FIG. 2, wipers are often utilized during conventional primary cementing to force cement slurry out of the casing. The wiper plug also serves another purpose: typically, the end of a cementing operation is signaled when the wiper plug contacts a restriction (e.g., casing shoe) inside the casing 20 at the bottom of the string. When the plug contacts the restriction, a sudden pressure increase at pump 30 is registered. In this way, it can be determined when the cement has been displaced from the casing 20 and fluid flow returning to the surface via casing annulus 26 stops.

In reverse circulation cementing, it is also necessary to correctly determine when cement slurry completely fills the annulus 26. Continuing to pump cement into annulus 26 after cement has reached the far end of annulus 26 forces cement into the far end of casing 20, which could incur lost time if cement must be drilled out to continue drilling operations.

The methods disclosed herein may be utilized to determine when cement slurry has been appropriately positioned downhole. Furthermore, as discussed below, the methods of the present disclosure may additionally comprise using a MEMS sensor to actuate a valve or other mechanical means to close and prevent cement from entering the casing upon determination of completion of a cementing operation.

Figure 3:
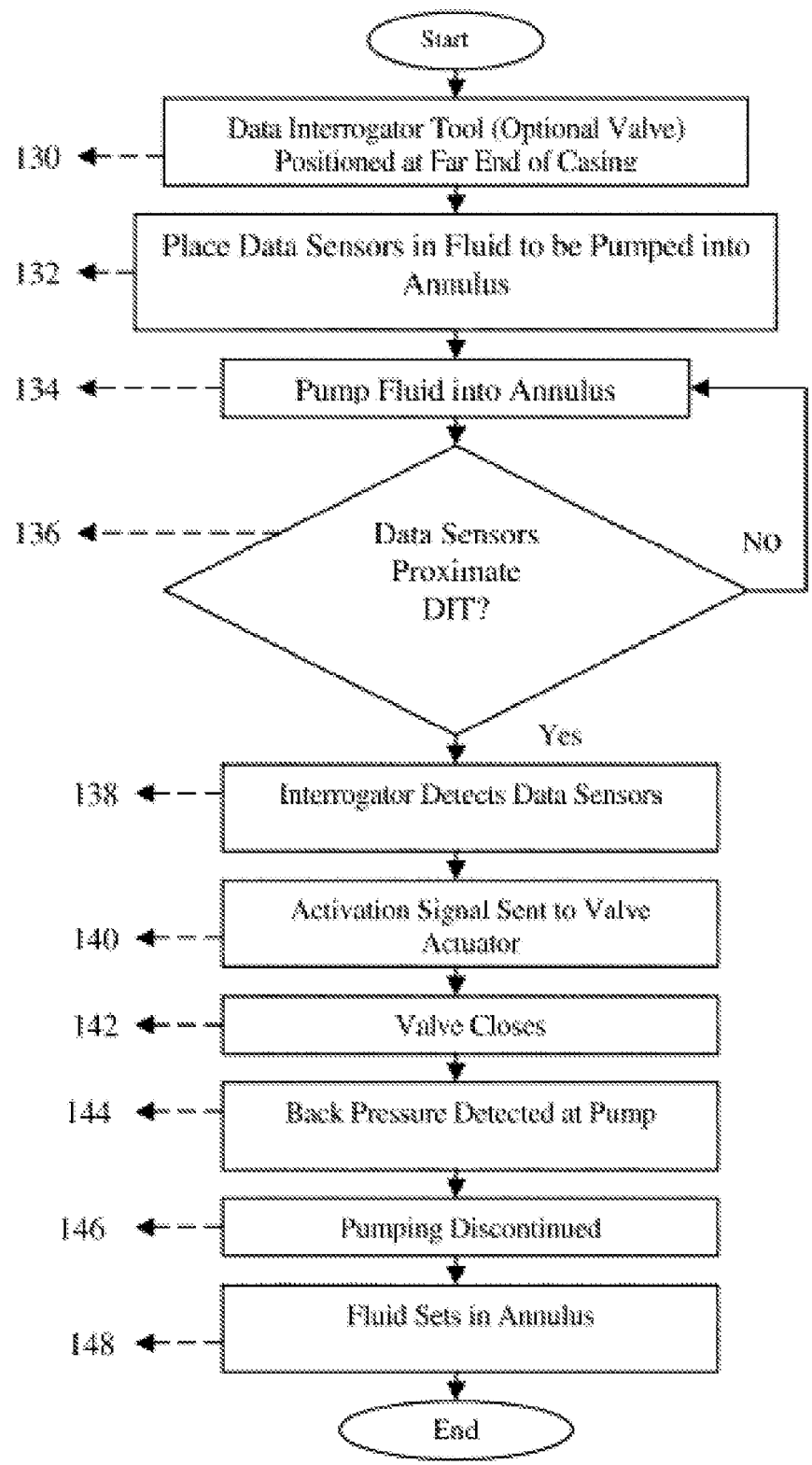
FIG. 3 is a flow chart illustrating a method for determining when a reverse cementing operation is complete and for subsequent optional activation of a downhole tool in accordance with some embodiments.

The way in which the method of the present disclosure may be used to signal when cement is appropriately positioned within annulus 26 will now be described within the context of a reverse circulation cementing operation. FIG. 3 is a flowchart of a method for determining completion of a cementing operation and optionally further actuating a downhole tool upon completion (or to initiate completion) of the cementing operation. This description will reference the flowchart of FIG. 3, as well as the wellbore depiction of FIG. 2.

At block 130, a data interrogation tool as described hereinabove is positioned at the far end of casing 20. In an embodiment, the data interrogation tool is incorporated with or adjacent to a casing shoe positioned at the bottom end of the casing and in communication with operators at the surface. At block 132, MEMS sensors are added to a fluid (e.g., cement slurry, spacer fluid, displacement fluid, etc.) to be pumped into annulus 26. At block 134, cement slurry is pumped into annulus 26. In an embodiment, MEMS sensors may be placed in substantially all of the cement slurry pumped into the wellbore. In an alternative embodiment, MEMS sensors may be placed in a leading plug or otherwise placed in an initial portion of the cement to indicate a leading edge of the cement slurry. In an embodiment, MEMS sensors are placed in leading and trailing plugs to signal the beginning and end of the cement slurry. While cement is continuously pumped into annulus 26, at decision 136, the data interrogation tool is attempting to detect whether the data sensors are in communicative (e.g., close) proximity with the data interrogation tool. As long as no data sensors are detected, the pumping of additional cement into the annulus continues. When the data interrogation tool detects the sensors at block 138 indicating that the leading edge of the cement has reached the bottom of the casing, the interrogator sends a signal to terminate pumping. The cement in the annulus is allowed to set and form a substantially impermeable mass which physically supports and positions the casing in the wellbore and bonds the casing to the walls of the wellbore in block 148.

If the fluid of block 130 is the cement slurry, MEMS-based data sensors are incorporated within the set cement, and parameters of the cement (e.g., temperature, pressure, ion concentration, stress, strain, etc.) can be monitored during placement and for the duration of the service life of the cement according to methods disclosed hereinabove. Alternatively, the data sensors may be added to an interface fluid (e.g., spacer fluid or other fluid plug) introduced into the annulus prior to and/or after introduction of cement slurry into the annulus.

The method just described for determination of the completion of a primary wellbore cementing operation may further comprise the activation of a downhole tool. For example, at block 130, a valve or other tool may be operably associated with a data interrogator tool at the far end of the casing. This valve may be contained within float shoe 22, for example, as disclosed hereinabove. Again, float shoe 22 may contain an integral data interrogator tool, or may otherwise be coupled to a data interrogator tool. For example, the data interrogator tool may be positioned between casing 20 and float shoe 22. Following the method previously described and blocks 132 to 136, pumping continues as the data interrogator tool detects the presence or absence of data sensors in close proximity to the interrogator tool (dependent upon the specific method cementing method being employed, e.g., reverse circulation, and the positioning of the sensors within the cement flow). Upon detection of a determinative presence or absence of sensors in close proximity indicating the termination of the cement slurry, the data interrogator tool sends a signal to actuate the tool (e.g., valve) at block 140. At block 142, the valve closes, sealing the casing and preventing cement from entering the portion of casing string above the valve in a reverse cementing operation. At block 144, the closing of the valve at 142, causes an increase in back pressure that is detected at the hydraulic pump 30. At block 146, pumping is discontinued, and cement is allowed to set in the annulus at block 148. In embodiments wherein data sensors have been incorporated throughout the cement, parameters of the cement (and thus cement integrity) can additionally be monitored during placement and for the duration of the service life of the cement according to methods disclosed hereinabove.

In embodiments, systems for sensing, communicating and evaluating wellbore parameters may include the wellbore 18; the casing 20 or other workstring, toolstring, production string, tubular, coiled tubing, wireline, or any other physical structure or conveyance extending downhole from the surface; MEMS sensors 52 that may be placed into the wellbore 18 and/or surrounding formation 14, for example, via a wellbore servicing fluid; and a device or plurality of devices for interrogating the MEMS sensors 52 to gather/collect data generated by the MEMS sensors 52, for transmitting the data from the MEMS sensors 52 to the earth's surface 16, for receiving communications and/or data to the earth's surface, for processing the data, or any combination thereof, referred to collectively herein a data interrogation/communication units or in some instances as a data interrogator or data interrogation tool. Unless otherwise specified, it is understood that such devices as disclosed in the various embodiments herein will have MEMS sensor interrogation functionality, communication functionality (e.g., transceiver functionality), or both, as will be apparent from the particular embodiments and associated context disclosed herein. The wellbore servicing fluid comprising the MEMS sensors 52 may comprise a drilling fluid, a spacer fluid, a sealant, a fracturing fluid, a gravel pack fluid, a completion fluid, or any other fluid placed downhole. In addition, the MEMS sensors 52 may be configured to measure physical parameters such as temperature, stress and strain, as well as chemical parameters such as $CO_2$ concentration, $H_2S$ concentration, $CH_4$ concentration, moisture content, pH, $Na^+$ concentration, $K^+$ concentration, and $Cl$ concentration. Various embodiments described herein are directed to interrogation/communication units that are dispersed or distributed at intervals along a length of the casing 20 and form a communication network for transmitting and/or receiving communications to/from a location downhole and the surface, with the further understanding that the interrogation/communication units may be otherwise physically supported by a workstring, toolstring, production string, tubular, coiled tubing, wireline, or any other physical structure or conveyance extending downhole from the surface.

Figure 5:
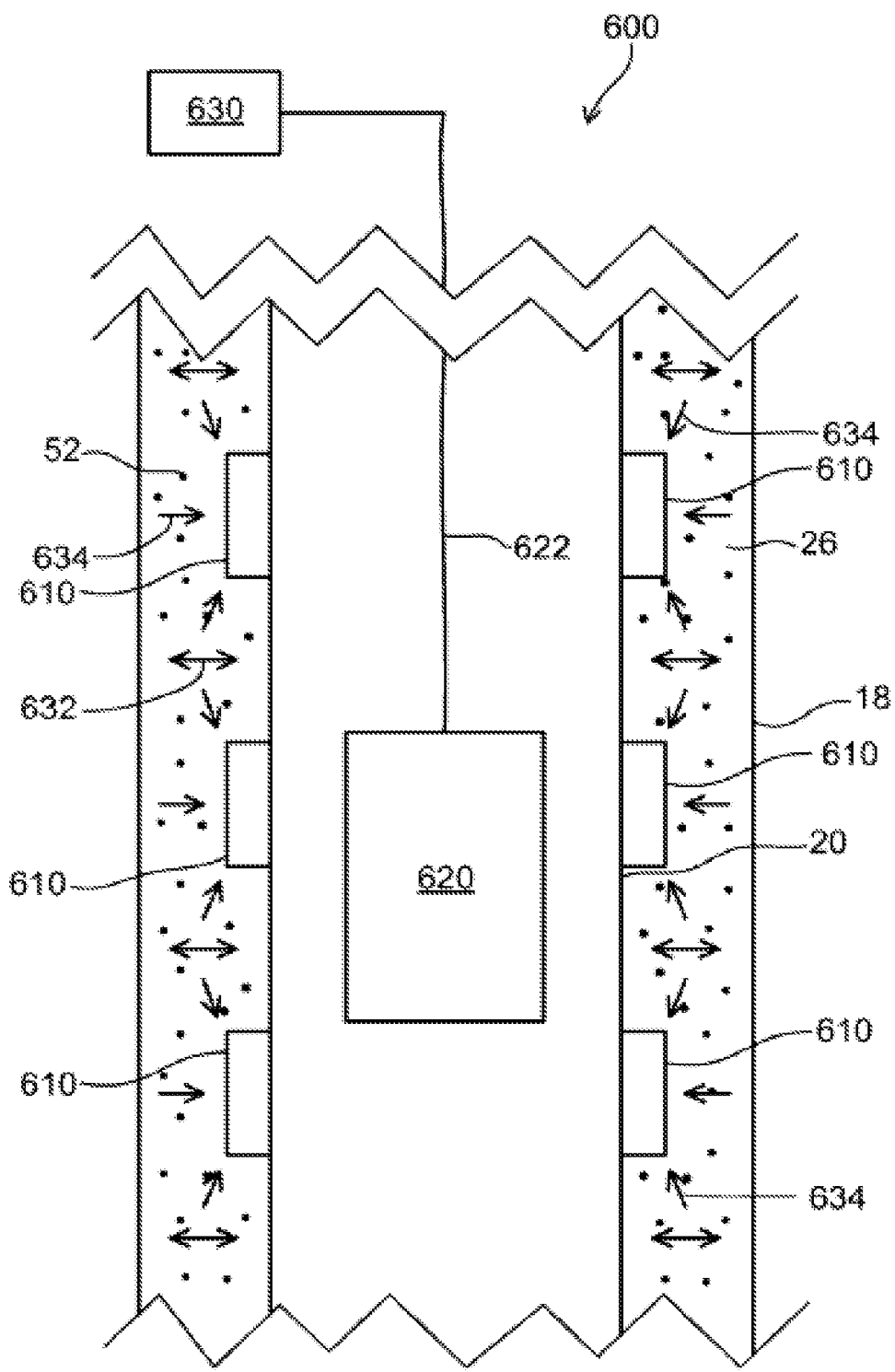
FIG. 5 is a schematic view of an embodiment of a wellbore parameter sensing system.

Referring to FIG. 5, a schematic view of an embodiment of a wellbore parameter sensing system 600 is illustrated. The wellbore parameter sensing system 600 may comprise the wellbore 18, inside which the casing 20 is situated. In an embodiment, the wellbore parameter sensing system 600 may further comprise a plurality of regional communication units 610, which may be situated on the casing 20 and spaced at regular or irregular intervals along the casing, e.g., about every 5 m to 15 m along the length of the casing 20, alternatively about every 8 m to 12 m along the length of the casing 20, alternatively about every 10 m along the length of the casing 20. In embodiments, the regional communication units 610 may be situated on or in casing collars that couple casing joints together. In addition, the regional communication units 610 may be situated in an interior of the casing 20, on an exterior of the casing 20, or both. In an embodiment, the wellbore parameter sensing system 600 may further comprise a tool (e.g., a data interrogator 620 or other data collection and/or power-providing device), which may be lowered down into the wellbore 18 on a wireline 622, as well as a processor 630 or other data storage or communication device, which is connected to the data interrogator 620.

In an embodiment, each regional communication unit 610 may be configured to interrogate and/or receive data from, MEMS sensors 52 situated in the annulus 26, in the vicinity of the regional communication unit 610, whereby the vicinity of the regional communication unit 610 is defined as in the above discussion of the wellbore parameter sensing system 300 illustrated in FIG. 5. The MEMS sensors 52 may be configured to transmit MEMS sensor data to neighboring MEMS sensors 52, as denoted by double arrows 632, as well as to transmit MEMS sensor data to the regional communication units 610 in their respective vicinities, as denoted by single arrows 634. In an embodiment, the MEMS sensors 52 may be passive sensors that are powered by bursts of electromagnetic radiation from the regional communication units 610. In a further embodiment, the MEMS sensors 52 may be active sensors that are powered by batteries situated in or on the MEMS sensors 52 or by other downhole power sources.

The regional communication units 610 in the present embodiment of the wellbore parameter sensing system 600 are neither wired to one another, nor wired to the processor 630 or other surface equipment. Accordingly, in an embodiment, the regional communication units 610 may be powered by batteries, which enable the regional communication units 610 to interrogate the MEMS sensors 52 in their respective vicinities and/or receive MEMS sensor data from the MEMS sensors 52 in their respective vicinities. The batteries of the regional communication units 610 may be inductively rechargeable by the data interrogator 620 or may be rechargeable by other downhole power sources. In addition, as set forth above, the data interrogator 620 may be lowered into the wellbore 18 for the purpose of interrogating regional communication units 610 and receiving the MEMS sensor data stored in the regional communication units 610. Furthermore, the data interrogator 620 may be configured to transmit the MEMS sensor data to the processor 630, which processes the MEMS sensor data. In an embodiment, a fluid containing MEMS in contained within the wellbore casing (for example, as shown in FIGS. 5, 6, 7, and 10), and the data interrogator 620 is conveyed through such fluid and into communicative proximity with the regional communication units 610. In various embodiments, the data interrogator 620 may communicate with, power up, and/or gather data directly from the various MEMS sensors distributed within the annulus 26 and/or the casing 20, and such direct interaction with the MEMS sensors may be in addition to or in lieu of communication with one or more of the regional communication units 610. For example, if a given regional communication unit 610 experiences an operational failure, the data interrogator 620 may directly communicate with the MEMS within the given region experiencing the failure, and thereby serve as a backup (or secondary/verification) data collection option.

Figure 6:
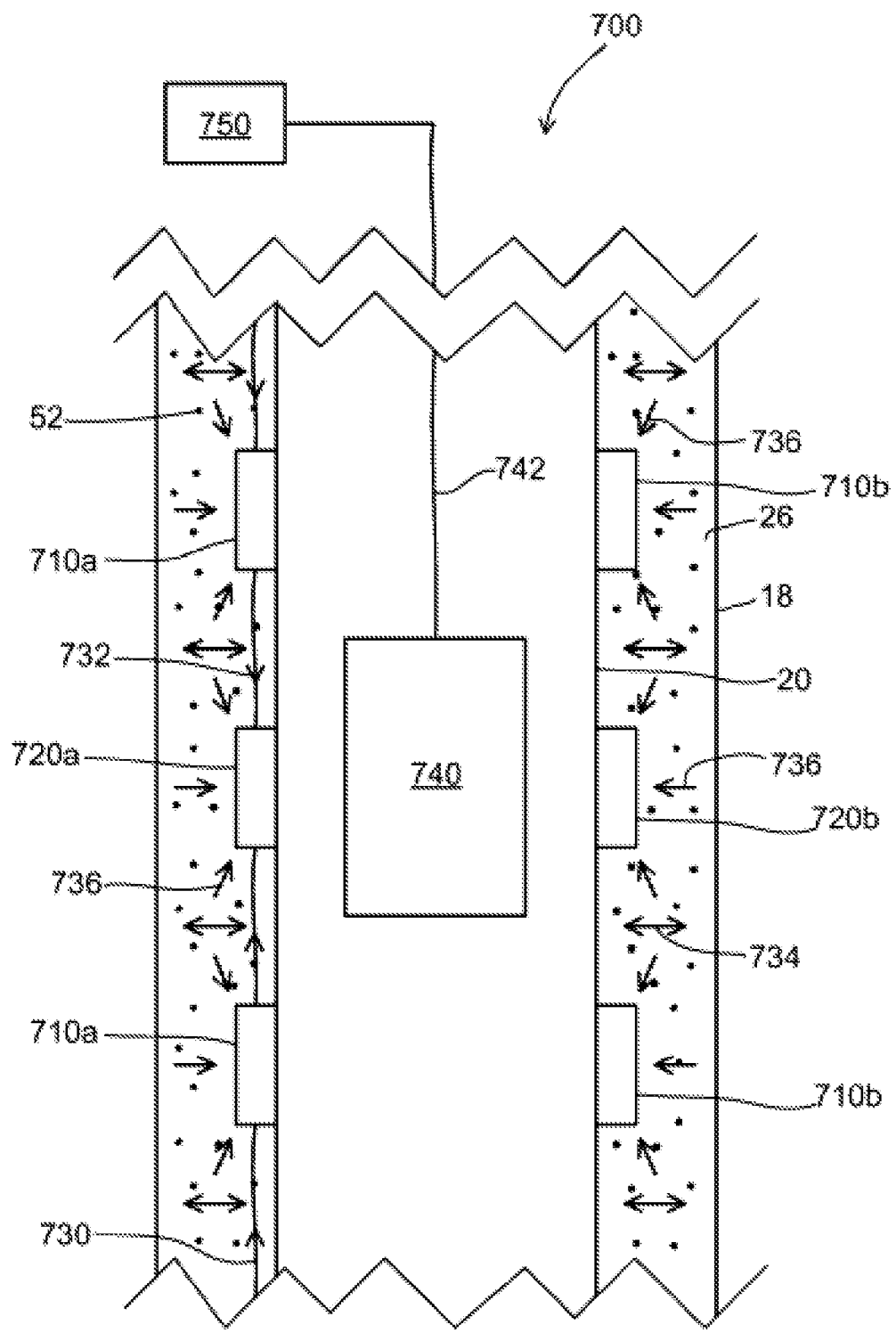
FIG. 6 is a schematic view of another embodiment of a wellbore parameter sensing system.

Referring to FIG. 6, a schematic view of an embodiment of a wellbore parameter sensing system 700 is illustrated. As in earlier-described embodiments, the wellbore parameter sensing system 700 comprises the wellbore 18 and the casing 20 that is situated inside the wellbore 18. In addition, as in the case of other embodiments illustrated in FIG. 5, the well bore parameter sensing system 700 comprises a plurality of regional communication units 710, which may be situated on the casing 20 and spaced at regular or irregular intervals along the casing, e.g., about every 5 m to 15 m along the length of the casing 20, alternatively about every 8 m to 12 m along the length of the casing 20, alternatively about every 10 m along the length of the casing 20. In embodiments, the regional communication units 710 may be situated on or in casing collars that couple casing joints together. In addition, the regional communication units 710 may be situated in an interior of the casing 20, on an exterior of the casing 20, or both, or may be otherwise located and supported as described in various embodiments herein.

In an embodiment, the wellbore parameter sensing system 700 further comprises one or more primary (or master) communication units 720. The regional communication units 710a and the primary communication unit 720a may be coupled to one another by a data line 730, which allows sensor data obtained by the regional communication units 710a from MEMS sensors 52 situated in the annulus 26 to be transmitted from the regional communication units 710a to the primary communication unit 720a, as indicated by directional arrows 732.

In an embodiment, the MEMS sensors 52 may sense at least one wellbore parameter and transmit data regarding the at least one wellbore parameter to the regional communication units 710b, either via neighboring MEMS sensors 52 as denoted by double arrow 734, or directly to the regional communication units 710 as denoted by single arrows 736. The regional communication units 710b may communicate wirelessly with the primary or master communication unit 720b, which may in turn communicate wirelessly with equipment located at the surface (or via telemetry such as casing signal telemetry) and/or other regional communication units 720a and/or other primary or master communication units 720a.

In embodiments, the primary or master communication units 720 gather information from the MEMS sensors and transmit (e.g., wirelessly, via wire, via telemetry such as casing signal telemetry, etc.) such information to equipment (e.g., processor 750) located at the surface.

In an embodiment, the wellbore parameter sensing system 700 further comprises, additionally or alternatively, a data interrogator 740, which may be lowered into the wellbore 18 via a wire line 742, as well as a processor 750, which is connected to the data interrogator 740. In an embodiment, the data interrogator 740 is suspended adjacent to the primary communication unit 720, interrogates the primary communication unit 720, receives MEMS sensor data collected by all of the regional communication units 710 and transmits the MEMS sensor data to the processor 750 for processing. The data interrogator 740 may provide other functions, for example as described with reference to data interrogator 620 of FIG. 5. In various embodiments, the data interrogator 740 (and likewise the data interrogator 620) may communicate directly or indirectly with any one or more of the MEMS sensors (e.g., sensors 52), local or regional data interrogation/communication units (e.g., units 310, 510, 610, 710), primary or master communication units (e.g., units 720), or any combination thereof.

Figure 7:
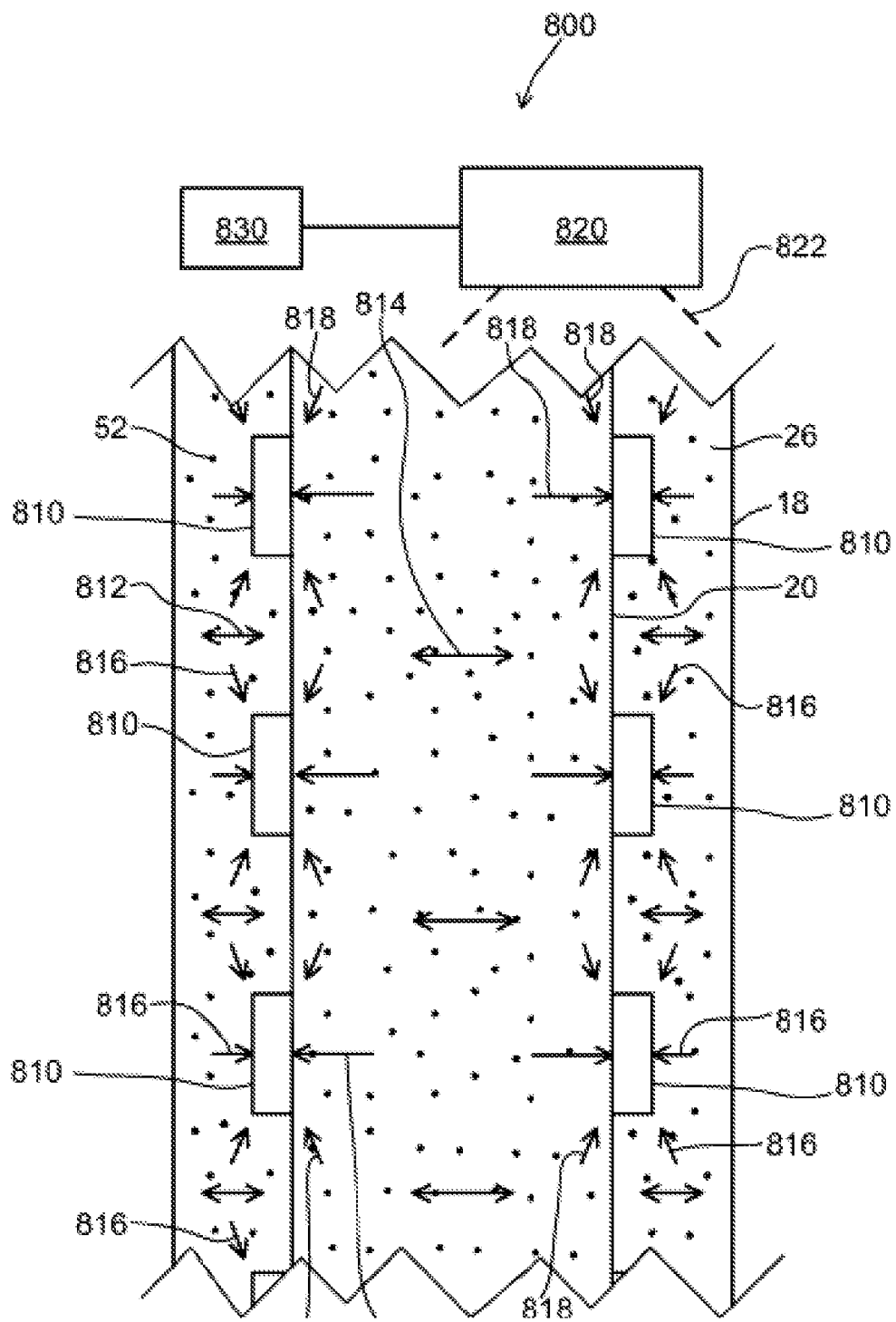
FIG. 7 is a schematic view of still another embodiment of a wellbore parameter sensing system.

Referring to FIG. 7, a schematic view of an embodiment of a wellbore parameter sensing system 800 is illustrated. As in earlier-described embodiments, the wellbore parameter sensing system 800 comprises the wellbore 18 and the casing 20 that is situated inside the wellbore 18. In addition, as in the case of other embodiments shown in FIGS. 5 and 6, the wellbore parameter sensing system 800 comprises a plurality of local, regional, and/or primary/master communication units 810, which may be situated on the casing 20 and spaced at regular or irregular intervals along the casing 20, e.g., about every 5 m to 15 m along the length of the casing 20, alternatively about every 8 m to 12 m along the length of the casing 20, alternatively about every 10 m along the length of the casing 20. In embodiments, the communication units 810 may be situated on or in casing collars that couple casing joints together. In addition, the communication units 810 may be situated in an interior of the casing 20, on an exterior of the casing 20, or both, or may be otherwise located and supported as described in various embodiments herein.

In an embodiment, MEMS sensors 52, which are present in a wellbore servicing fluid that has been placed in the wellbore 18, may sense at least one wellbore parameter and transmit data regarding the at least one wellbore parameter to the local, regional, and/or primary/master communication units 810, either via neighboring MEMS sensors 52 as denoted by double arrows 812, 814, or directly to the communication units 810 as denoted by single arrows 816, 818.

In an embodiment, the wellbore parameter sensing system 800 may further comprise a data interrogator 820, which is connected to a processor 830 and is configured to interrogate each of the communication units 810 for MEMS sensor data via a ground penetrating signal 822 and to transmit the MEMS sensor data to the processor 830 for processing.

In a further embodiment, one or more of the communication units 810 may be coupled together by a data line (e.g., wired communications). In this embodiment, the MEMS sensor data collected from the MEMS sensors 52 by the regional communication units 810 may be transmitted via the data line to, for example, the regional communication unit 810 situated furthest uphole. In this case, only one regional communication unit 810 is interrogated by the surface located data interrogator 820. In addition, since the regional communication unit 810 receiving all of the MEMS sensor data is situated uphole from the remainder of the regional communication units 810, an energy and/or parameter (intensity, strength, wavelength, amplitude, frequency, etc.) of the ground penetrating signal 822 may be able to be reduced. In other embodiments, a data interrogator such as unit 620 or 740) may be used in addition to or in lieu of the surface unit 810, for example to serve as a back-up in the event of operation difficulties associated with surface unit 820 and/or to provide or serve as a relay between surface unit 820 and one or more units downhole such as a regional unit 810 located at an upper end of a string of interrogator units.

For sake of clarity, it should be understood that like components as described in any of FIGS. 5-7 may be combined and/or substituted to yield additional embodiments and the functionality of such components in such additional embodiments will be apparent based upon the description of FIGS. 5-7 and the various components therein. For example, in various embodiments disclosed herein (including but not limited to the embodiments of FIGS. 5-7), the local, regional, and/or primary/master communication/data interrogation units (e.g., units 310, 510, 610, 620, 710, 740, and/or 810) may communicate with one another and/or equipment located at the surface via signals passed using a common structural support as the transmission medium (e.g., casing, tubular, production tubing, drill string, etc.), for example by encoding a signal using telemetry technology such as an electrical/mechanical transducer. In various embodiments disclosed herein (including but not limited to the embodiments of FIGS. 5-7), the local, regional, and/or primary/master communication/data interrogation units (e.g., units 310, 510, 610, 620, 710, 740, and/or 810) may communicate with one another and/or equipment located at the surface via signals passed using a network formed by the MEMS sensors (e.g., a daisy-chain network) distributed along the wellbore, for example in the annular space 26 (e.g., in a cement) and/or in a wellbore servicing fluid inside casing 20. In various embodiments disclosed herein (including but not limited to the embodiments of FIGS. 5-7), the local, regional, and/or primary/master communication/data interrogation units (e.g., units 310, 510, 610, 620, 710, 740, and/or 810) may communicate with one another and/or equipment located at the surface via signals passed using a ground penetrating signal produced at the surface, for example being powered up by such a ground-penetrating signal and transmitting a return signal back to the surface via a reflected signal and/or a daisy-chain network of MEMS sensors and/or wired communications and/or telemetry transmitted along a mechanical conveyance/medium. In some embodiments, one or more of), the local, regional, and/or primary/master communication/data interrogation units (e.g., units 310, 510, 610, 620, 710, 740, and/or 810) may serve as a relay or broker of signals/messages containing information/data across a network formed by the units and/or MEMS sensors.

Figure 8:
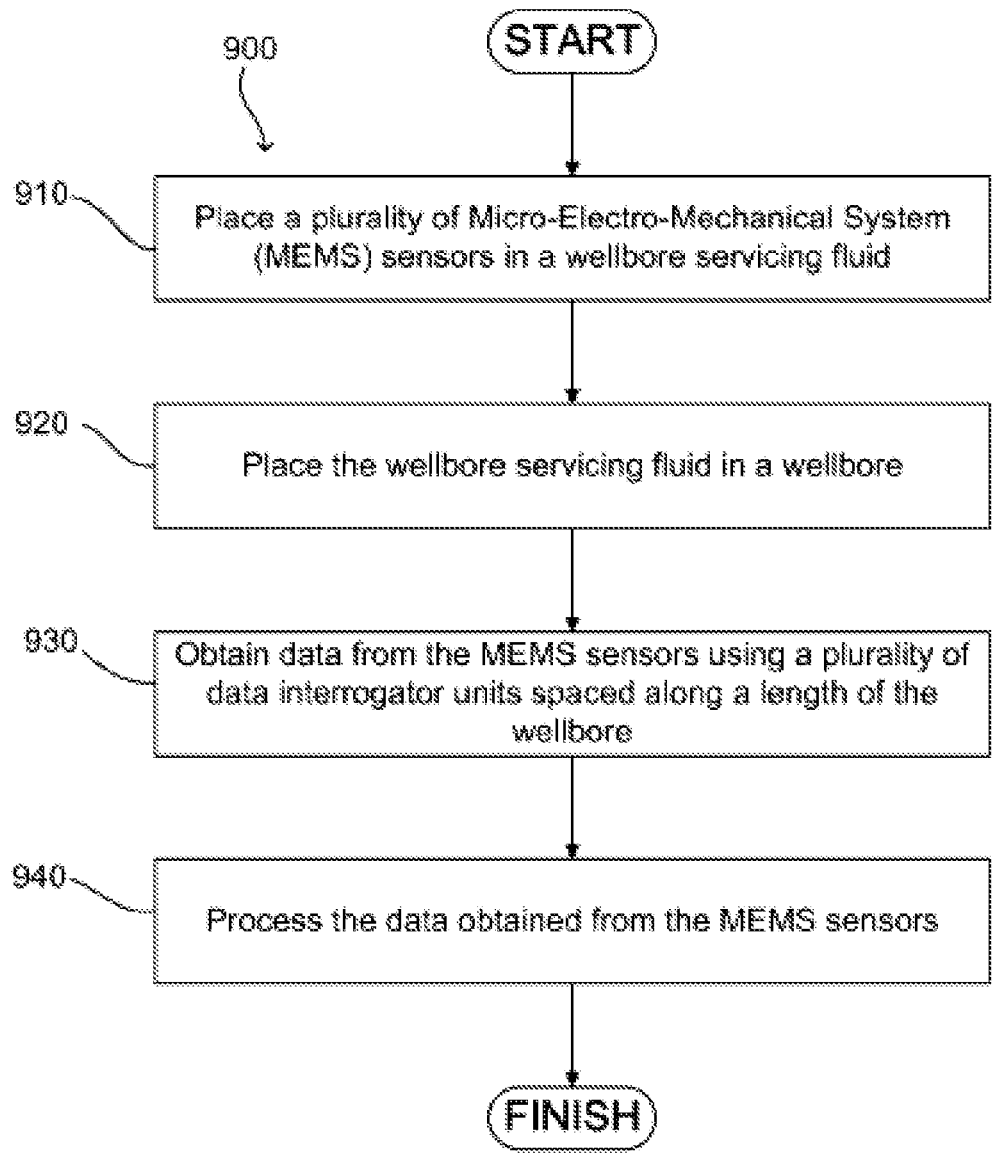
FIG. 8 is a flow chart illustrating a method for servicing a wellbore in accordance with some embodiments.

Referring to FIG. 8, a method 900 of servicing a wellbore is described. At block 910, a plurality of MEMS sensors is placed in a wellbore servicing fluid. At block 920, the wellbore servicing fluid is placed in a wellbore. At block 930, data is obtained from the MEMS sensors, using a plurality of data interrogation units spaced along a length of the wellbore. At block 940, the data obtained from the MEMS sensors is processed.

Figure 9:
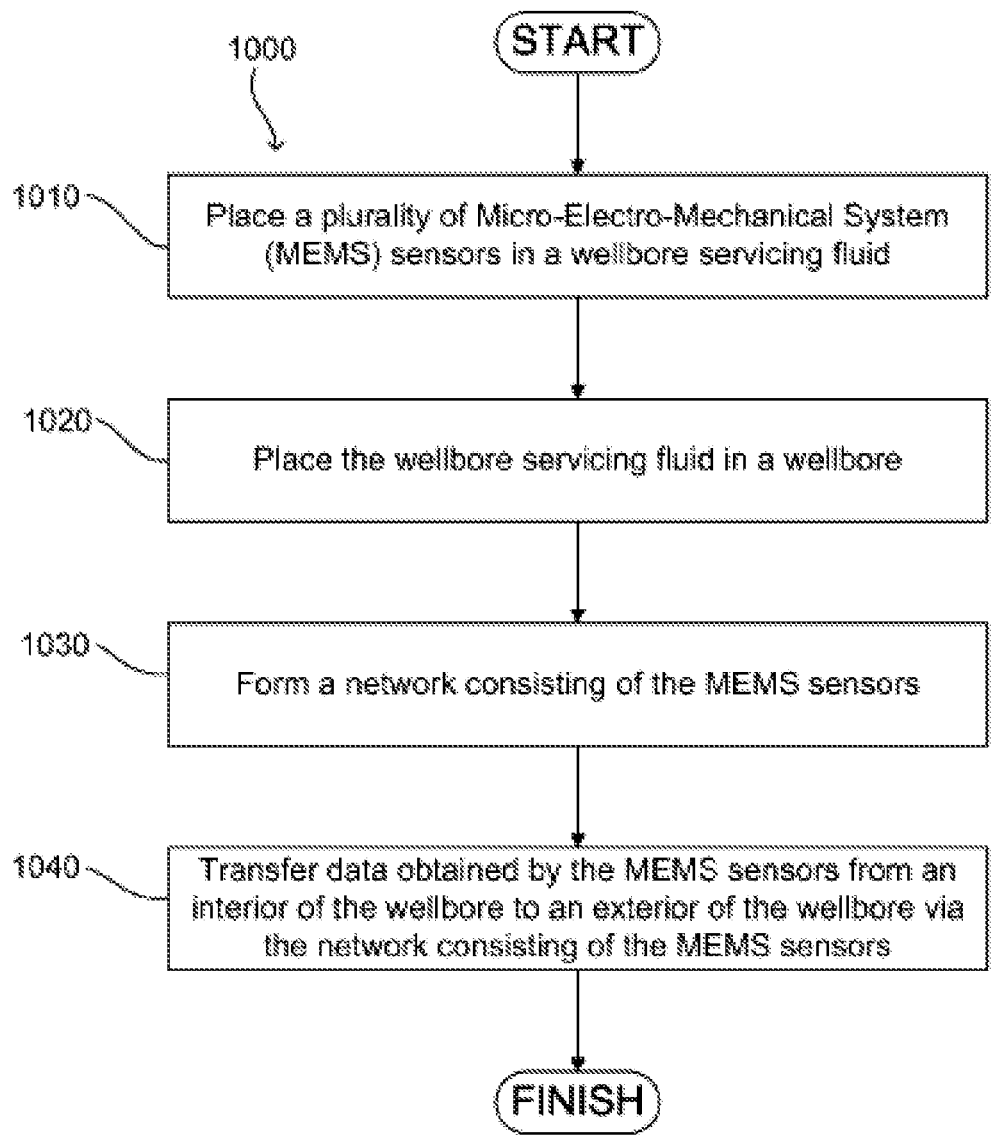
FIG. 9 is a flow chart illustrating another method for servicing a wellbore in accordance with some embodiments.

Referring to FIG. 9, a further method 1000 of servicing a wellbore is described. At block 1010, a plurality of MEMS sensors is placed in a wellbore servicing fluid. At block 1020, the wellbore servicing fluid is placed in a wellbore. At block 1030, a network consisting of the MEMS sensors is formed. At block 1040, data obtained by the MEMS sensors is transferred from an interior of the wellbore to an exterior of the wellbore via the network consisting of the MEMS sensors. Any of the embodiments set forth in the Figures described herein, for example, without limitation, FIGS. 5-7, may be used in carrying out the methods as set forth in FIGS. 8 and 9.

In some embodiments, a conduit (e.g., casing 20 or other tubular such as a production tubing, drill string, workstring, or other mechanical conveyance, etc.) in the wellbore 18 may be used as a data transmission medium, or at least as a housing for a data transmission medium, for transmitting MEMS sensor data from the MEMS sensors 52 and/or interrogation/communication units situated in the wellbore 18 to an exterior of the wellbore (e.g., earth's surface 16). Again, it is to be understood that in various embodiments referencing the casing, other physical supports may be used as a data transmission medium such as a workstring, toolstring, production string, tubular, coiled tubing, wireline, jointed pipe, or any other physical structure or conveyance extending downhole from the surface.

Figure 10:
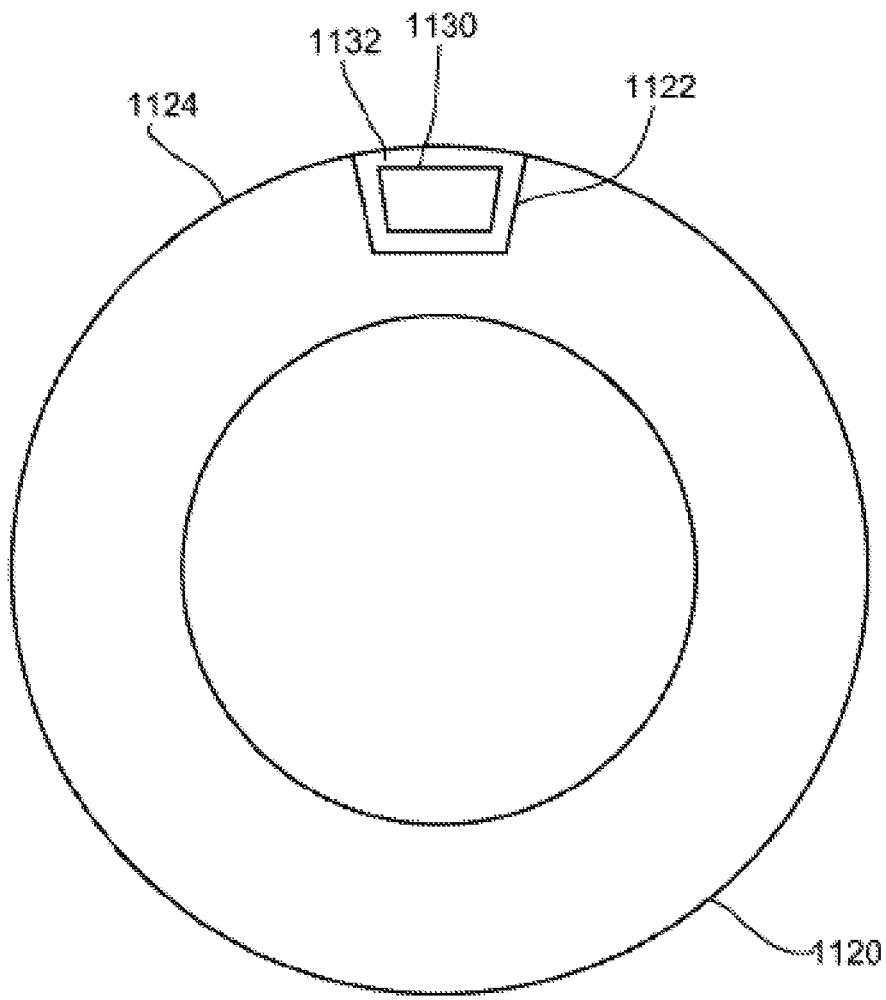
FIG. 10 is a schematic cross-sectional view of a casing in accordance with some embodiments.

Referring to FIG. 10, a schematic cross-sectional view of an embodiment of the casing 1120 is illustrated. The casing 1120 may comprise a groove, cavity, or hollow 1122, which runs longitudinally along an outer surface 1124 of the casing, along at least a portion of a length of the 1120 casing. The groove 1122 may be open or may be enclosed, for example with an exterior cover applied over the groove and attached to the casing (e.g., welded) or may be enclosed as an integral portion of the casing body/structure (e.g., a bore running the length of each casing segment). In an embodiment, at least one cable 1130 may be embedded or housed in the groove 1122 and run longitudinally along a length of the groove 1122. The cable 1130 may be insulated (e.g., electrically insulated) from the casing 1120 by insulation 1132. The cable 1130 may be a wire, fiber optic, or other physical medium capable of transmitting signals.

In an embodiment, a plurality of cables 1130 may be situated in groove 1122, for example, one or more insulated electrical lines configured to power pieces of equipment situated in the wellbore 18 and/or one or more data lines configured to carry data signals between downhole devices and an exterior of the wellbore 18. In various embodiments, the cable 1130 may be any suitable electrical, signal, and/or data communication line, and is not limited to metallic conductors such as copper wires but also includes fiber optical cables and the like.

Figure 11:
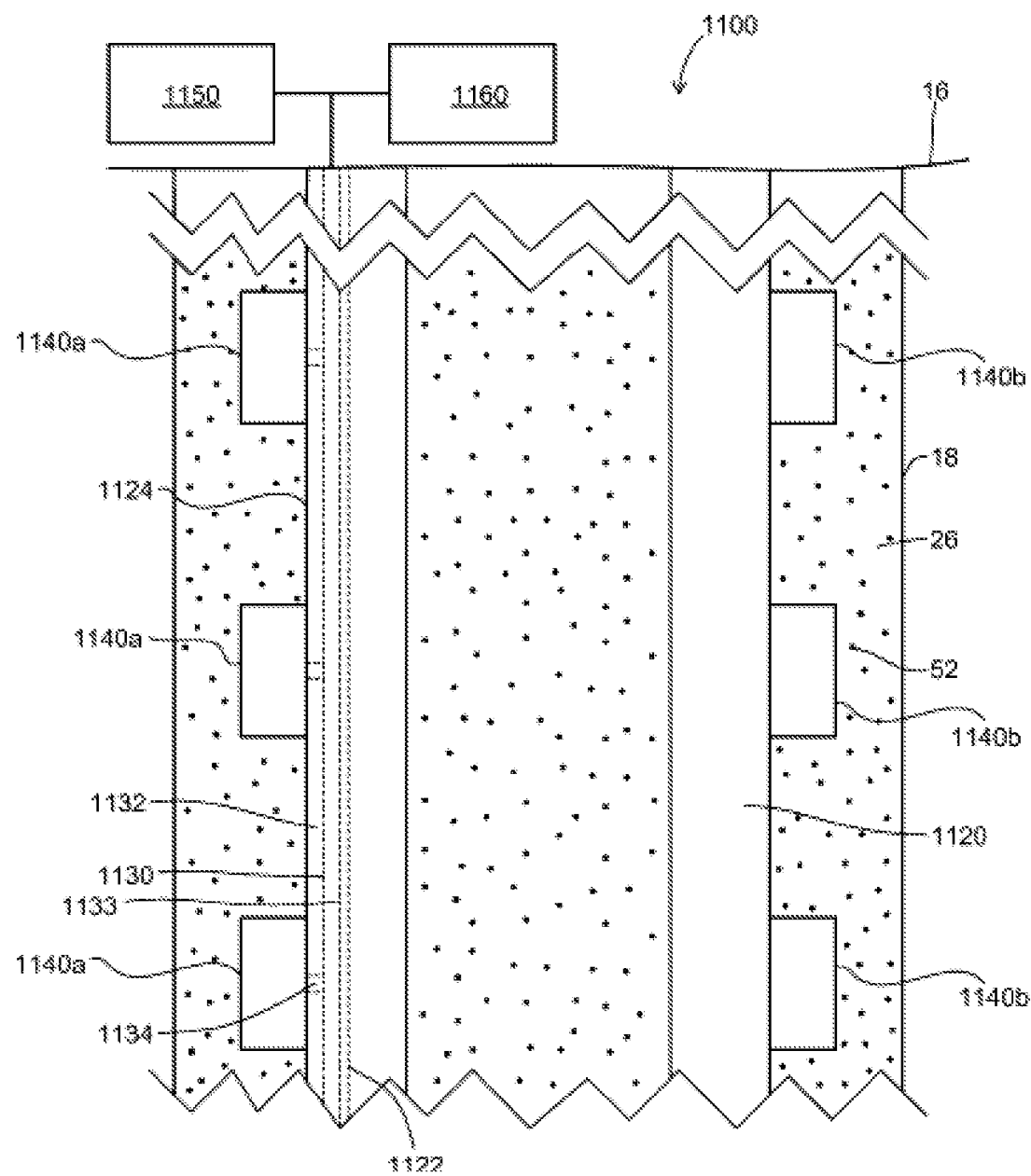
FIG. 11 is a schematic view of a further embodiment of a wellbore parameter sensing system.

FIG. 11 illustrates an embodiment of a wellbore parameter sensing system 1100, comprising the wellbore 18 inside which a well bore servicing fluid loaded with MEMS sensors 52 is situated; the casing 1120 having a groove 1122; a plurality of data interrogation/communication units 1140 situated on the casing 1120 and spaced along a length of the casing 1120; a processing unit 1150 situated at an exterior of the wellbore 18; and a power supply 1160 situated at the exterior of the wellbore 18.

In embodiments, the data interrogation/communication units 1140 may be situated on or in casing collars that couple casing joints together. In addition or alternatively, the data interrogation/communication units 1140 may be situated in an interior of the casing 1120, on an exterior of the casing 1120, or both. In an embodiment, the data interrogation/communication units 1140a may be connected to the cable (s) and/or data line(s) 1130 via through-holes 1134 in the insulation 1132 and/or the casing (e.g., outer surface 1124). The data interrogation/communication units 1140a may be connected to the power supply 1160 via cables 1130, as well as to the processor 1150 via data line(s) 1133. The data interrogation/communication units 1140a commonly connected to one or more cables 1130 and/or data lines 1133 may function (e.g., collect and communication MEMS sensor data) in accordance with any of the embodiments disclosed herein having wired connections/communications, including but not limited to FIG. 6. Furthermore, the wellbore parameter sensing system 1100 may further comprise one or more data interrogation/communication units 1140b in wireless communication and may function (e.g., collect and communication MEMS sensor data) in accordance with any of the embodiments disclosed herein having wireless connections/communications, including but not limited to FIGS. 5-7.

By way of non-limiting example, the MEMS sensors 52 present in a wellbore servicing fluid situated in an interior of the casing 1120 and/or in the annulus 26 measure at least one wellbore parameter. The data interrogation/communication units 1140 in a vicinity of the MEMS sensors 52 interrogate the sensors 52 at regular intervals and receive data from the sensors 52 regarding the at least one wellbore parameter. The data interrogation/communication units 1140 then transmit the sensor data to the processor 1150, which processes the sensor data.

In an embodiment, the MEMS sensors 52 may be passive tags, i.e., may be powered, for example, by bursts of electromagnetic radiation from sensors of the regional data interrogation/communication units 1140. In a further embodiment, the MEMS sensors 52 may be active tags, i.e., powered by a battery or batteries situated in or on the tags 52 or other downhole power source. In an embodiment, batteries of the MEMS sensors 52 may be inductively rechargeable by the regional data interrogation/communication units 1140.

In a further embodiment, the casing 1120 may be used as a conductor for powering the data interrogation/communication units 1140, or as a data line for transmitting MEMS sensor data from the data interrogation/communication units 1140 to the processor 1150.

Figure 12:
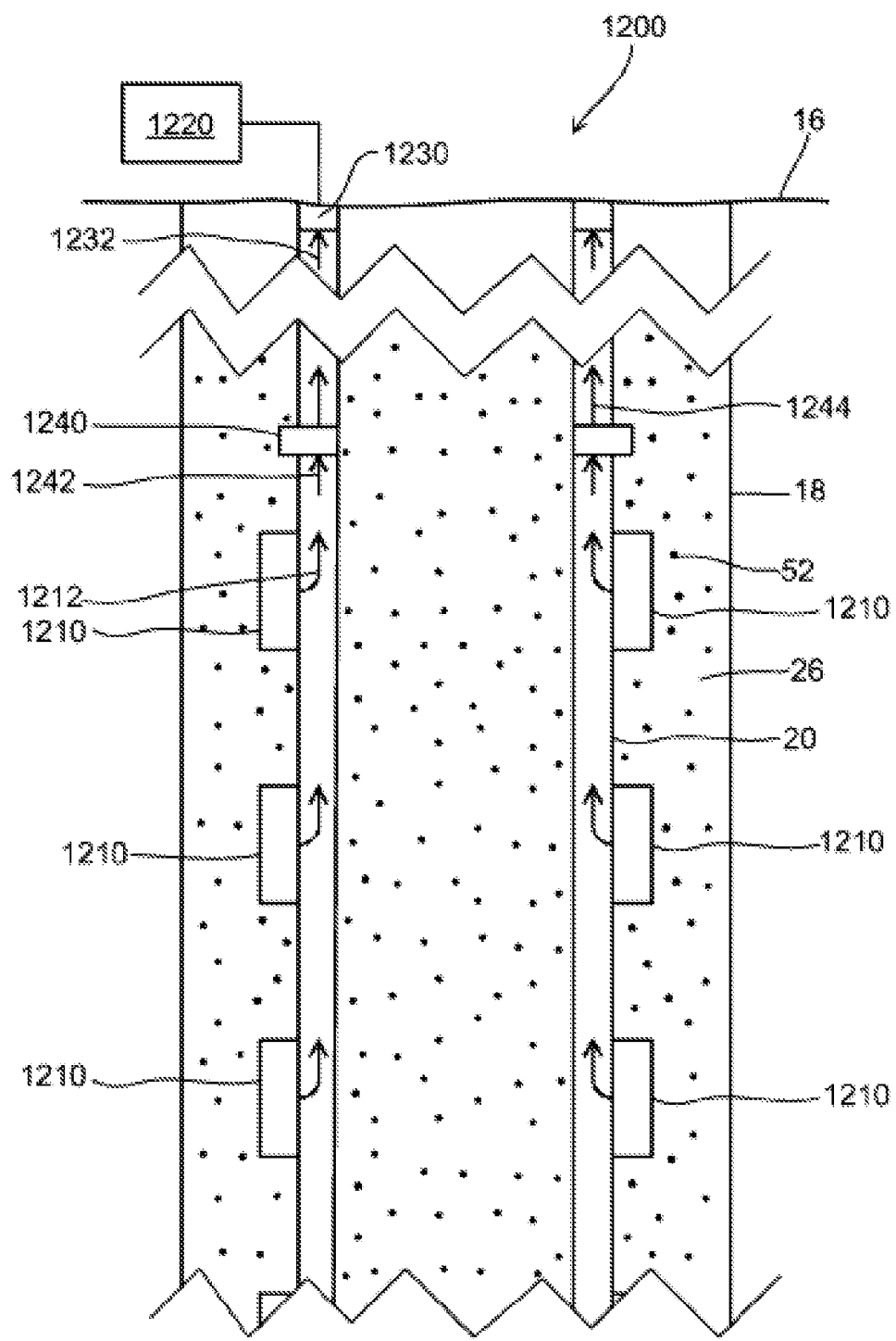
FIG. 12 is a schematic view of yet another embodiment of a wellbore parameter sensing system.

FIG. 12 illustrates an embodiment of a wellbore parameter sensing system 1200, comprising the wellbore 18 inside which a well bore servicing fluid loaded with MEMS sensors 52 is situated; the casing 20; a plurality of data interrogation/communication units 1210 situated on the casing 20 and spaced along a length of the casing 20; and a processing unit 1220 situated at an exterior of the wellbore 18.

In embodiments, the data interrogation/communication units 1210 may be situated on or in casing collars that couple casing joints together. In addition or alternatively, the data interrogation/communication units 1210 may be situated in an interior of the casing 20, on an exterior of the casing 20, or both. In embodiments, the data interrogation/communication units 1210 may each comprise an acoustic transmitter, which is configured to convert MEMS sensor data received by the data interrogation/communication units 1210 from the MEMS sensors 52 into acoustic signals that take the form of acoustic vibrations in the casing 20, which may be referred to as acoustic telemetry embodiments. In embodiments, the acoustic transmitters may operate, for example, on a piezoelectric or magnetostrictive principle and may produce axial compression waves, torsional waves, radial compression waves or transverse waves that propagate along the casing 20 in an uphole direction denoted by arrows 1212. A discussion of acoustic transmitters as part of an acoustic telemetry system is given in U.S. Patent Application Publication No. 2010/0039898 and U.S. Pat. Nos. 3,930,220; 4,156,229; 4,298,970; and 4,390,975, each of which is hereby incorporated by reference in its entirety. In addition, the data interrogation/communication units 1210 may be powered as described herein in various embodiments, for example by internal batteries that may be inductively rechargeable by a recharging unit run into the well bore 18 on a wireline or by other downhole power sources.

In embodiments, the wellbore parameter sensing system 1200 further comprises at least one acoustic receiver 1230, which is situated at or near an uphole end of the casing 20, receives acoustic signals generated and transmitted by the acoustic transmitters, converts the acoustic signals into electrical signals and transmits the electrical signals to the processing unit 1220. Arrows 1232 denote the reception of acoustic signals by acoustic receiver 1230. In an embodiment, the acoustic receiver 1230 may be powered by an electrical line running from the processing unit 1220 to the acoustic receiver 1230.

In embodiments, the wellbore parameter sensing system 1200 further comprises a repeater 1240 situated on the casing 20. The repeater 1240 may be configured to receive acoustic signals from the data interrogation/communication units 1210 situated downhole from the repeater 1240, as indicated by arrows 1242. In addition, the repeater 1240 may be configured to retransmit, to the acoustic receiver 1230, acoustic signals regarding the data received by these downhole data interrogation/communication units 1210 from MEMS sensors 52. Arrows 1244 denote the retransmission of acoustic signals by repeater 1240. In further embodiments, the well bore parameter sensing system 1200 may comprise multiple repeaters 1230 spaced along the casing 20. In various embodiments, the data interrogation/communication units 1210 and/or the repeaters 1230 may contain suitable equipment to encode a data signal into the casing 20 (e.g, electrical/mechanical transducing circuitry and equipment).

In operation, in an embodiment, the MEMS sensors 52 situated in the interior of the casing 20 and/or in the annulus 26 may measure at least one wellbore parameter and then transmit data regarding the at least one well bore parameter to the data interrogation/communication units 1210 in their respective vicinities in accordance with the various embodiments disclosed herein, including but not limited to FIGS. 5-9. The acoustic transmitters in the data interrogation/communication units 1210 may convert the MEMS sensor data into acoustic signals that propagate up the casing 20. The repeater or repeaters 1240 may receive acoustic signals from the data interrogation/communication units 1210 downhole from the respective repeater 1240 and retransmit acoustic signals further up the casing 20. At or near an uphole end of the casing 20, the acoustic receiver 1230 may receive the acoustic signals propagated up the casing 20, convert the acoustic signals into electrical signals and transmit the electrical signals to the processing unit 1220. The processing unit 1220 then processes the electrical signals. In various embodiments, the acoustic telemetry embodiments and associated equipment may be combined with a network formed by the MEMS sensors and/or data interrogation/communication units (e.g., a point to point or "daisy-chain" network comprising MEMS sensors) to provide back-up or redundant wireless communication network functionality for conveying MEMS data from downhole to the surface. Of course, such wireless communications and networks could be further combines with various wired embodiments disclosed herein for further operational advantages.

Figure 13:
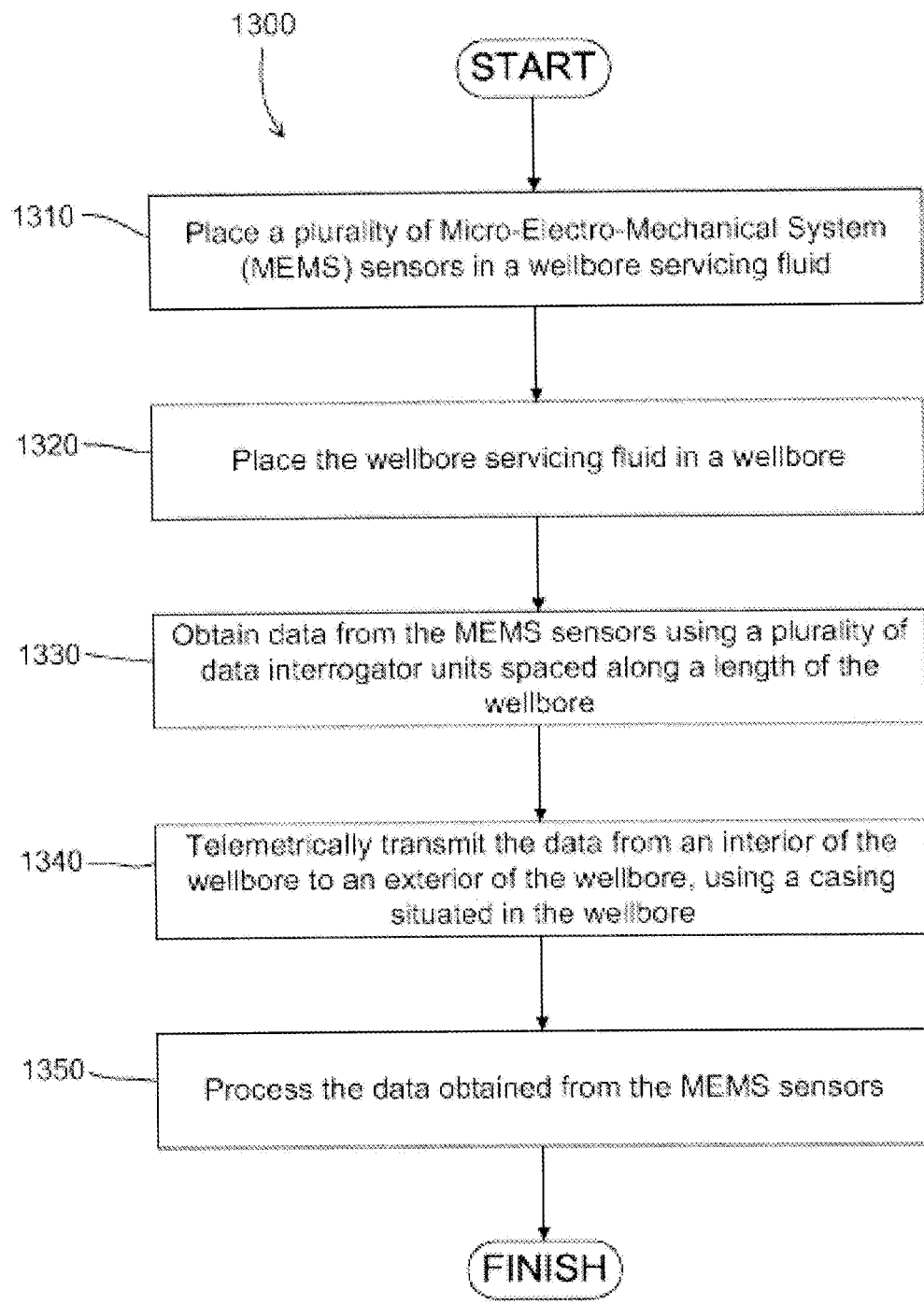
FIG. 13 is a flow chart illustrating a method for servicing a wellbore.

Referring to FIG. 13, a method 1300 of servicing a wellbore is described. At block 1310, a plurality of MEMS sensors is placed in a wellbore servicing fluid. At block 1320, the wellbore servicing fluid is placed in a wellbore. At block 1330, data is obtained from the MEMS sensors, using a plurality of data interrogation units spaced along a length of the wellbore. At block 1340, the data is telemetrically transmitted from an interior of the wellbore to an exterior of the wellbore, using a casing situated in the wellbore (e.g., via acoustic telemetry). At block 1350, the data obtained from the MEMS sensors is processed.

Azimuthally Sensitive Measurements

Figure 14:
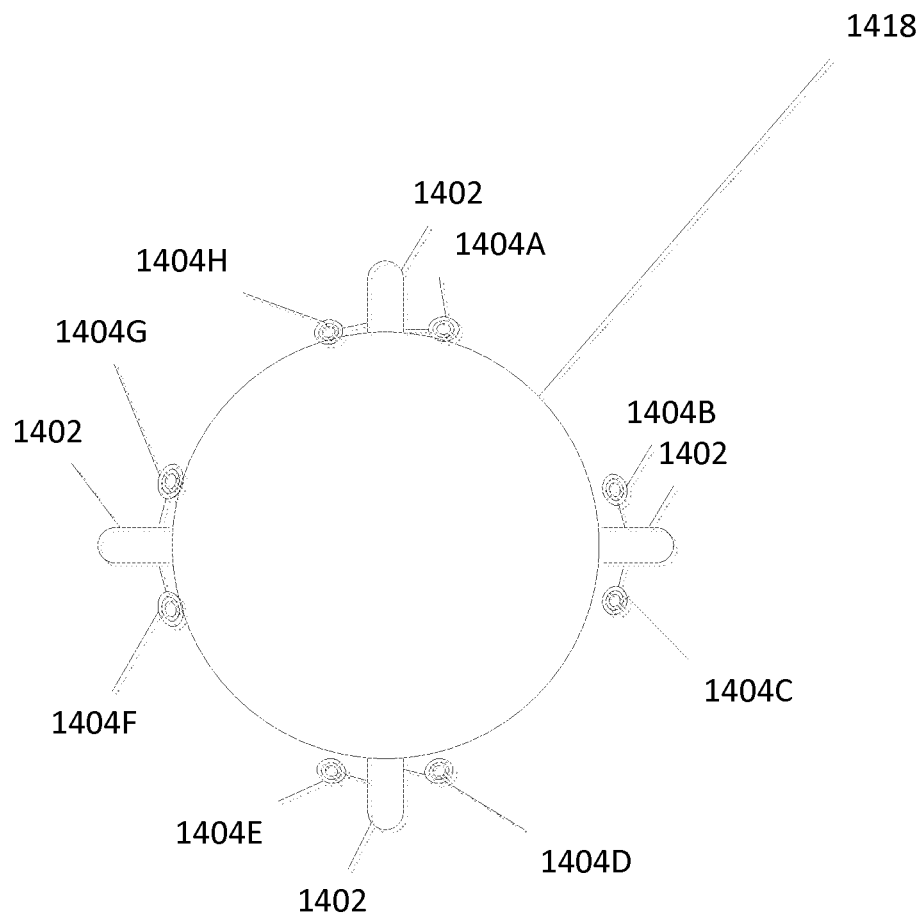
FIG. 14 depicts a functional representations of a communication assemblies suitable for use for obtaining measurements in the well annulus surround the casing.

As noted above regarding FIGS. 1 and 3-4, it can be advantageous to determine the progress or possible completion of a sealing (or "cementing") operation, which can be accomplished by taking measurements along the casing string of the location and progress of the "top of cement" (TOC). It can also be advantageous to monitor the quality of sealant as a barrier, which includes the adequacy of the distribution of sealant throughout the annulus between the casing and the formation. FIG. 14 is a functional representation of an example communication assembly 1400 shown from an end view, as may be used to measure the sealant (or other well servicing fluids) present within different azimuthal regions of the annulus. Communication assembly 1400 is discussed below with reference to some elements depicted in FIG. 5-7.

The example communication assembly 1400 includes a plurality of fins 1402 that extend longitudinally along the assembly and in spaced relation to one another around the periphery of the assembly. In many examples, fins 1402 will be hollow and will house control circuitry or other electronics, for example, voltage-controlled oscillators, memory, analog RF circuitry, sensors, power systems, processors, and other circuitry to enable communication with an external location, etc.

In this example, the fins 1402 will further include interrogation circuitry suitable for generating signals to both interrogate RFID tags (which may include additional MEMS sensor components, as described earlier herein) and to receive signals from those interrogated RFID tags. Such signals will be communicated to one or more antennas 1404 operatively coupled to each instance of such interrogation circuitry). An instance of interrogation circuitry with at least one antenna will form a "sensor assembly" for sensing the presence of RFID tags, and any additional information obtained when the RFID tags are interrogated (such as sensor data).

These sensor assemblies can be of a variety of configurations. As one example, tags may be interrogated though a sensor assembly using a single antenna to both send interrogation signals to RFID tags and receive response signals from such tags. In other examples, a sensor assembly may be configured to use two antennas, one for transmitting the interrogation signals and the other for receiving the response signals. Each sensor assembly (as defined below), includes at least one antenna and the identified interrogation circuitry; however, each sensor assembly will not necessarily include a discrete instance of the interrogation circuitry. For example, the interrogation circuitry can be configured to send/receive signals through multiple antennas, or through multiple pairs of antennas (depending on the sensor assembly configuration). As will be apparent to persons skilled in the art, this functionality can be achieved through multiple mechanisms, for example, such as timeshifting signals communicated to each antenna, or pair of antennas. In other words, in some examples, multiple sensor assemblies may share a single physical instance of interrogation circuitry.

Accordingly, each antenna (in a single antenna send/receive assembly), or each pair of antennas (in a dual antenna send-receive assembly) used to communicate with RFID tags will be referred to as a "sensor assembly" herein, with the understanding that the antennas will be operably coupled to a discrete or shared instance of interrogation circuitry to form the complete sensor assembly. As will be apparent to persons skilled in the art, in substantial part, the location and orientation of the antenna(s) will control the area interrogated by the sensor assembly. Therefore, the location of each single antenna or pair of antenna operated by the interrogation circuitry to interrogate RFID tags will be identified as the "location" of the sensor assembly, notwithstanding that the associated interrogation circuitry may be placed at a different physical location.

The various electronic circuits within each fin 1402 can be configured to communicate as desired with circuitry in another fin 1402. Such communications between can occur through use of any suitable mechanism as will be apparent to those skilled in the art, for example, through use of a serial peripheral interface (SPI), though embodiments are not limited thereto.

Communication assembly 1400 can be configured to be associated with the casing string by a variety of mechanisms. Each communication assembly includes a body member 1408 supporting other components and facilitating association with the casing string. In some embodiments, communication assembly 1400 will include a sleeve body member configured to concentrically engage the outer diameter of a length of casing. In such cases, the sleeve body member can be placed over a length of casing before it is incorporated into the casing string 20, and then secured in place by an appropriate mechanism. As one example, the sleeve body member may be secured against the upset at the box end of the casing section and then clamped in place. In other examples, communication assembly 1400 can include a body member configured as a specialized section of casing 20 (see FIG. 5), which either includes fins 1402 as depicted in FIG. 14, or provides recesses or other structures to house the described components, and configured to be threadably inserted into the casing string 20. In yet another alternative, communication assembly 1400 can have a supporting body member configured as a hinged clamshell (or a two part assembly) that can be secured around a length of casing, without either having to be joined into the casing string or the casing having to be inserted through the body member, as with the above alternative examples.

One consideration in the configuration of communication assembly 1400 will be the structures used for communicating information from the communication assembly. In some examples where communication is through wireless RF communication, the communication assembly may include either a toroidal coil with a core extending circumferentially to the assembly (and casing), or a solenoid coil with windings extending circumferentially around the assembly (and casing string) to transmit the communication signals. Such assemblies may be more difficult to implement in either a clamshell or a multi-section form, relative to solid body member configurations such as the above examples.

Referring again to FIG. 14, example communication assembly 1400 includes four ribs 1402 generally equally spaced around assembly, and therefore equally spaced relative to the circumference of casing 20. As will be apparent to persons skilled in the art having the benefit of this disclosure, either a greater or lesser number of ribs may be utilized as desired for particular application. In the depicted schematic representation, a pair of antennas is provided between each pair of adjacent ribs 1402 to sense RFID tags contained within fluid passing by communication assembly 1400 in the well annulus. In the depicted example, the sensor assemblies are presumed to be of a dual antenna configuration, and thus each pair of antennas between ribs, 1404 A-B, 1404 C-D, 1404 E-F and 1404 G-H, is intended to form a respective sensor assembly under the definition provided above. In other examples, each antenna may represent a separate sensor assembly. Because of the dual antenna sensor assembly configuration assumed in communication assembly 1400, each sensor assembly will interrogate RFID tags within a respective azimuthal quadrant of the annulus surrounding communication assembly 1400 in a well. Any number of ribs, or corresponding structures, may be provided as necessary to house the necessary circuitry, and as desired to provide interrogation within a determined azimuthal region surrounding communication assembly 1400. It should be clearly understood that azimuthal detection is not limited to space between the ribs (or corresponding structures). In some examples, sensor assemblies may be located to sense "across" each rib to maximize azimuthal sensing of the annulus.

Each sensor assembly will often be configured to detect generally within a determined azimuthal region of the annulus. In some implementations, these azimuthal regions may all be distinguished from one another, while in others the azimuthal regions may partially overlap with one another. Additionally, each communication assembly may provide multiple longitudinally offset sensor assemblies, providing redundant sensing within a given azimuthal region. Of course, in many contemplated configurations, multiple communication assemblies longitudinally disposed along the casing string will measure corresponding azimuthal regions as other communication assemblies, albeit at different depths within the borehole.

For the present example, communication assembly 1400 includes four sensor assemblies, as noted above. However, additional ribs may be provided, and may be used to support additional antennas in desired orientations; and/or additional sensor assemblies might be longitudinally offset along communication assembly 1400 relative to those depicted in FIG. 14 (see FIG. 15C).

Figure 15A:
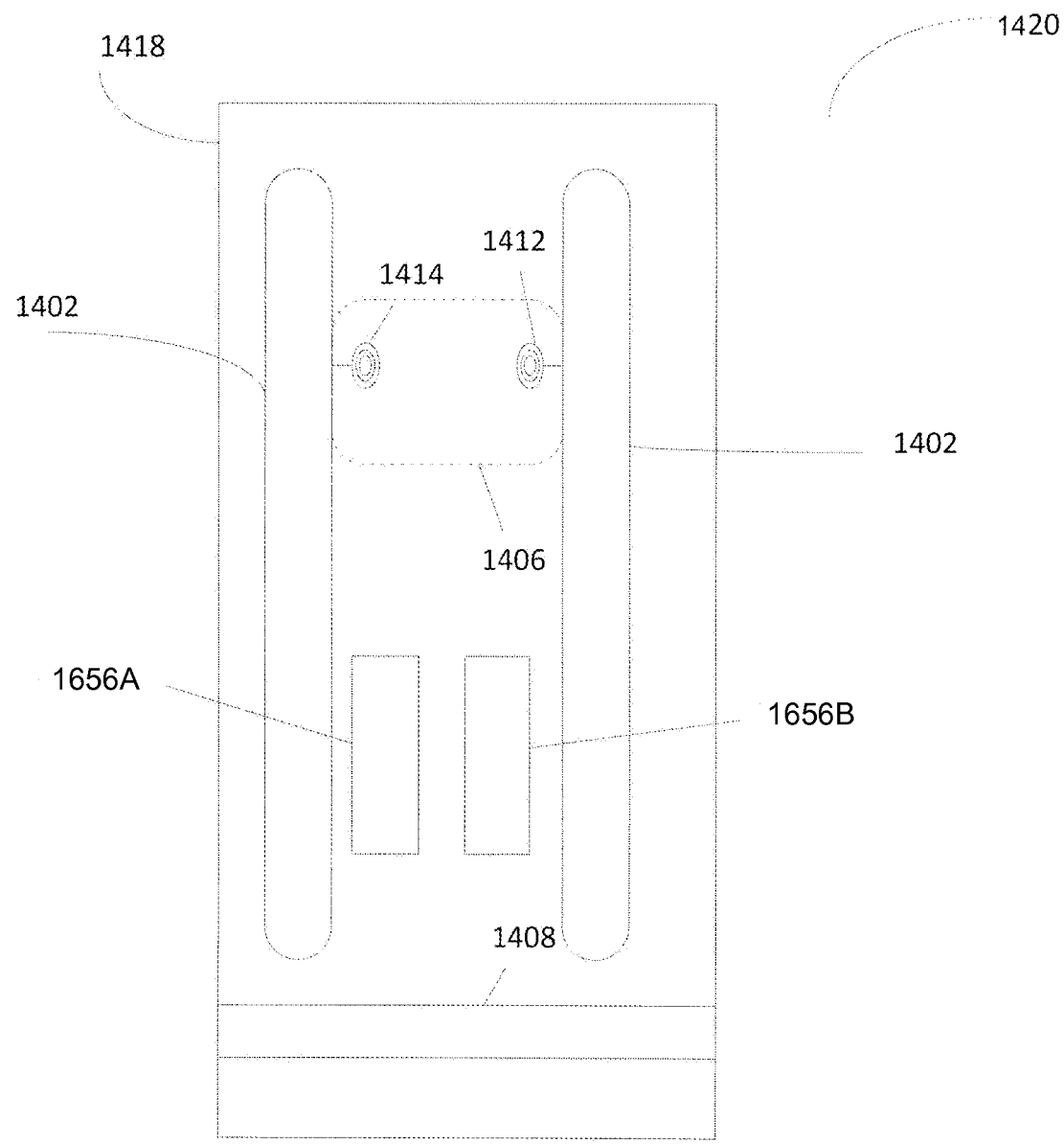
FIGS. 15A-C depict example embodiments of communication assemblies, with each of FIGS. 15A-C depicting a side representation of a respective example configuration.
Figure 15B:
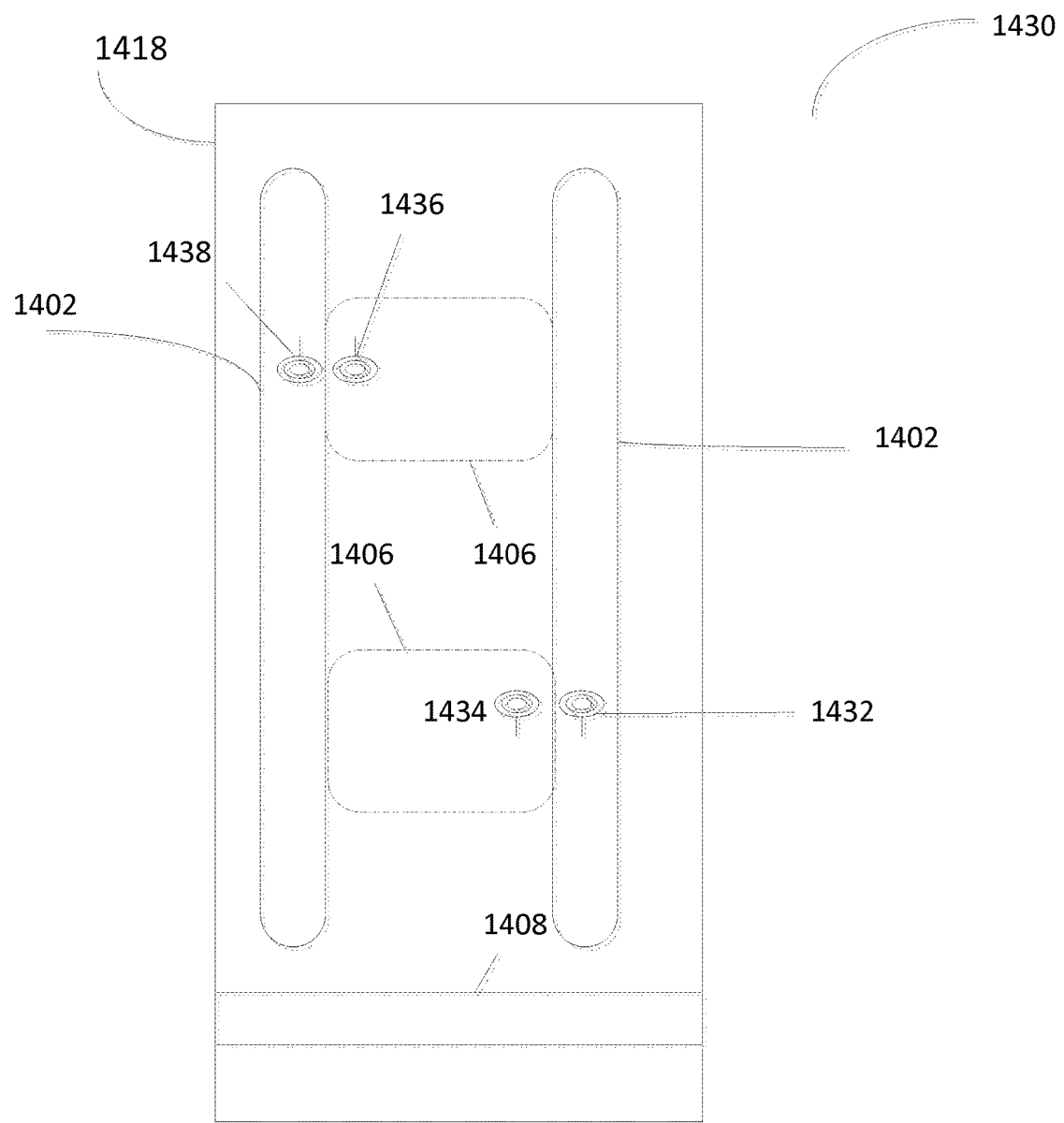
Figure 15C:
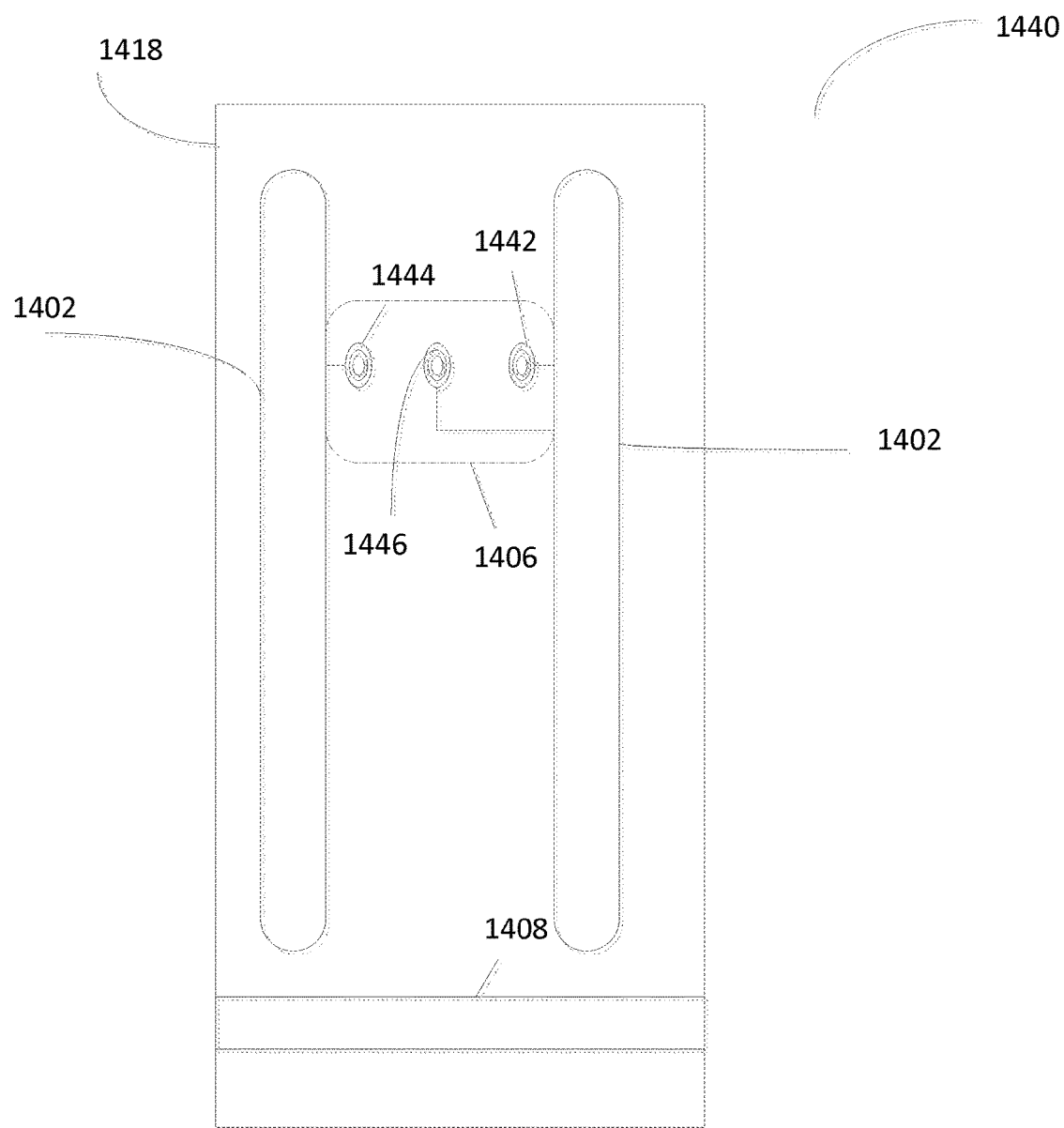

Referring now to FIGS. 15A-C, these figures each depict a side view of a respective example of a communication assembly 1420, 1430, 1440, respectively. Components comparable to those discussed relative to FIG. 14 are numbered similarly in FIGS. 15A-C. In the depicted examples, each communication assembly 1420, 1430, 1440 includes a plurality of antennas (coils) arranged to provide a plurality of sensor assemblies, though only one side of each communication assembly is shown. Accordingly, it should be understood that the described structures would be replicated at a plurality of azimuthally offset locations around each communication assembly 1420, 1430, 1440. Each antenna 1404 can be configured as a loop, dipole, etc., as desired. For the present examples, the antennas 1404 are each depicted as a loop antenna, again in a dual antenna sensor assembly configuration. Each antenna may be oriented on the respective communication assembly 1420, 1430, 1440, as desired to orient the field of the antenna in a desired direction.

Depending upon the specific materials of construction of various portions of a respective communication assembly, antennas may be secured proximate a metallic surface. In such cases, the antennas can be mounted on a dielectric material 1406 to prevent electrical shorts against such metallic surfaces of the communication assemblies. In many cases, this dielectric material can be of any type generally known to persons skilled in the art for electrically isolating and protecting electrical components within downhole tools. For example, a material such as Protech DRB™ or Protech CRB™, available from the Halliburton Company of Houston, Tex. can be used as a suitable dielectric material 1406. The same dielectric material 1406, or another suitable material, can be disposed over antennas 1404 to protect them from the harsh environment within a borehole, including risk of abrasion, chemically induced deterioration, etc.

As noted above, in the dual antenna configuration of sensor assemblies, one antenna 1404 of a pair will transmit RF signals to interrogate RFID tags from one antenna and the other antenna 1404 of the pair will be used to receive signals generated from the RFID tags in response to the interrogation signal. A compatible RFID tag (not shown in FIG. 14) passing in the field between the pair of antennas 1404 will generate a change in the transmission pattern between antennas 1404 in response to the interrogation signal.

In the dual antenna sensor assembly configuration as described earlier, the antennas can be arranged such that they define a generally known region of investigation for the respective sensor assembly. In the example of communication assembly 1420 of FIG. 15A, antennas 1412 and 1414 can be oriented to provide a region of investigation extending generally between the adjacent ribs 1402. As a result, the sensor assembly with antennas 1412 and 1414 will investigate approximately a quadrant of the annulus surrounding communication assembly 1420, up to a maximum depth of investigation as determined by the specific implementation. Monitoring the number of tags identified by that sensor assembly provides an indication of the volume of fluid in which those RFID tags are carried proximate the quadrant investigated by the sensor assembly. In other configurations, such as single antenna sensor assemblies, the location of the antenna, in combination with an experimentally determined region of investigation, can again provide a measure of fluid within azimuthal region of investigation of the sensor assembly. In these types of measurements, the primary concern is as to the number of tags within an identifiable region rather than the placement of any individual tag. Such a system can be implemented with relatively basic passive RFID tags that merely respond to an interrogation rather than transmitting a tag ID or other information.

In interrogating the RFID tags, interrogation circuitry within fin 1402, as described above regarding FIG. 14, can, in some examples, interrogate the RFID tags by scanning through a range of possible tag frequencies, in a manner of RFID tag interrogation known to those skilled in the art. In some examples, the interrogation circuitry will be configured to determine a location of the tag with respect to the antennas by more complex methodologies, such as through evaluating the amplitude of a signal reflected from the tag and/or triangulation through interrogation of a tag by multiple sensor assemblies. In many of these example implementations it will be preferable that the RFID tags each have a unique tag ID, enabling the tag to be individually distinguished. In such systems, interrogation circuitry within fin 1402 can be configured detect azimuthal direction of a tag based on a transmission pattern or amplitude of a reflected signal between a tag and one or more antennas 1404. Therefore, the nature or type of fluid in which tags are disposed can again be detected at different azimuthal directions relative to communication assembly 1400 and casing 20.

Many possible arrangements of antennas are contemplated, and the described system is not limited to any particular configuration of antennas. The number, arrangement and spacing of antennas can be adjusted based on, for example, power needs, performance requirements, or borehole conditions.

As noted above, the communication assemblies may include a coil that extends in either a toroidal or solenoid form concentrically to the casing to facilitate wireless communication of obtained data. An example coil 1408 is depicted in each of communication assemblies 1420, 1430, 1440.

This disclosure addresses, later herein, in reference to FIG. 16, the inclusion of an acoustic transceiver (1656) in an interrogation/communication unit (1610) is described. This interrogation/communication can be of any of the forms described earlier herein including that of a communication unit as discussed in reference to FIGS. 14 and 15A-C. The described acoustic transceiver 1656 includes an acoustic sensor 1652 configured to direct ultrasonic waves into the wellbore servicing fluid 1630 and to receive reflected waves. Acoustic transceiver 1656, also includes an acoustic transmitter 1660 and an acoustic receiver 1658, and as well as a microprocessor 1662 for providing the control functions to both transmit the acoustic signals and receive signals from the receivers. As depicted in FIG. 15A at 1656A-B, example communication assembly 1420 includes a plurality of such acoustic transceivers deployed circumferentially around the assembly. In the depicted example, the acoustic transceivers are placed between the ribs 1402. In some implementations, the acoustic transceivers will have a thickness that would undesirably take up additional radial space relative to the body member 1408, as to make their placement between the ribs less than optimal. In such cases acoustic transceivers 1656A-B may be incorporated into the ribs 1402. Subject to spatial limitations and practical considerations such as diminishing value to additional sensors, any number of such acoustic transceivers may be included in each communication assembly 1420 in spaced relation around the circumference of body member 1408.

Referring now to FIG. 15B, the figure depicts an alternative configuration of the communication assembly 1430. Communication assembly 1430 includes a sensor assembly including one antenna 1432 oriented along one fin 1402, with a paired antenna oriented at an angle such as by being placed generally in a plane tangential to body member 1408 of the communication assembly (i.e., in this example extending generally in parallel to a tangent of the underlying casing string). In this example, a second similarly arranged sensor assembly having a pair of antennas 1436, 1438 is included at a longitudinally offset location along body member 1408.

FIG. 15C depicts an alternative configuration of a communication assembly 1440 in which an antenna 1446 is placed in a generally central location between two ribs 1402 to serve as either a transmit or receive antenna relative to a pair of nearby antennas 1442, 1444. Antennas 1442, 1444 may be mounted, for example, on the adjacent ribs 1402, and configured to perform the opposite transmit/receive function. Thus, the central antenna 1446 is shared by two sensor assemblies each having antenna 1442 or 1444 as the other antenna. In some implementations, this configuration may serve to provide increased certainty of investigation across an azimuthal region of the surrounding annulus.

As is apparent from the discussion above, in many example systems, a plurality of communication assemblies will be disposed in longitudinally-spaced relation to each other along the casing 20, at least over a region of interest relative to either the sealing operation or to other downhole conditions.

As previously described regarding at least FIG. 1, a location, in particular a top location, of the sealant (i.e., generically referred to as "top of cement," or "TOC") can be determined by finding a location on casing string 20 where below it, primarily only tags associated with the sealant are identified, while above the location, only tags associated with other fluids, for example spacer fluid or drilling mud, are identified. It will be understood there may be some mixing due to irregularities in the formation sidewalls that will trap some of the tags and possibly their associated fluids from the spacer and mud pumped through annulus 26.

Therefore, some tags associated with one type of fluid may become mixed with a different type of fluid than that indicated by the tag type.

Each communication assembly will preferably include an azimuthal indicator, for example a compass, to determine the orientation of the communication assembly once it is disposed within the borehole. With a known orientation of the communication assembly, the orientation of each fin and/or sensor assembly will be known and therefore the quadrant or other azimuthally offset region being investigated will similarly be known. The depth of each casing assembly can be known, for example through a record of the location of each communication assembly as it is associated with the casing string 20 as the string is placed in the wellbore, providing a measure of depth as to the surface.

In different examples, TOC measurement can be done after the pumping of the sealant is completed or the measurement can be a dynamic measurement of the TOC while the sealant is moving up annulus 26. The other measurements described herein facilitate measurements not only of the TOC, but also of the distribution of the cement or other sealant around the casing over the region of the casing string that includes associated communication assemblies. Regions where a minimal number of tags of the type entrained within the sealant are located indicate a region where, for some reason, sealant has been blocked from reaching the region, or has reached the region in a relatively limited volume. Identifying both the depth and orientation where this occurs facilitates remediation efforts Each communication assembly 1400 can report information associated with the sensed tags to a surface system, for example surface system 630, using communication methods described above regarding FIG. 5-7. In some examples, this may be as basic as a number of tags sensed within a given time interval, grouped or formatted in a manner to indicate the azimuthal orientation of the sensing. Sometimes, this will include a similar number of tags of each of a plurality of frequencies sensed within the time interval, and grouped or formatted to indicate the azimuthal orientation. In other example systems, RFID tags may be used which include tag IDs, facilitating identification of which individual tags have been sensed. As noted above, the information associated with the sensed tags may include MEMS sensor data.

The novel techniques described above to determine whether sealant (or another fluid in the borehole) is observed in a volume throughout the surrounding annulus consistent with a successful cementing (i.e. sealing). This operation can be achieved through use of relatively simple RFID tags. As discussed earlier, similar relatively simple RFID tags responsive to a different frequency may be dispersed into other fluids, so that the progress of multiple fluids in the annulus can be observed.

While these measurements with relatively simple RFID tags are extremely useful, it must be understood that similar techniques are applicable to perform more sophisticated measurements. As described earlier, more sophisticated RFID tags having associated MEMS sensors of various types may be placed within the well servicing fluids (see paragraph [0083]). These MEMS sensor tags may include sensors for detecting temperature or any of a variety of fluid properties, etc. These additional properties can be important to fully evaluating the quality of the sealing operation, particularly over time.

For example, monitoring temperature in the annulus can identify regions where the sealant is curing either improperly or inconsistently relative to other areas in the annulus. The ability to identify azimuthal regions where the temperature is inconsistent either with other regions or with expectations can be useful in identifying defects such as fluid incursions. Such temperature sensing MEMS RFID tags may in some cases be active (having a contained power source) or may be passive and energized by the interrogation signal.

Sensed fluid properties may also be of significant use in evaluating the sealing operation. For example, a change in pH in a region of the annulus may also indicate a fluid incursion potentially adversely affecting the sealing operation. As with other measurements, the ability to identify an azimuthal orientation of the sensed parameter provides valuable information facilitating further analysis and/or remediation within the well. Again, in various embodiments these tags may be either active or passive.

Temperature Monitoring Through the Communication Assemblies

As noted above, in some example systems, temperature sensing MEMS sensor RFID tags may be used to monitor temperature within the annulus to evaluate curing of the sealant. In some situations, temperature variations might indicate fluid incursion and/or low barrier quality. As an alternative to tag-based temperature monitoring, in some example systems, temperature sensors can be mounted on or associated with the communication assemblies, rather than the RFID tags. In some examples, these sensors may be mounted directly on the surface of the communication assembly. However, in some applications, it may be desirable to extend the sensors away from the communication assembly and casing, both to avoid temperature effects from those members, and to more directly monitor temperatures in the annulus.

To achieve this result, in some examples, one or more flexible fingers supporting temperature sensors can be anchored on the communication assembly with the temperature sensors electrically coupled to the circuitry therein. The flexible fingers will typically be oriented to extend out into the annulus 26, and to extend in an uphole direction, so that as the casing string is lowered into the borehole, the fingers would be pointed back up toward the surface so they would not be caught on the formation during the run-in, but would instead drag the tips down the formation wall. When the sealant is pumped up the well from the bottom, again the fingers would be pointed downstream (i.e. uphole) with respect to the flowing sealant and would maintain their orientation in the annulus 26. The temperature sensors and the wires leading back to the casing collar can be placed on the side of the fingers oriented toward the casing collar, thus protecting the sensors and wiring from the formation wall and the flowing sealant. With the sensors distributed along the fingers across the annulus 26, thermal measurement of the sealant may be improved. In such examples, the temperature information can be communicated to a receiving unit, such as a surface unit 630, along with the other sensed information from the communication assembly.

Figure 16:
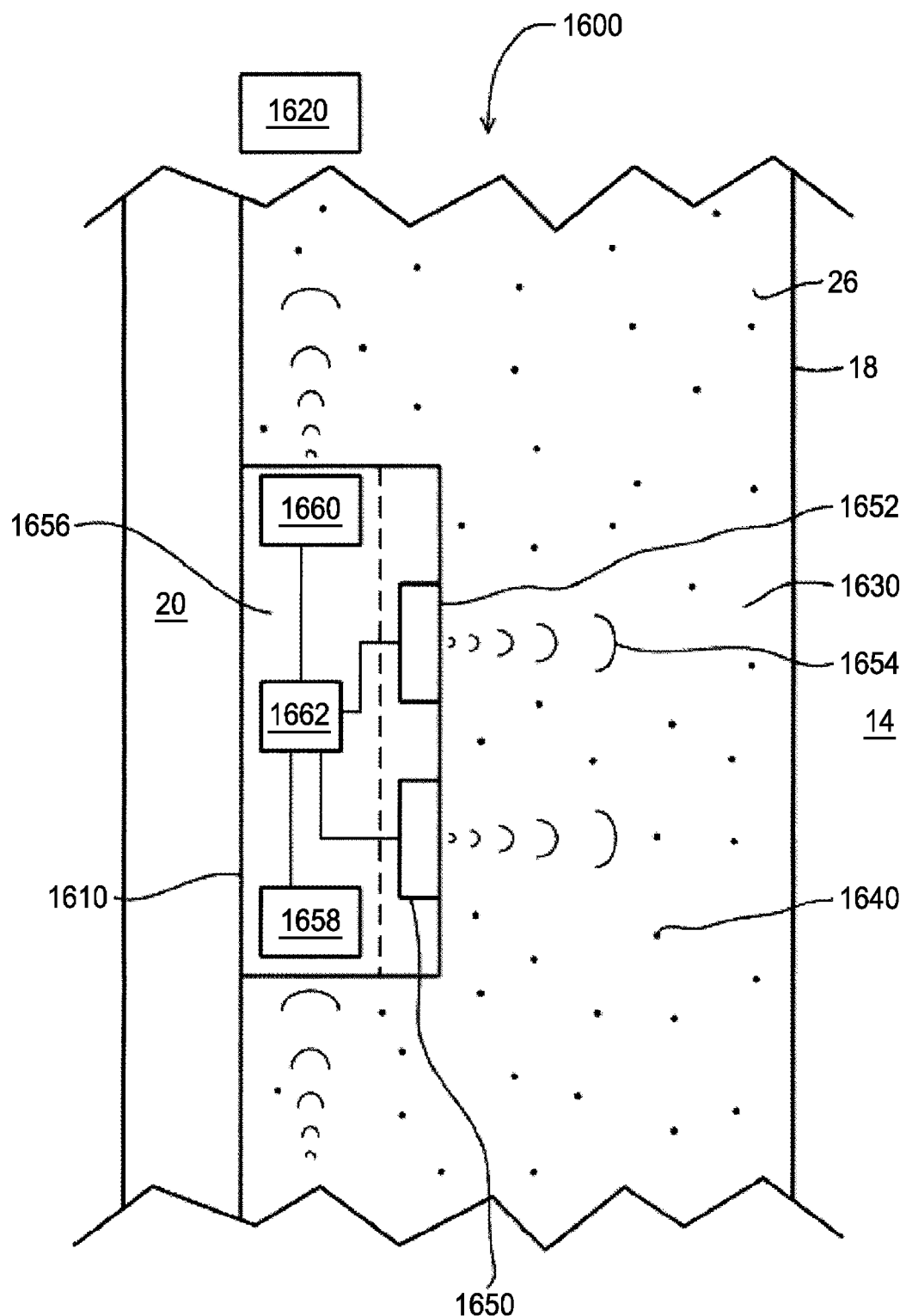
FIG. 16 depicts an example system for detecting RFID tags in a borehole annulus.

Turning to FIG. 16, the figure illustrates an embodiment of a portion of a wellbore parameter sensing system 1600. The wellbore parameter sensing system 1600 comprises the wellbore 18, the casing 20 situated in the wellbore 18, a plurality of regional communication units 1610 attached to the casing 20 and spaced along a length of the casing 20, a processing unit 1620 situated at an exterior of the wellbore and communicatively linked to the units 1610, and a wellbore servicing fluid 1630 situated in the wellbore 18. The wellbore servicing fluid 1630 may comprise a plurality of MEMS sensors 1640, which are configured to measure at least one wellbore parameter. In an embodiment, FIG. 16 represents a regional communication unit 1610 located on an exterior of the casing 20 in annular space 26 and surrounded by a cement composition comprising MEMS sensors. The unit 1610 may further comprise a power source, for example a battery (e.g., lithium battery) or power generator.

In an embodiment, the unit 1610 may comprise an interrogation unit 1650, which is configured to interrogate the MEMS sensors 1640 and receive data regarding the at least one wellbore parameter from the MEMS sensors 1640. In an embodiment, the unit 1610 may also comprise at least one acoustic sensor 1652, which is configured to input ultrasonic waves 1654 into the wellbore servicing fluid 1630 and/or into the oil or gas formation 14 proximate to the wellbore 18 and receive ultrasonic waves reflected by the wellbore servicing fluid 1630 and/or the oil or gas formation 14. In an embodiment, the at least one acoustic sensor 1652 may transmit and receive ultrasonic waves using a pulse-echo method or pitch-catch method of ultrasonic sampling/testing. A discussion of the pulse-echo and pitch-catch methods of ultrasonic sampling/testing may be found in the NASA preferred reliability practice no. PT-TE-1422, "Ultrasonic Testing of Aerospace Materials," In alternative embodiments, ultrasonic waves and/or acoustic sensors may be provided via the unit 1610 in accordance with one or more embodiments disclosed in U.S. Pat. Nos. 5,995,447; 6,041,861; or 6,712,138, each of which is incorporated herein in its entirety.

In an embodiment, the at least one acoustic sensor 1652 may be able to detect a presence and a position in the wellbore 18 of a liquid phase and/or a solid phase of the wellbore servicing fluid 1630. In addition, the at least one acoustic sensor 1652 may be able to detect a presence of cracks and/or voids and/or inclusions in a solid phase of the wellbore servicing fluid 1630, e.g., in a partially cured cement slurry or a fully cured cement sheath. In a further embodiment, the acoustic sensor 1652 may be able to determine a porosity of the oil or gas formation 14. In a further embodiment, the acoustic sensor 1652 may be configured to detect a presence of the MEMS sensors 1640 in the wellbore servicing fluid 1630. In particular, the acoustic sensor may scan for the physical presence of MEMS sensors proximate thereto, and may thereby be used to verify data derived from the MEMS sensors. For example, where acoustic sensor 1652 does not detect the presence of MEMS sensors, such lack of detection may provide a further indication that a wellbore servicing fluid has not yet arrived at that location (for example, has not entered the annulus). Likewise, where acoustic sensor 1652 does detect the presence of MEMS sensors, such presence may be further verified by interrogation on the MEMS sensors. Furthermore, a failed attempt to interrogate the MEMS sensors where acoustic sensor 1652 indicates their presence may be used to trouble-shoot or otherwise indicate that a problem may exist with the MEMS sensor system (e.g., a fix data interrogation unit may be faulty thereby requiring repair and/or deployment of a mobile unit into the wellbore). In various embodiments, the acoustic sensor 1652 may perform any combination of the listed functions.

In an embodiment, the acoustic sensor 1652 may be a piezoelectric-type sensor comprising at least one piezoelectric transducer for inputting ultrasonic waves into the wellbore servicing fluid 1630. A discussion of acoustic sensors comprising piezoelectric composite transducers may be found in U.S. Pat. No. 7,036,363, which is hereby incorporated by reference herein in its entirety.

In an embodiment, the regional communication unit 1610 may further comprise an acoustic transceiver 1656. The acoustic transceiver 1656 may comprise an acoustic receiver 1658, an acoustic transmitter 1660 and a microprocessor 1662. The microprocessor 1662 may be configured to receive MEMS sensor data from the interrogation unit 1650 and/or acoustic sensor data from the at least one acoustic sensor 1652 and convert the sensor data into a form that may be transmitted by the acoustic transmitter 1660.

In an embodiment, the acoustic transmitter 1660 may be configured to transmit the sensor data from the MEMS sensors 1640 and/or the acoustic sensor 1652 to an interrogation/communication unit situated uphole (e.g., the next unit directly uphole) from the unit 1610 shown in FIG. 16. The acoustic transmitter 1660 may comprise a plurality of piezoelectric plate elements in one or more plate assemblies configured to input ultrasonic waves into the casing 20 and/or the wellbore servicing fluid 1630 in the form of acoustic signals (for example to provide acoustic telemetry communications/signals as described in various embodiments herein). Examples of acoustic transmitters comprising piezoelectric plate elements are given in U.S. Patent Application Publication No. 2009/0022011, which is hereby incorporated by reference herein in its entirety.

In an embodiment, the acoustic receiver 1658 may be configured to receive sensor data in the form of acoustic signals from one or more acoustic transmitters disposed in one or more interrogation/communication units situated uphole and/or downhole from the unit 1610 shown in FIG. 16. In addition, the acoustic receiver 1658 may be configured to transmit the sensor data to the microprocessor 1662. In embodiments, a microprocessor or digital signal processor may be used to process sensor data, interrogate sensors and/or interrogation/communication units and communicate with devices situated at an exterior of a wellbore. For example, the microprocessor 1662 may then route/convey/retransmit the received data (and additionally/optionally convert or process the received data) to the interrogation/communication unit situated directly uphole and/or downhole from the unit 1610 shown in FIG. 16. Alternatively, the received sensor data may be passed along to the next interrogation/communication unit without undergoing any transformation or further processing by microprocessor 1662. In this manner, sensor data acquired by interrogators 1650 and acoustic sensors 1652 situated in units 1610 disposed along at least a portion of the length of the casing 20 may be transmitted up or down the wellbore 18 to the processing unit 1620, which is configured to process the sensor data.

In embodiments, sensors, processing electronics, communication devices and power sources, e.g., a lithium battery, may be integrated inside a housing (e.g., a composite attachment or housing) that may, for example, be attached to an outer surface of a casing. In an embodiment, the housing may comprise a composite resin material. In embodiments, the composite resin material may comprise an epoxy resin. In further embodiments, the composite resin material may comprise at least one ceramic material. In further embodiments, housing of unit 1610 (e.g., composite housing) may extend from the casing and thereby serving additional functions such as a centralizer for the casing. In alternative embodiments, the housing of unit 1610 (e.g., composite housing) may be contained within a recess in the casing and by mounted flush with a wall of the casing. Any of the composite materials described herein may be used in embodiments to form a housing for unit 1610.

In embodiments, sensors (e.g., the acoustic sensors 1652 and/or the MEMS sensors 1640) may measure parameters of a wellbore servicing material in an annulus situated between a casing and an oil or gas formation. The wellbore servicing material may comprise a fluid, a cement (or other sealant) slurry, a partially cured cement slurry, a cement sheath, or other materials. Parameters of the wellbore and/or servicing material may be acquired and transmitted continuously or in discrete time, depending on demands. In embodiments, parameters measured by the sensors include velocity of ultrasonic waves, Poisson's ratio, material phases, temperature, flow, compactness, pressure and other parameters described herein. In embodiments, the unit 1610 may contain a plurality of sensor types used for measuring the parameters, and may include lead zirconate titanate (PZT) acoustic transceivers, electromagnetic transceivers, pressure sensors, temperature sensors and other sensors.

In embodiments, unit 1610 may be used, for example, to monitor parameters during a curing process of cement situated in the annulus. In further embodiments, flow of production fluid through production tubing and/or the casing may be monitored. In various embodiments, an interrogation/communication unit (e.g., unit 1610) is utilized for collecting data from sensors, processing data, storing information, and/or sending and receiving data. Different types of sensors, including electromagnetic and acoustic sensors as well as MEMS sensors, may be utilized for measuring various properties of a material and determining and/or confirming an actual state of the material. In an embodiment, data to be processed in the interrogation/communication unit may include data from acoustic sensors, e.g., liquid/solid phase, annulus width, homogeneity/heterogeneity of a medium, velocity of acoustic waves through a medium and impedance, as well as data from MEMS sensors, which in embodiments include passive RFID tags and are interrogated electromagnetically. In an embodiment, each interrogation/communication unit may process data pertaining to a vicinity or region of the wellbore associated to the unit.

In a further embodiment, the interrogation/communication unit may further comprise a memory device configured to store data acquired from sensors. The sensor data may be tagged with time of acquisition, sensor type and/or identification information pertaining to the interrogation/communication unit where the data is collected. In an embodiment, raw and/or processed sensor data may be sent to an exterior of a wellbore for further processing or analysis, for example via any of the communication means, methods, or networks disclosed herein.

In an embodiment, data acquired by the interrogation/communication units may be transmitted acoustically from unit to unit and to an exterior of the wellbore, using the casing as an acoustic transmission medium. In a further embodiment, sensor data from each interrogation/communication unit may be transmitted to an exterior of the wellbore, using a very low frequency electromagnetic wave. Alternatively, sensor data from each interrogation/communication unit may be transmitted via a daisy-chain to an exterior of the wellbore, using a very low frequency electromagnetic wave to pass the data along the chain. In a further embodiment, a wire and/or fiber optic line coupled to each of the interrogation/communication units may be used to transmit sensor data from each unit to an exterior of the wellbore, and also used to power the units.

In an embodiment, a circumferential acoustic scanning tool comprising an acoustic transceiver may be lowered into a casing, along which the interrogation/communication units are spaced. The acoustic transceiver in the circumferential acoustic scanning tool may be configured to interrogate corresponding acoustic transceivers in the interrogation/communication units, by transmitting an acoustic signal through the casing to the acoustic transceiver in the unit. In an embodiment, the memory devices in each interrogation/communication unit may be able to store, for example, two weeks worth of sensor data before being interrogated by the circumferential acoustic scanning tool. The acoustic transceiver in the circumferential acoustic scanning tool may further comprise a MEMS sensor interrogation unit, and thereby interrogate and collect data from MEMS sensors.

In embodiments, data interrogation/communication units or tools of the various embodiments disclosed herein may be powered by devices configured to generate electricity while the units are located in the wellbore, for example turbo generator units and/or quantum thermoelectric generator units. The electricity generated by the devices may be used directly by components in the interrogation/communication units or may be stored in a battery or batteries for later use.

Detecting RFID Tags and Use of RFID Detector Circuits

Turning to FIGS. 17A-D, the figures depict several example embodiments illustrating signal/noise ratios as related to RFID detection. In real world conditions, such as those in a borehole, detection of RFID tags may be difficult in some cases due to an electrically noisy environment or due to the distances between an RFID tag and an RFID detector. The greater the distance between the two, the more generally difficult it will be to detect the RFID tag. Structures and techniques described herein are suitable in a number of different specific configurations to detect RFID tags in environments such as a borehole of a subterranean well Note that to the example embodiments discussed below focus on the detecting/reading of RFID tags; but the described tags may, in some examples, have additional functionality. As just one example (and as identified earlier herein), the tags may include one or more MEMS sensors.

FIGS. 17A-D depict example detection power curves relating to detecting of an RFID tag. FIG. 17A depicts a conceptualized example of an ideal power response curve 1700 relating to detecting an RFID tag. In this chart, a power level is shown as would be measured by a sensor assembly. Note that as discussed above and herein, in some examples, such a sensor assembly may include an RFID detector circuit such as circuit 2200 (discussed below relative to FIG. 22).

As will be understood by one of skill in the art, power is used by a sensor assembly in order to emit an electromagnetic field usable to power (and detect) remote RFID tags. If an RFID tag is within sufficient distance of the emitted electromagnetic signal, for example, a current may be induced in the tag, causing an observable change in a power level at the sensor assembly (e.g., corresponding to power use by the RFID tag). Thus, if the sensor assembly detects a sufficient change in power, an RFID tag may be present.

Generally, the greater the distance of a tag from a sensor assembly, the less of a power response will be seen. Thus, in an environment where tags may or may not be present at a particular time (such as a region of interest in a borehole during a cementing operation), detecting RFID tags in a reliable yet energy conscious manner may present challenges.

In example embodiments, a power response is seen from an RFID tag at a frequency at which the tag operates. Thus, if a tag operates at 5.040 MHz (for example), no detectable power response may occur if the sensor assembly is transmitting at a frequency of 4 MHz, as one example. By changing the frequency of the sensor assembly (e.g., increasing or decreasing the frequency), however, a power response of the RFID tag may be observed as the operating frequency of a tag is approached. Accordingly, in an example case, for a tag that operates at 5.040 MHz, some response might be observable at 5.039 MHz, while a greater (maximal) response might be observed at a scan frequency of 5.040 MHz.

Accordingly, a sensor assembly may scan at different frequencies to determine if one or more particular RFID tags exist within a detectable distance range. Chart 1700 is shown as a conceptualized ideal response curve for an RFID tag that operates at a frequency $f_1$ and that is within range of a suitable sensor assembly. In this example, no power response from a tag is observed at a first scan frequency $f_0$ of the sensor assembly. As the frequency of the sensor assembly increases, however, toward the tag frequency, a power response can be seen, with a maximum response being seen at tag operating frequency $f_1$. Continuing to increase the frequency of the sensor assembly past $f_1$ will then show a decreased power function, as seen in curve 1710. When the frequency of the sensor assembly reaches a faster frequency $f_2$, no observable power response is seen from the RFID tag. A detection window for the RFID tag may therefore exist between $f_0$ and $f_2$ in this example.

In the idealized response scenario of chart 1700, the observed power response is flat (unchanged) in frequency ranges that are sufficiently far away from the operating frequency $f_1$ of the tag (e.g., beyond $f_0$ and $f_2$). In real world scenarios such as a borehole, however, materials or other environmental factors will often affect the power response detected by a sensor assembly.

Referring now to FIG. 17B, the depicted curve 1710 depicts a conceptualized scenario intended to be more reflective of real world conditions. In chart 1700, a sensor assembly is operated at various frequencies to detect a tag with an operating frequency $f_1$ and that is present from the sensor assembly at a distance $D_1$. In this case, the power response differential observed for the tag (as measured between $f_0$ and $f_1$, or $f_1$ and $f_2$) may still be sufficiently large to easily detect the tag. Note that in this non-idealized scenario, however, power response fluctuations are seen due to factors other than the presence of the tag (e.g., electromagnetic properties of materials in a borehole or surrounding geological formations).

Referring now to FIGS. 17C and D, the depicted curves 1720 and 1730, respectively, show similar possible example power response curves for an RFID tag at increasingly further distances $D_2$ and $D_3$ from the sensor assembly (i.e., $D_1 < D_2 < D_3$). In these scenarios, the differentials between observed power responses at $f_0$ and $f_1$ (as well as $f_1$ and $f_2$) become increasingly smaller. The RFID tag may therefore become increasingly difficult to detect without an increased probability of generating false positives. In chart 1730, for example, the tag operating at frequency $f_1$ may be practically undetectable.

Figure 18A:
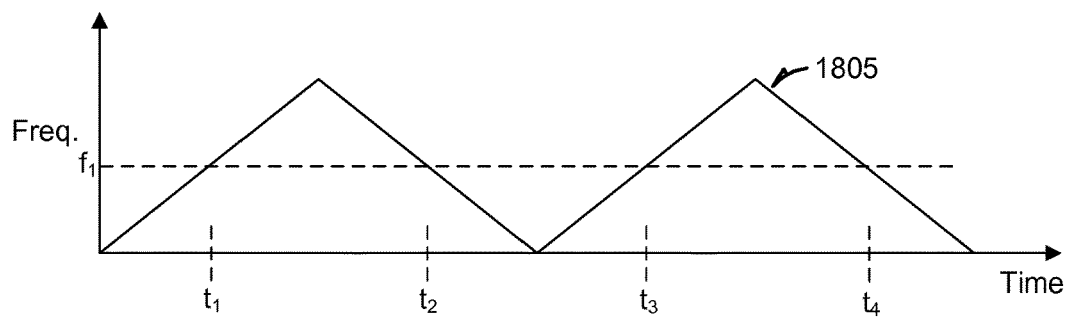
FIG. 18A is a conceptualized diagram of one embodiment of a "sawtooth" scanning pattern usable to detect RFID tags.

Turning to FIG. 18A, a conceptualized diagram is shown of one embodiment of a "sawtooth" scanning pattern usable to detect RFID tags. In this embodiment, a sensor assembly is configured to raise and lower an RFID scanning frequency 1805 over time in the manner shown. Accordingly, the y-axis in this chart represents a scanning frequency of a sensor assembly, while the x-axis represents time. In this example, a particular frequency $f_1$ is a target frequency at which one or more RFID tags are known to operate. Times $t_1$, $t_2$, $t_3$, and $t_4$ are indicated to show times at which scanning frequency 1805 is the same as (intersects) frequency $f_1$.

Figure 18B:
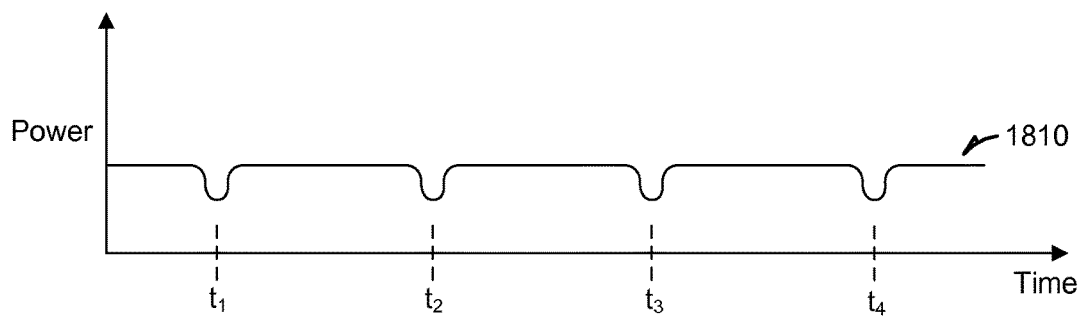
FIG. 18B a related conceptual diagram of an embodiment of a power response curve corresponding to FIG. 18A.

In FIG. 18B, a related conceptual diagram is shown of an embodiment of an idealized power response curve as might be seen in response to the frequency scanning pattern of FIG. 18A. In this example, power response curve 1810 indicates a power response as detected by a sensor assembly.

As shown, power response curve 1810 is uniformly level except at times near to $t_1$, $t_2$, $t_3$, and $t_4$, which correspond to tag detection events. As the sensor assembly's scanning frequency (indicated by frequency 1805 in FIG. 18A) approaches the tag's target frequency $f_1$, for example, a detected power level in the sensor assembly begins to change, indicating that the tag's operating frequency is being approached (and that a current is being induced in the tag).

As the scanning frequency 1805 meets and then begins to exceed $f_1$, however, the power response curve 1810 begins to revert to background levels. Note that in the conceptualized example of FIGS. 18A-18B, other distortions or environmental factors affecting detected power response are not present, but may be present in various borehole or other real world scenarios.

Figure 19:
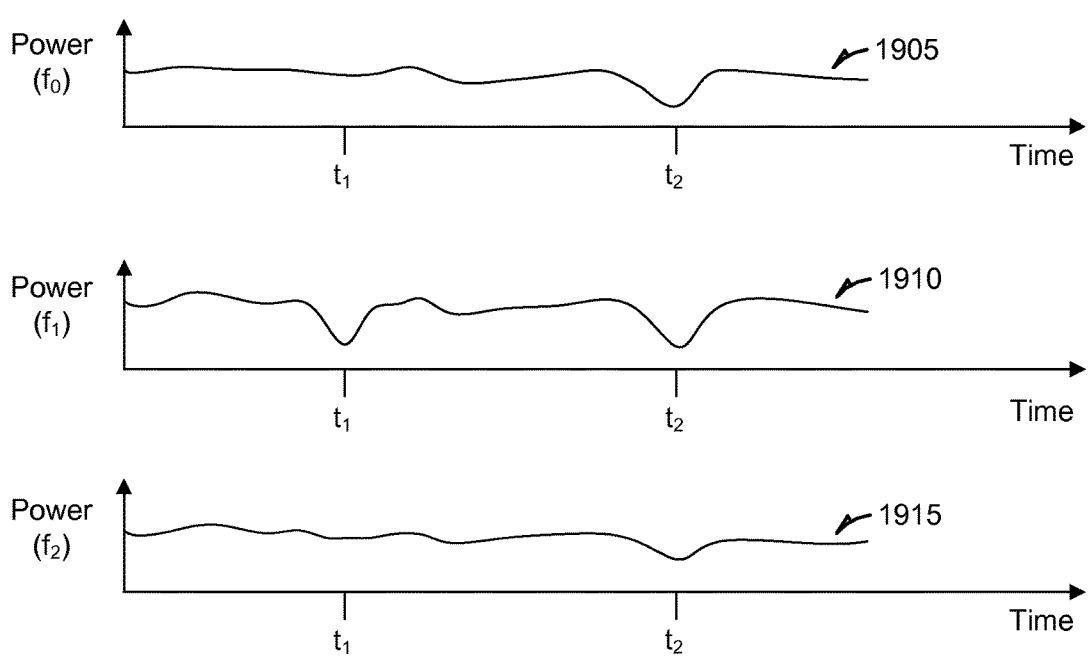
FIG. 19 is a conceptualized group of charts of power response by a sensor assembly as a function of time at different frequencies.

Turning to FIG. 19, a conceptualized group of charts are shown of power response by a sensor assembly as a function of time at different frequencies. In this example, power response curves 1905, 1910, and 1915 each respectively correspond to frequencies $f_0$, $f_1$. $f_2$. These power response curves also include various distortions representative of those that can be caused by environmental or other distortion-inducing factors.

Accordingly, in a potentially noisy environment such as that of FIG. 19, tag detection may be more difficult. In this example, $f_1$ is the operating frequency of an RFID tag, while $f_0$ is a nearby lower frequency and $f_2$ is a nearby higher frequency. As explained below, power response curves 1905 and 1915 may be used by way of comparison with power response curve 1910 in order to better detect an RFID tag, while also controlling the potential for false positive detection.

Looking solely at power response curve 1910, there are several rises and dips in the power response curve that could potentially indicate the presence of an RFID tag. For example, power response changes are observable near both $t_1$ and $t_2$ for power response curve 1910. To better determine whether the power response changes near $t_1$ and $t_2$ actually indicate the presence of a tag, however, power response curve 1910 may be compared to power response curve 1905. This comparison may help ascertain whether the observed power response changes in curve 1910 are simply the result of environmental conditions rather than the actual presence of a tag.

Figure 20:
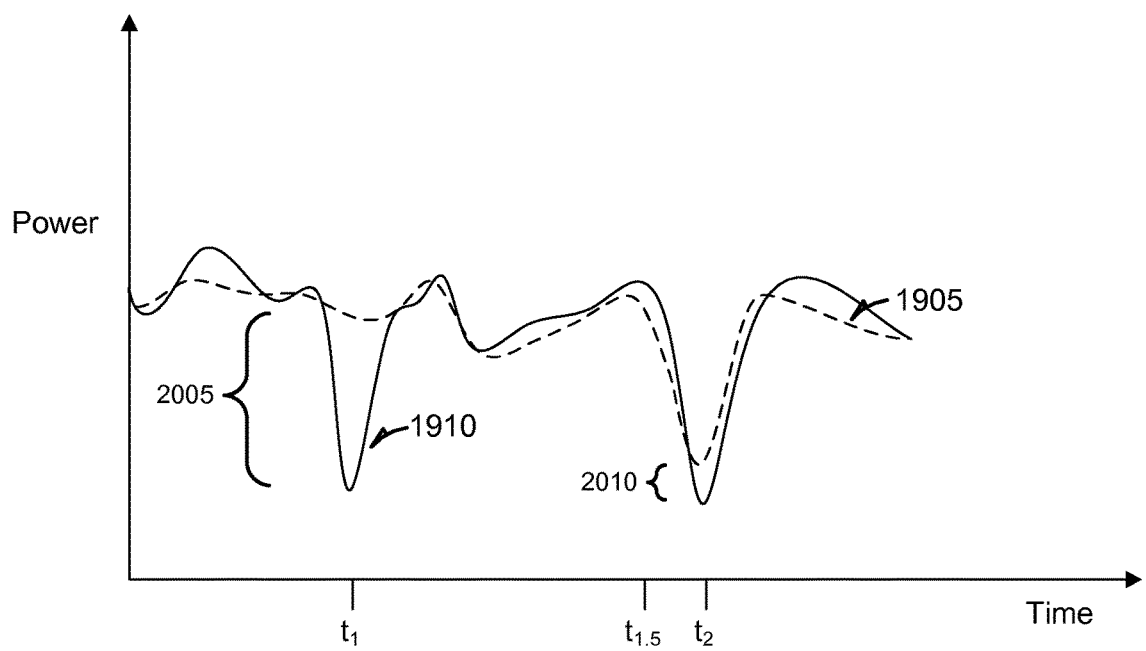
FIG. 20 is a chart showing two power response curves from FIG. 19 superimposed for comparison.

Turning to FIG. 20, a chart is shown with two superimposed power response curves from FIG. 19. Power response curve 1905 (corresponding to frequency f0) is superimposed on power response curve 1910 (corresponding to target frequency f1). As shown, the scale of curves 1905 and 1910 have been exaggerated for purposes of illustration.

In this example, at time $t_1$, a comparison of curve 1910 to curve 1905 shows a relatively large differential 2005 between the two power responses, indicating the likely presence of an RFID tag. In contrast, however, although power response curve 1910 changes significantly around time $t_2$ (e.g., between times $t_{1.5}$ and $t_2$), power response curve 1905 also shows a large change.

Thus, a comparison of curve 1910 to 1905 at time $t_2$ shows a relatively small differential 2010 between the two curves. Although there is a large power response change in curve 1910 around time $t_2$, the fact that there is another similar large power response change in curve 1905 (for a different, lower frequency) indicates that the distortion in the power response for curve 1910 may not actually be due to the presence of a tag. Instead, this change may be due to an environmental factor that has similarly affected other frequencies.

Accordingly, in this example, the changes in power response curve 1910 might seemingly indicate that two tags are present, but a comparison with power response curve 1905 reveals that only one tag may be present. Similar comparisons between power response curves 1910 and 1915 may likewise be used to help determine whether a change in power response for curve 1910 is occurring primarily only at frequency $f_1$ (indicating probable tag presence), or at potentially numerous frequencies (indicating that an environmental factor, rather than an RFID tag, may be causing a power distortion).

Note that in the example of FIG. 20, comparisons between power response curves are shown as being made for different frequencies but at identical times (e.g., simultaneous scans). Simultaneous scanning at different frequencies may be feasible in embodiments in which hardware permits it (e.g., using two different RFID antennas). In other embodiments, however, scanning may be limited to one frequency at a time. In such embodiments, scanning at a first frequency such as $f_0$ may occur at an earlier (or later) time from scanning at a second frequency such as $f_1$.

In scenarios in which scanning at different frequencies occurs sequentially, a power response at a first frequency may be observed within a first period of time (e.g., 300 ms). A detected result might then be stored in a sample/hold circuit for later use. A power response for a second frequency might then be similarly observed for a same period of time (e.g., 300 ms), and then compared to the earlier stored results for the first scan at the first frequency. Thus, in various embodiments, detecting RFID tags does not require scanning more than one frequency at a given time (although this may be possible in some scenarios).

Figure 21A:
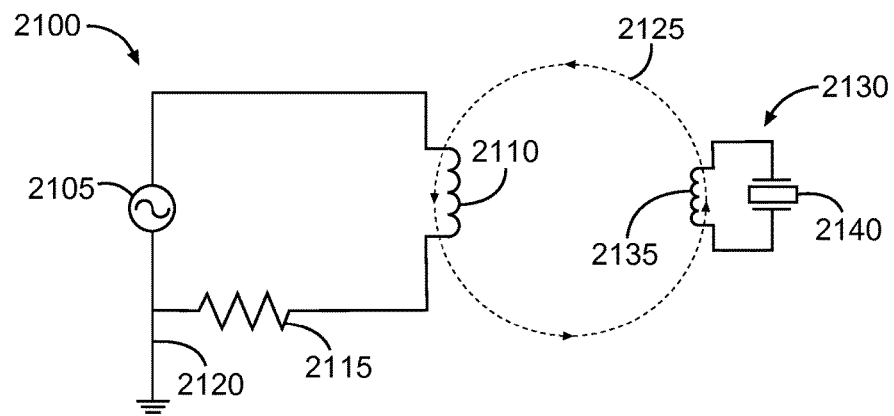
FIGS. 21A-B are each a block diagram of a respective example embodiment of an RFID detection system, depicted in FIG. 21A having an RFID detection circuit and an RFID tag circuit; and depicted in FIG. 21B having a transmitter circuit, a detector circuit and a an RFID tag circuit.
Figure 21B:
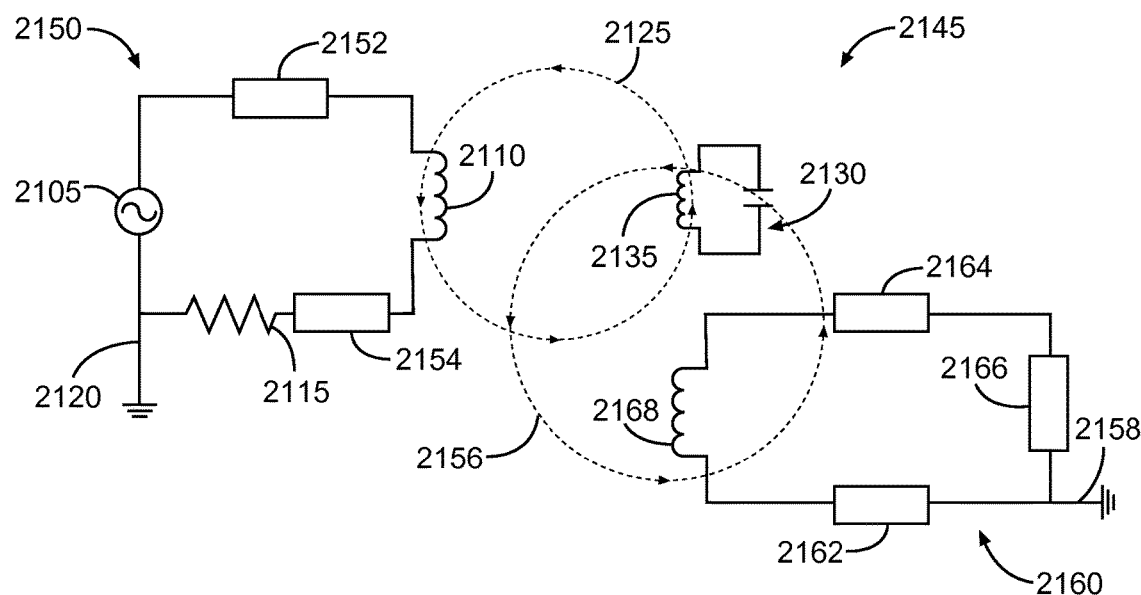

Turning to FIGS. 21A-B, FIG. 21A depicts a block diagram of one example embodiment of an RFID detection circuit 2100 and an RFID tag circuit 2130. RFID detection circuit 2100 is configured to interrogate and detect the RFID tag circuit 2130 through use of a single antenna 2110. In this figure, RFID detection circuit 2100 includes a signal generator 2105, inductor 2110, resistor 2115, and ground connection 2120, linked by electrical pathways. RFID tag circuit 2130 (which may be a portion of an RFID tag) includes an inductor 2135 and a capacitor 2140.

In the example shown, signal generator 2105 includes an alternating current (AC) power source that drives current through inductor 2110. Current in RFID detection circuit 2100 flows through inductor 2110 and resistor 2115 toward ground connection 2120, and creates a magnetic field 2125. Magnetic field 2125 will induce a current in inductor 2135 and power RFID circuit 2130, and the current in inductor 2135 generates a magnetic field that is reflected back to RFID detection circuit 2100.

As will be appreciated by one of skill in the art, the voltage of the reflected signal may be measured across resistor 2115 in order to determine a presence of an RFID tag circuit 2130. For example, a signal reflected by the RFID tag circuit 2130 (or borehole walls, fluids, etc.) and received at the RFID detection circuit 2100 can be monitored by taking voltage measurements across the resistor 2115 to determine a frequency response of the signal. The frequency response can have a known value when no RFID tag circuit 2130 is present, for example if the signal was reflected by another body downhole. When an RFID tag circuit 2130 is present, a dip, or "spike" will be induced in the frequency response at the resonant frequency of the RFID tag circuit 2130 or at a frequency shifted by a distance from the resonant frequency of the RFID tag circuit 2130. Detection of such a spike indicates presence of the RFID tag circuit 2130. Corresponding changes in measured voltage across resistor 2115 may therefore indicate tag presence.

Referring now to FIG. 21B, the figure depicts an alternative example of an RFID detection circuit 2145 configured to interrogate an RFID tag circuit 2130 by transmitting signals through a transmitter 2150 having a first antenna 2110 with an associated magnetic field 2125 when transmitting, and receiving signals through a receiver 2160 having a second antenna 2168. Like RFID detection circuit 2100 (of FIG. 21A) transmitter 2150 includes a signal generator 2105, inductor 2110, resistor 2115, and ground connection 2120, linked by electrical pathways. Transmitter 2150 further includes a pair of matching element assemblies 2152 and 2154, located between the signal generator 2105 and inductor 2110, and between the inductor 2110 and resistor 2115, respectively. Matching element assemblies 2152 and 2154 will each be formed of a combination of two or more circuit elements selected from the group of a capacitor, a resistor and an inductor, with the selected elements cooperatively arranged to balance impedance on opposite sides of antenna 2110. In many examples, both matching element assemblies 2152, 2154 will be of essentially identical configuration.

Receiver 2160 includes two matching element assemblies 2162 and 2164 on opposite sides of inductor 2168, which is arranged to receive signals through a magnetic field 2130. In this example configuration, one matching element assembly 2162 extends to ground 2158 while the other matching element assembly 2164 is coupled to a power detector 2166. Matching element assemblies are formed of selected circuit elements as described above relative to matching element assemblies 2152 and 2154; and matching element assemblies will again often be of essentially identical configuration to one another.

Figure 22:
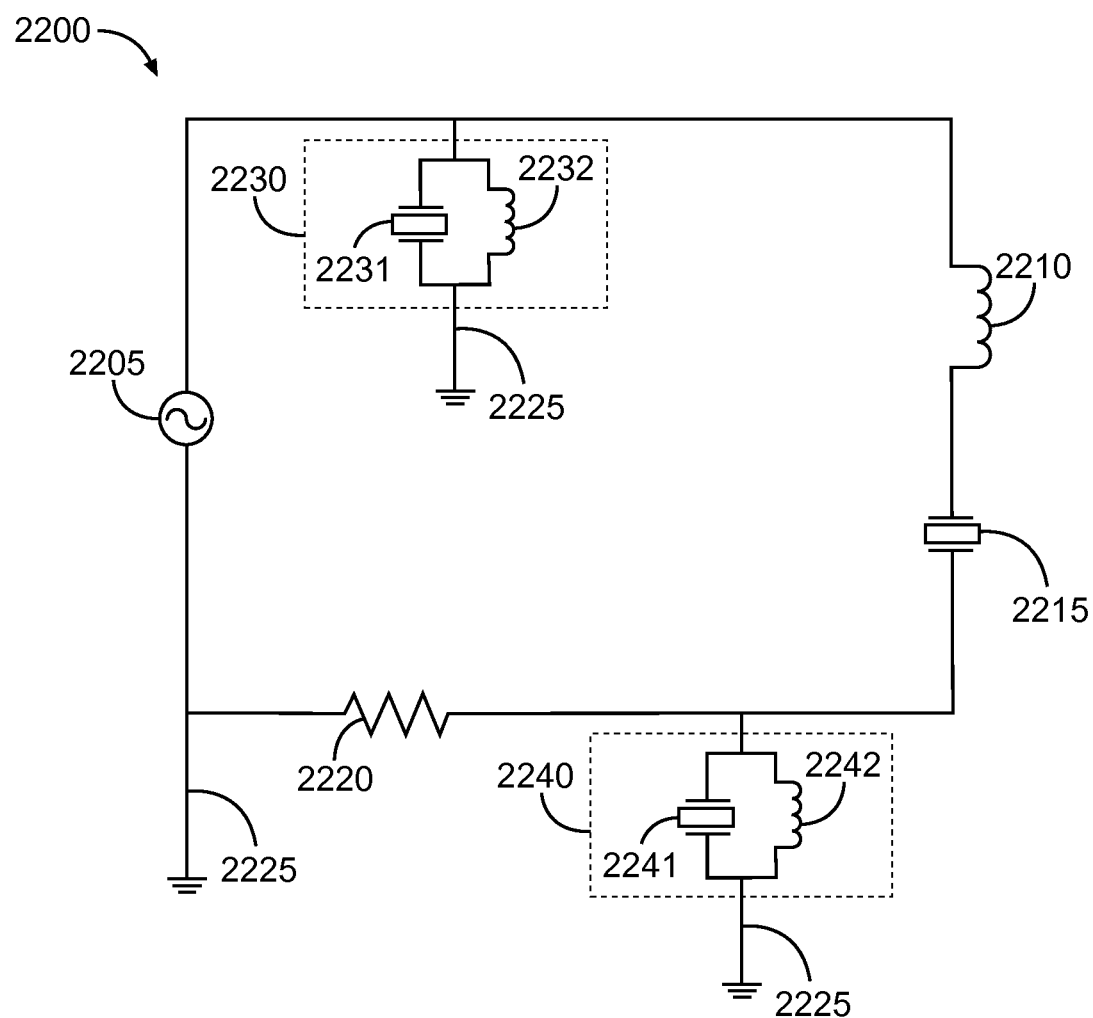
FIG. 22 is a block diagram of another example embodiment of an RFID detection circuit with additional components.

In FIG. 22, a block diagram is shown of an example embodiment of an RFID detection circuit 2200 generally in accordance with the structure of RFID detection circuit 2100 (see FIG. 21A), with the addition of example impedance matching elements, and an additional capacitor. As shown, RFID detection circuit 2200 includes a signal generator 2205; a first resonant circuit, in this example comprising a first inductor 2210 and a first capacitor 2215, coupled in series to a resistor 2220 extending to ground connection 2225. RFID detection circuit also includes first and second impedance matching assemblies in the form of a first sub-circuit 2230, and a second sub-circuit 2240. Each sub-circuit 2230, 2240 forms a second resonant circuit, in this example, with first sub-circuit 2230 comprising a second capacitor 2231 and a second inductor 2232 coupled in parallel to one another to ground; and with second sub-circuit 2240 including a third capacitor 2241 and a third inductor 2242 coupled in parallel to one another to ground.

RFID detection circuit 2200 may be used to interrogate RFID tag circuit 2130. As shown, signal generator 2205 includes an AC power source that drives current through inductor 2210, creating a magnetic field to induce a current in RFID tag circuit 2130. Thus, similar to circuit 2100, a voltage measured across resistor 2220 of certain characteristics will indicate the presence of an RFID tag.

Component values for RFID detection circuit 2200 (e.g., impedance, capacitance, and induction values) may be chosen to provide better levels of tag detection than those provided by RFID detection circuit 2100. For example, component values may be chosen with respect to a center frequency (e.g., a target frequency at which an RFID tag operates), as well as a center bandwidth (e.g., a frequency range around which RFID detection may be centered). After determining center frequency and center bandwidth, one technique for choosing component values involves selecting a characteristic impedance of the RFID detection circuit (e.g., with respect to resistor 2220) and then selecting further component values based on these techniques known to one skilled in the art (e.g., using algebraic rules).

Another technique, however, involves selecting a characteristic inductance of the RFID detection circuit (e.g., with respect to inductor 2210), and then selecting further component values appropriately. In other words, characteristics of other components in circuit 2200 may be chosen based on characteristics of inductor 2210 (e.g., coil dimensions, properties, etc.). In some instances, choosing to first select a characteristic inductance of the RFID detection circuit before choosing other component values (rather than first selecting a characteristic impedance of the RFID detection circuit) may provide for a better detection response (e.g., allowing tags to be detected at a greater distance range) by causing a greater observable power response (e.g., voltage response across resistor 2220). Thus, in some embodiments, component values are chosen primarily with respect to the inductance value L of inductor 2210.

In one embodiment, once an intrinsic L value (L') of inductor 2210 is known, inductance and capacitance values for the matching circuits can be determined by first determining a desired circuit bandwidth (BW), and then defining the angular frequency of ω' to be equal to $2\pi f_{BW}$, where $f_{BW}$, is the center frequency at the bandwidth BW.

Next, knowing intrinsic L' and prototype values for L, R and w, a ratio of L'/L, where:

$$L' = \frac{R'}{\omega'} \qquad \text{eq. 1}$$

and $$L = \frac{R}{\omega} \qquad \text{eq. 2}$$

can be rewritten as:

$$L' = \left(\frac{R'}{R}\right)\left(\frac{\omega'}{\omega}\right)L \qquad \text{eq. 3}$$

Solving for R' yields:

$$R' = \left(\frac{L'}{L}\right)\left(\frac{\omega'}{\omega}\right)R \qquad \text{eq. 4}$$

Given example values for a three pole filter of 2 Henries (H) for L, 1 rad/sec for prototype circuit angular frequency ω, and a termination resistance R of 1Ω, then R' can be expressed as:

$$R' = \left(\frac{L'}{2H}\right)\left(\frac{2\pi f_{BW}}{1}\right)\left(\frac{1}{2}\Omega\right) \qquad \text{eq. 5}$$

which simplifies to:

$$R' = L'\pi f_{BW} = L'\omega' \qquad \text{eq. 6}$$

R' can be therefore be calculated based on the known intrinsic inductance and desired resonant frequency and BW of circuit 2200. Next, values for other inductors and capacitors of circuit 2200 are selected using impedance matching methods. For example, given $f_{BW}$, and BW (which further gives a desired Q of $$\frac{f_{BW}}{BW})$$

and center loop inductance L', impedance is calculated for each filter and this dictates values for capacitors 2231 and 2241 and inductors 2232 and 2242 when calculated according to methods known by those skilled in the art (e.g., using the American Radio Relay League™ (ARRL) handbook.

RFID detection circuit 2200 may be suitably coupled to other circuits or include additional components in various embodiments in order to perform operations as described herein and below (e.g., with respect to method 2300). For example, RFID detection circuit 2200 may include or be coupled to one or more of any of a voltage monitoring circuit, a frequency stepping control circuit, an analog subtraction circuit, a digital comparator circuit, an analog scaling circuit, an analog scaling circuit, an analog sample/hold circuit, an analog-to-digital sampling circuit, a band-pass filter, or other circuitry.

Figure 23:
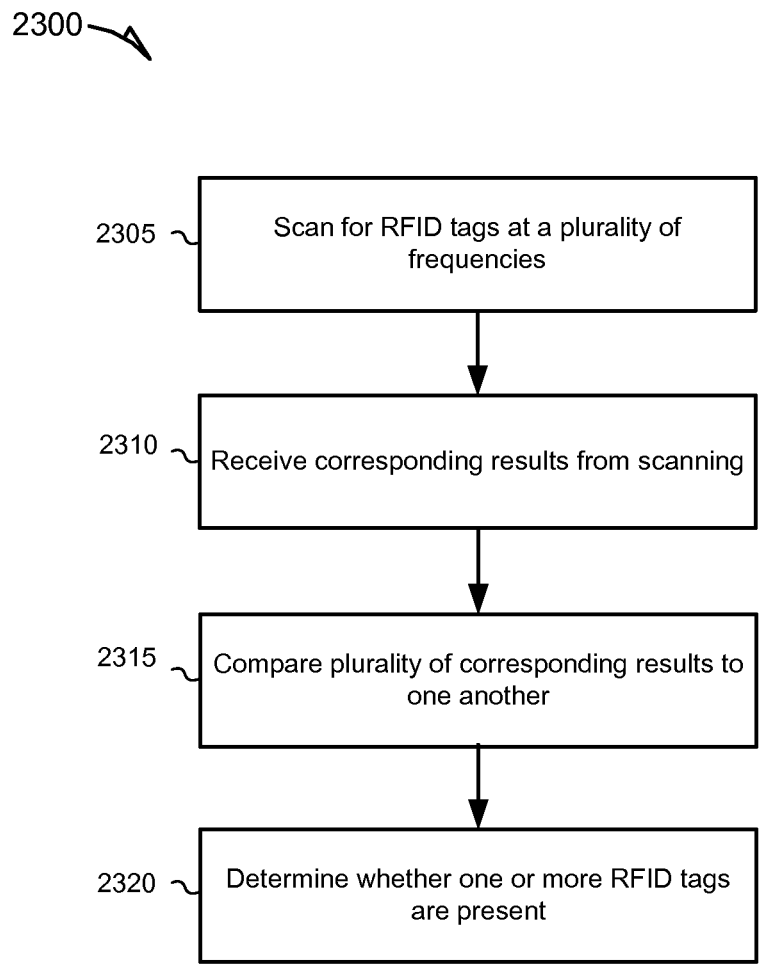
FIG. 23 is a flow chart of an example embodiment of a method relating to detection of RFID tags.

Turning to FIG. 23, the figure depicts an example embodiment of a method 2300 relating to detection of RFID tags. Various steps performed in method 2300 may be performed by a sensor assembly and/or portions thereof (such as RFID detector circuit 2200) in some embodiments. Method 2300 may include additional operations in some instances, and some portions of method 2300 may be omitted and/or performed in a different order than the one shown as consistent with this disclosure.

In step 2305, RFID tags are scanned for at a plurality of frequencies. This step may be performed by a sensor assembly that scans in a portion of an annulus surrounding an exterior of a casing string of a borehole, for example (as discussed above, a current passing through inductor 2210 may cause an electromagnetic signal of a first frequency, second frequency, etc. to be emitted into a portion of the borehole). In some example embodiments, a frequency stepping control circuit (e.g., coupled to RFID detector circuit 2200) may be used to cause voltage measurements (e.g., across resistor 2220) to occur at different specified frequencies. Frequency stepping may be performed in a variety of different manners, such as the sawtooth pattern shown in FIG. 18A. Different frequency scanning intervals may be used in various configurations (e.g., scanning at individual ones of a fixed set of frequencies in a particular order, scanning at regular intervals where each next frequency scanned is a fixed interval above or below the previous frequency, etc.) Accordingly, a frequency stepping control circuit may include components synchronizing timing with signal generator 2105 in various embodiments.

In one embodiment, step 2305 includes scanning at a target frequency at which an RFID tag operates and another frequency that is slower or faster than the target frequency. In another embodiment, step 2305 includes scanning at least three frequencies: one frequency that is slower than a target frequency, the target frequency, and at least one frequency that is faster than the target frequency (e.g., scanning on both sides of a target frequency).

Thus, in embodiments in which step-wise scanning is performed, a series (two or more) of successively faster frequencies may be scanned, going low to high over time. In such embodiments, a scan result of a relatively lower frequency scan (scanned at an earlier time) may be subtracted from (or otherwise compared to) a scan result of a relatively higher frequency scan (scanned at a later time). In many examples, the stepwise scans will be performed across a range of frequencies extending both above and below a target frequency. Thus, such scans can be performed starting at a frequency lower than a target frequency and extending to a final frequency higher than the target frequency, or alternatively, can proceed in the opposite direction. Combinations of these techniques may be used in conjunction with sawtooth frequency scanning patterns as seen in FIG. 18A, for example.

In step 2310, corresponding results are received for each of the plurality of frequencies scanned in step 2305. In some embodiments, the received corresponding result for each of the plurality of frequencies scanned includes an analog value indicative of a reflected power level in a portion of the annulus. (As noted, the reflected power level may be affected by the presence of a tag, environmental factors, or structural formations beyond the borehole.) In one embodiment, the received corresponding result for a scan of a particular frequency is an analog voltage value (e.g., as measured across a sensing resistor such as a resistor (as shown, for example, at 2220 in FIG. 22). In other embodiments, received results for a scan may include an analog current measurement in RFID detector circuit 2200, though in some situations, voltage may be easier to measure.

In one embodiment, a scan result (e.g., measured voltage level) for a particular frequency may be determined by averaging different results received over time. For example, two or more measurements for a scan at a single frequency may be taken, and then averaged together before comparing the average to a result of a scan at a different frequency. Averaging may be performed by analog techniques in some embodiments, and may reduce the noise effect of transient environmental factors in some instances.

In step 2315, a plurality of the corresponding scanning results from step 2310 are compared to one another by a desired method. For example, a first voltage value resulting from a scan at a first frequency may differ from a second voltage value resulting from a scan at a second frequency, and such difference (however determined) indicates a difference in power response in a portion of an annulus of the borehole, which may indicate the presence of a RFID tag.

Thus, in one embodiment, step 2315 includes using an analog subtraction circuit to subtract a voltage level measured for a scan of one frequency from a voltage level measured for a scan of another frequency. By subtracting voltages from one another, a voltage differential may be determined. The voltage differential may indicate a relative difference in power response at different frequencies from a scanned region of interest, for example. Such a voltage differential may then be used to determine the presence or absence of a tag, as discussed below. Such comparison, and/or other forms of comparison, may be performed, if desired, in the digital domain.

In some instances, step 2315 includes multiple comparisons of scan results. For example, a first voltage differential between a scan of relatively lower frequency and a scan of a target frequency may be determined. A second voltage differential between a scan of the target frequency and a relatively higher frequency may also be determined. Note that the phrase "comparing a plurality of results to one another," as used herein, does not require that every single one of those results be compared to every single other one of those results.

Step 2315 may also include use of an analog sample/hold circuit to store results of previous measurements for purposes of comparison, in some embodiments. For example, a first result from a scan at a first frequency may be stored in the analog sample/hold circuit and later retrieved to compare that result with a second result from a scan at the same or a second frequency. Thus, in one embodiment, an analog sample/hold circuit stores a voltage measurement indicative of a reflected power level from a portion of a borehole. The sample/hold circuit can then provide the stored result to an analog subtraction circuit for purposes of comparison with another voltage measurement. Sampling/hold circuits may be used for other types of measurements as well. Use of a sample/hold circuit may therefore provide greater flexibility in various embodiments by allowing a single coil sensor to sequentially detect results for scans at different frequencies.

In step 2320, a determination is made as to whether one or more RFID tags are present based on one or more comparisons between scan results made in step 2315. In some embodiments, step 2320 includes determining whether a difference (e.g., voltage differential), or some other comparison between a plurality of scan results from different scans exceeds a threshold or other reference value.

Threshold values may generally be used for detecting RFID tags in order to distinguish from random noise or other electromagnetic fluctuations. Use of threshold values may therefore reduce false positives (detection of a tag that is not actually present) in some scenarios. A particular threshold value may be determined empirically by way of experimentation (e.g., performing tests in a laboratory environment or in a borehole environment), or may be determined in other manners (for example, by scan result averaging, as discussed above.

By comparing a voltage differential to a threshold value, in one embodiment, step 2320 produces an indication as to whether one or more RFID tags are present. Referring briefly to FIG. 20, for example, a voltage differential corresponding to power response differential 2005 would exceed the threshold value, indicating a tag. A voltage differential corresponding to power response differential 2010, however, would fail to exceed the threshold value, indicating that no tag is present. Note that results from step 2320 (and other steps of method 2300 generally) may be stored by a sensor assembly. The sensor assembly may also transmit such results to other systems, such as a surface computer system used by a borehole operator.

In one embodiment, determining whether one or more RFID tags are present includes determining if a threshold value is exceeded on both sides of a target frequency (slower and faster) at which an RFID tag operates. For example, a voltage differential between a scan at a relatively lower frequency and a scan at a target frequency may be sufficiently large to exceed a threshold value. The voltage differential between the scan at the target frequency and a scan at a relatively high frequency, however, might fail to exceed the threshold value. In this scenario, by checking that two or more differentials both exceed a threshold (e.g., checking differentials on either side of a target frequency), greater tag detection reliability may be achieved in some cases, and false positives may be avoided.

In one embodiment, step 2320 may also include converting an analog value to a digital value prior to comparison with a threshold value. For example, an output of an analog subtraction circuit (e.g., a voltage differential) may be converted by a sampling circuit to a digital value for ease of comparison. Once converted, the corresponding digital value may then be directly compared to a digital threshold value in order to determine if the threshold value has been exceeded.

Additional operations may also be performed prior to comparing a result (e.g., analog subtraction result) to a threshold value. In one embodiment, a bandpass filter may filter frequencies for a voltage signal measured by an analog monitoring circuit (e.g., frequencies that are lower than a first threshold and higher than a second threshold). In a downhole environment, for example, a pumping system could introduce low frequency noise that would be desirable to filter out before a voltage measurement is taken (or after, in some embodiments). Thus, in one embodiment, 15 Hz is used as the high pass frequency of the bandpass filter, and 300 Hz is used as the low pass frequency of the bandpass filter (to eliminate or reduce other environmental noise. Accordingly, in some embodiments, prior to comparing a plurality of scanning results to one another, a bandpass filter is applied to each of the plurality of results. Bandpass filtering may improve detection performance in some instances.

Alternatively, as discussed relative to FIGS. 18A-B, the detected power levels as a function of a plurality of scan frequencies may be used as a spectrum to define a reference level to assist in identifying power levels indicative of the presence of an RFID tag. In such methods, one or more of the measured power levels may be compared to, or otherwise evaluated relative to, one or more other of the measured power levels or to a separately established reference value (or pattern) in order to determine a response indicative of a tag. Such reference value might be, for example, a reference pattern (for example, possibly a sine function) established by previously acquired spectra. Such comparison or other evaluation can be performed either in the analog or digital domain (for example, through either digital or analog multiplication of two or more power levels).

Analog scaling operations may also be performed prior to comparing an analog subtraction result (e.g., voltage differential) with a threshold value. For example, an analog scaling circuit may scale up (or scale down) an analog subtraction result, as may be desired prior to digitization for comparison with a threshold value. Likewise, analog amplification operations may also be performed by an analog amplification circuit as desired to provide an analog voltage value to an analog-to-digital sampling circuit. These scaling and amplification techniques may ensure, in some embodiments, that an analog-to digital sampling circuit receives an appropriate range of values prior to digitization operations (e.g., not outside the operational range of the analog-to-digital converter), as will be understood by one of skill in the art.

Note that in numerous embodiments, various operations discussed above (subtraction, sample/hold, etc.) are performed in the analog domain. In some instances, performing these operations by way of analog techniques rather than digital techniques may reduce power consumption within a detector assembly, and extend battery life. In a downhole environment, this may provide an advantage, as battery life will often be limited.

In other embodiments, the operations after the scanning step 2305 and signal receiving step 2310, may be performed through alternative processes, such as largely in the digital domain. One example is through use of a lock-in amplifier system. In such a process, received signals would be digitized at a rate much faster than the sweep time. As one example of the sweep configuration, a sweep for a single tag frequency might be performed at a rate of approximately 17 ksweeps per second, while a sweep for three tag frequencies might be performed at a rate of approximately 5 ksweeps per second. The sweeps would be digitized at a much higher frequency, for example in the range of 30 ksps to 2 Msps, though even higher digitization rates (for example, on the order of 100 Msps), would be desirable.

In this example process, the comparing step 2315, is then performed by comparing the digitized points forming the digitized signal to prior signals. For example, for each frequency point of the digitized signal, an adaptive background correction can be performed at that frequency relative to past sweeps to remove the unchanging, or at least relatively slowly changing, portion of the response curve. Such background correction may be performed using one or more techniques, such as, for example: linear averaging, exponential decay averaging, median filtering, and histogram analysis. In some example methods, the resulting background corrected signal is then convolved against a matched filter, or multiple filters in systems scanning multiple frequencies (such as Gaussian or first derivative Gaussian filters), for each of the tag frequency bands examined. The convolved response is then sent to the detection section, which would filter it to yield a desired signal configuration (e.g., for example, a linear signal, a squared signal or absolute value signals). The determining step 2320 is then performed by comparing that resulting signal to one or more reference values, such as thresholds, and evaluating the comparison by a resolution mechanism. The resolution mechanism may be of different configurations, but in many examples will resolve the detection decision based on the signal meeting or exceeding a threshold for "n" of "m" observations.

Figure 24:
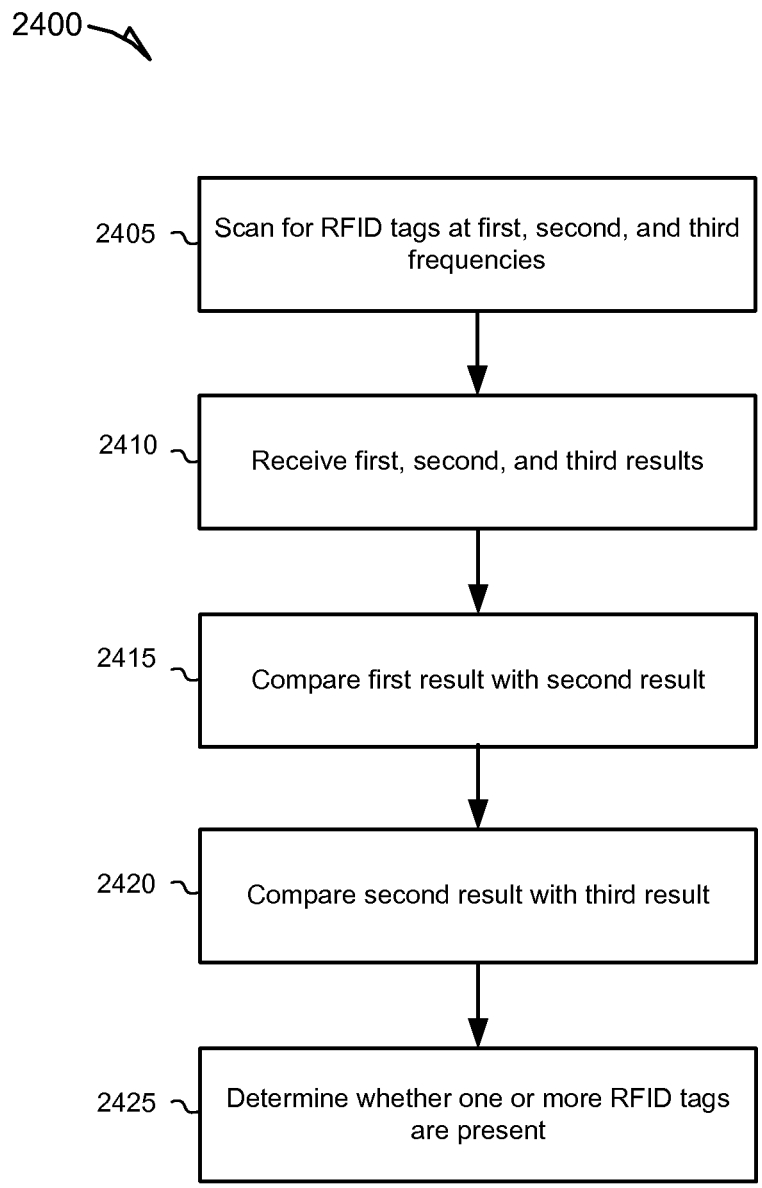
FIG. 24 is a flow chart of another example embodiment of a method relating to detection of RFID tags.

Turning to FIG. 24, the figure depicts an example embodiment of another method 2400 relating to detection of RFID tags. Various steps performed in method 2400 may be performed by a sensor assembly and/or portions thereof (such as RFID detector circuit 2200). In some embodiments, method 2400 may include additional operations, and some portions of method 2400 may be omitted and/or performed in a different order than the one shown, as consistent with this disclosure. Method 2400 may include any features, operations, or structures as described above relative to method 2300, in some embodiments, and vice versa.

In step 2405, RFID tags are scanned for at first, second, and third frequencies. In one embodiment, the first frequency is lower than a target frequency at which an RFID tag operates, the second frequency is the target frequency, and the third frequency is higher than the target frequency. In step 2410, first, second, and third results are received that correspond to the scanning operations performed in step 2405. The received results may be analog voltage levels detected across resistor 2220, in one example.

In step 2415, the first result is compared with the second result. In one embodiment, this comparison includes calculating a fourth (analog) result by subtracting the first result from the second result using an analog subtraction circuit. In some instances, the fourth result will thus be indicative of a voltage differential between a scan of a relatively lower frequency and a scan of a target frequency.

In step 2420, the second result is compared with the third result. In one embodiment, this comparison includes calculating a fifth (analog) result by subtracting the second result from the third result using an analog subtraction circuit. In some instances, the fifth result will likewise be indicative of a voltage differential between a scan of the target frequency and a scan of a relatively higher frequency. Accordingly, the fourth and fifth results may represent voltage differentials on respectively opposite sides of a target frequency, in some instances.

In step 2425, a determination is made as to whether one or more RFID tags are present (e.g., in a portion of an annulus of a borehole) based on the comparisons made in steps 2415 and 2420. In one embodiment, determining if RFID tags are present includes determining whether two voltage differentials (e.g., the fourth and fifth results) both exceed a threshold value. Checking that voltage differentials on both sides of a target frequency exceed a threshold, for example, may reduce false positives for RFID detection.

Figure 25:
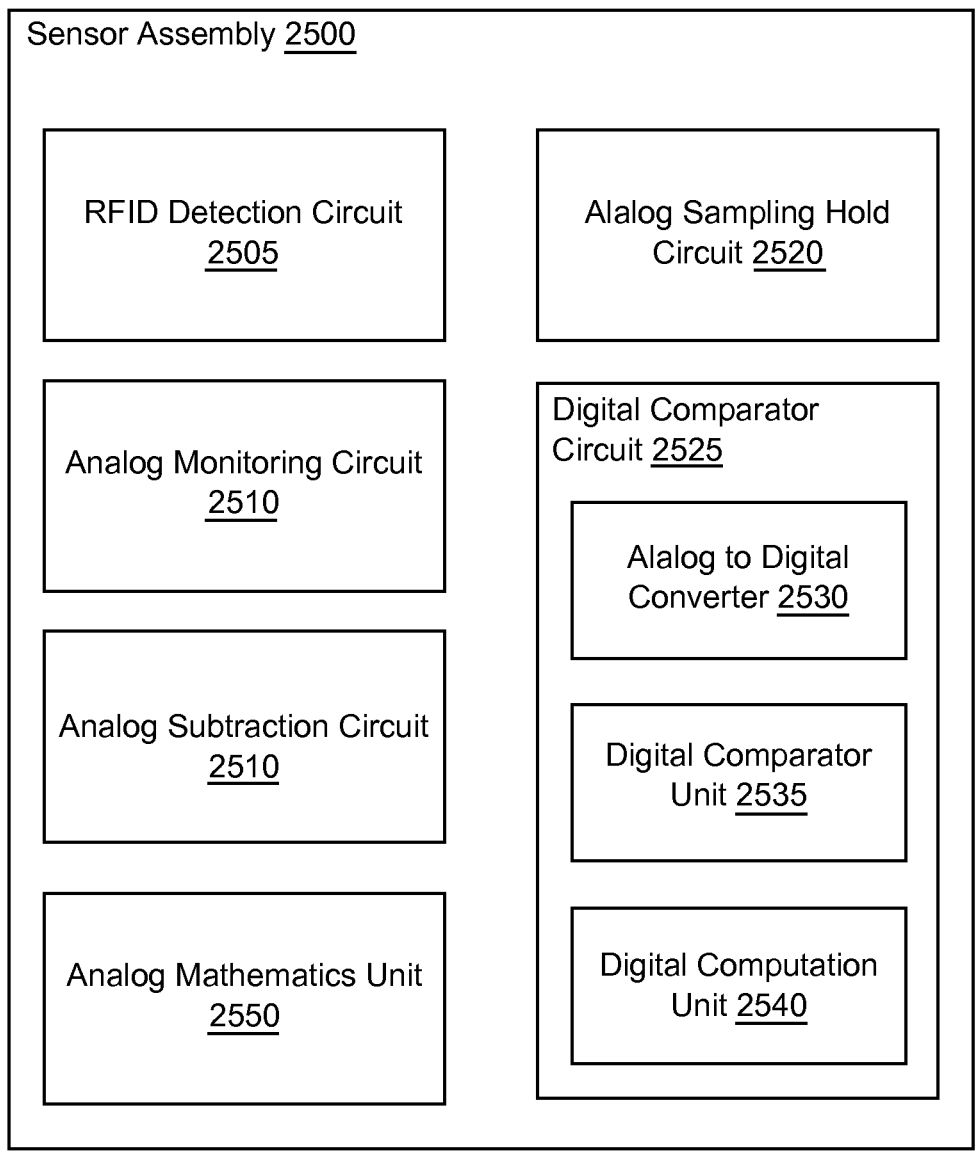
FIG. 25 is a block diagram of an example embodiment of a sensor assembly including an RFID detection circuit.

Turning to FIG. 25, a diagram is shown of an example embodiment of a sensor assembly 2500. In some embodiments, sensor assembly 2500 may be part of a communication assembly (e.g., as discussed relative to FIGS. 14 and 15), and may include any or all of the structures or features described above relative to various embodiments of sensor assemblies in this disclosure. Circuits and structures within sensor assembly 2500 may be suitably connected (e.g., via electrical pathways or control structures) as would occur to one of skill in the art. Other circuits or components not shown may be present in some embodiments, while in other embodiments, one or more circuits or components may be omitted.

In the embodiment shown, sensor assembly 2500 includes an RFID detection circuit 2505, an analog monitoring circuit 2510, an analog subtraction circuit 2515, an analog sample/hold circuit 2520, and a digital comparator circuit 2525 that includes an analog-to-digital converter 2530 and a digital comparator unit 2535.

RFID detection circuit 2505 may be generally in accordance with any of the detection circuits described herein, such as in reference to any of FIGS. 21A-B and 22. RFID detection circuit 2505 will configured to operate while sensor assembly 2500 is coupled to an exterior of a casing string in a borehole, and to scan for RFID tags as discussed above. As noted above, such scanning will often be done at a plurality of frequencies.

Analog monitoring circuit 2510 is configured to measure a voltage across a resistor (e.g., resistor 2220) in RFID detection circuit 2505. Measurements taken by analog monitoring circuit 2510 may therefore include voltage measurements that indicate levels of power reflected at different frequencies from within the borehole annulus. Analog subtraction circuit 2515 is configured to subtract different voltage measurements taken by analog monitoring circuit 2510 and to provide corresponding analog results indicating voltage differentials (e.g., between scans at two frequencies).

Digital comparator circuit 2525 is configured to use analog-to-digital converter 2530 to convert an analog value to a digital value. Note that analog-to-digital converter 2530 may be part of a sampling circuit in various embodiments. Values may be provided for digitization to analog-to-digital converter 2530 by analog subtraction circuit 2515, in one embodiment.

Digital comparator unit 2535 is also configured to receive a digital value (e.g., from analog-to-digital converter 2530) and to compare the received value to another digital value, such as a threshold value. Thus, digital comparator unit 2535 may assist in determining whether one or more RFID tags are present (in the case that a voltage differential between two frequencies exceeds a threshold value, for example).

In some examples, a digital computation unit 2540 is provided to perform additional computations in the digital domain. For example, digital computation unit 2540 may be constructed to evaluate received signals relative to entries in a lookup table, as could be used in phase sensitive detection. Other computations useful in either detecting the received signals, or evaluation of the received signals are also contemplated.

Analog sample/hold circuit 2520 is configured to store analog measurements (such as voltage levels), which may be used later. For example, voltage levels from one or more previous frequency scans may be stored in analog sample/hold circuit 2520 for purposes of later comparison with voltage levels from other frequency scans. Generally, sensor assembly 2500, or one or more of the structures therein, may be suitably combined with other embodiments described above relative to FIGS. 17-24 for purposes of RFID detection.

RFID detection circuit 2500 also includes an analog mathematics unit 2550 to simplify operations to be performed in the digital domain. For example, analog mathematics unit 2550 can include an analog multiplier that could result in fewer, or less complex, operations needing to be performed by the digital comparator circuit 2525.

Note that as discussed herein, various techniques and structures discussed above may be suitable for detecting RFID tags within a borehole of an oil well or other hydrocarbon recovery well. Techniques and structures used herein may also allow for more accurate RFID detection in a borehole environment, and may save power used in performing RFID detection (e.g., by virtue of analog operations instead of digital operations) in various instances.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement configured to achieve the same purpose may be substituted for the specific embodiments shown. This disclosure is intended to cover any and all adaptations or variations of various embodiments falling within the scope of the following claims and their equivalents, or within the scope of other claims supported by the present specification and their equivalents. Combinations of the above embodiments, and other embodiments not specifically described herein will be apparent to those of skill in the art upon reviewing the above description.

What is claimed is:

1. A method of detecting radio frequency identification device (RFID) tags in a borehole, comprising:

scanning for the RFID tags at a plurality of frequencies in at least a portion of an annulus surrounding an exterior of a casing string in the borehole, wherein the RFID tags are embedded in a wellbore composition within the annulus;

receiving a plurality of corresponding results from the RFID tags, wherein each corresponding result of the plurality of corresponding results corresponds to a different one of the plurality of frequencies;

comparing the plurality of corresponding results to one another, wherein the comparing of the plurality of corresponding results comprises digitizing the plurality of corresponding results at a rate faster than a sweep time of said each of the plurality of corresponding results to create digitized signals, and wherein the comparing of the plurality of corresponding results comprises performing background correction by comparing the digitized signals of multiple sweeps to provide a background corrected signal: and determining whether one or more of the RFID tags are present in the portion of the annulus based on the comparing of the plurality of corresponding results.

2. The method of claim 1, wherein said each of the plurality of corresponding results comprises an analog value that indicates a power level reflected from a scan of the portion of the annulus.

3. The method of claim 2, wherein said determining whether the one or more of the RFID tags are present in the portion of the annulus comprises:
determining a physical position corresponding with a dip in the power level; and
determining that the one or more of the RFID tags are present based on the physical position.

4. The method of claim 1, further comprising prior to said comparing the plurality of the corresponding results to one another, applying a bandpass filter to said each of the plurality of corresponding results to dampen environmental noise above and below a pair of respective threshold frequencies.

5. The method of claim 1, further comprising:
at a first time, storing a first corresponding result of the plurality of corresponding results in an analog sample/hold circuit; and
retrieving the first corresponding result from the analog sample/hold circuit at later time; and
wherein said comparing the plurality of corresponding results further comprises subtracting one of a pair comprising the first corresponding result and a second corresponding result from the other of the pair comprising the first corresponding result and the second corresponding result.

6. The method of claim 1,
wherein said each corresponding result of the corresponding results for each of the plurality of frequencies comprises a voltage level; and
wherein said comparing the plurality of the corresponding results to one another further comprises comparing a first voltage level corresponding to a first result to a second voltage level corresponding to a second result using at least one of: an analog subtraction circuit, an analog multiplication circuit, a digital subtraction circuit and a digital multiplication circuit.

7. The method of claim 6, wherein said determining whether the one or more of RFID tags are present comprises, converting an output of the analog subtraction circuit to a digital value; and using a digital circuit to determine if the digital value exceeds a threshold value.

8. The method of claim 1,
wherein said scanning for the RFID tags at the plurality of frequencies comprises scanning at a series of successively faster frequencies; and
wherein said comparing the plurality of the corresponding results to one another further comprises subtracting a result of scanning at a relatively lower frequency from a result of scanning at a frequency.

9. The method of claim 1,
wherein said scanning for the RFID tags at the plurality of frequencies comprises scanning at a series of successively slower frequencies; and
wherein said comparing the plurality of corresponding results to one another further comprises comparing a result of scanning at relatively higher frequency to a result of scanning at a relatively lower frequency.

10. The method of claim 1, further comprising:
determining a first one of the plurality of corresponding results by averaging results from said scanning for the RFID tags multiple times at a first frequency of the plurality of frequencies; and
determining a second one of the plurality of corresponding results by averaging results from said scanning for the RFID tags multiple times at a second frequency of the plurality of frequencies.

11. The method of claim 1, wherein said scanning for the RFID tags at the plurality of frequencies comprises scanning one or more frequencies below a target frequency and scanning one or more frequencies above the target frequency.

12. The method of claim 1, wherein said determining whether the one or more RFID tags are present comprises determining if a threshold value is exceeded by both:
a result of subtracting a second corresponding result of the plurality of corresponding results from a first corresponding result of the plurality of corresponding results; and
a result of subtracting the second corresponding result from a third result of the plurality of corresponding results.

13. The method of claim 1,
wherein the plurality of frequencies comprises at least three frequencies, and
wherein the comparing of the plurality of corresponding results further comprises comparisons between at least three frequencies of the plurality of frequencies.

14. The method of claim 1,
wherein said each one of the plurality of corresponding results comprises a voltage level; and
wherein said comparing the plurality of corresponding results to one another further comprises using a subtraction circuit to subtract a first voltage level of a second result from a second voltage level of a first result.

15. The method of claim 1,
wherein said each one of the plurality of corresponding results comprises a voltage level; and
wherein said comparing the plurality of corresponding results to one another further comprises using a multiplication circuit to compare a first voltage level of a second result to a second voltage level of a first result.

16. The method of claim 1,
wherein the scanning for the RFID tags at the plurality of frequencies is performed through use of a first antenna, and wherein the receiving of the plurality of corresponding results for each frequency of the plurality of frequencies is performed through use of a second antenna.

17. The method of claim 1, wherein the wellbore composition comprises a cement slurry.

18. The method of claim 1, further comprising pumping the wellbore composition from a surface at a top of the borehole into the annulus.

19. A method of detecting radio frequency identification device (RFID) tags in a borehole, comprising:
scanning for the RFID tags, at first, second, and third frequencies, in at least a portion of an annulus surrounding an exterior of a casing string in the borehole, wherein the RFID tags are embedded in a wellbore composition within the annulus;
receiving first, second, and third results from the RFID tags for the first, second, and third frequencies;
generating result comparisons, wherein said generating the result comparisons comprise comparing the first result with the second result, and the second result with the third result, and wherein said generating the result comparisons comprises digitizing each of the first result second result and third result at a rate faster than a sweep time corresponding to said each of the first result, second result and third result to create digitized signals, and wherein said generating the result comparisons comprises performing background correction by comparing the digitized signals of multiple sweeps to provide a background corrected signal; and
based on the result comparisons, determining whether one or more of the RFID tags are present in the portion of the annulus.

20. The method of claim 19,
wherein the first, second, and third results are each analog signals;
wherein said comparing the first result with the second result comprises calculating a fourth result by a first analog subtraction of the second result from the first result; and
wherein said comparing the second result with the third result comprises calculating a fifth result by a second analog subtraction of the second result from the third result.

21. The method of claim 20,
wherein each of the first, second, and third results comprises a respective voltage measured by an RFID detection circuit and is indicative of a level of power reflected by a scan of the portion of the annulus; and
wherein said determining whether the one or more RFID tags are present comprises: creating first and second digitized result values respectively from the fourth and fifth results using a sampling circuit; and respectively comparing the first and second digitized result values to a threshold value.

22. The method of claim 19, wherein the wellbore composition comprises a cement slurry.

23. A downhole assembly, comprising:
a radio frequency identification device (RFID) detection circuit to operate while the downhole assembly is coupled to a casing string, and to scan for RFID tags at a plurality of frequencies in at least a portion of an annulus surrounding the casing string in a borehole, the scanning for the RFID tags including receiving a corresponding scan result for each of the plurality of frequencies, wherein the RFID tags are embedded in a wellbore composition within the annulus;
an analog monitoring circuit to measure a voltage across a resistor in the RFID detection circuit, the voltage indicating a level of power reflected from the portion of the annulus during the scanning at the plurality of frequencies; and
a digital comparator circuit to: convert an analog value to a digital value at a rate faster than a corresponding sweep time of the analog value, the analog value corresponding to a voltage difference between two voltage measurements taken by the analog monitoring circuit;
performing background correction on the digital value by comparing the digital value to a plurality of digitized signals of multiple sweeps to provide a background corrected signal; and
determine whether one or more of the RFID tags are present in the portion of the annulus by
determining whether the digital value exceeds a threshold value.

24. The downhole assembly of claim 23, further comprising an analog subtraction circuit to calculate the voltage difference between the two voltage measurements taken by the analog monitoring circuit.

25. The downhole assembly of claim 24, further comprising:
an analog bandpass filter to filter frequencies lower than a first threshold and higher than a second threshold for a voltage signal measured by the analog monitoring circuit;
an analog scaling circuit to scale signals output by the analog subtraction circuit; and
an analog amplification circuit to generate amplified signals output by the analog scaling circuit, and to provide the amplified signals output to the digital comparator circuit for digital conversion.

26. The downhole assembly of claim 23, wherein the wellbore composition comprises a cement slurry.

27. The downhole assembly of claim 23, wherein the wellbore composition comprises a fluid pumped from a surface at a top of the borehole into the annulus.

* * * * *